United States Patent

Tahara et al.

[11] Patent Number: 6,165,407
[45] Date of Patent: *Dec. 26, 2000

[54] MOLD ASSEMBLY FOR MOLDING THERMOPLASTIC RESIN AND METHOD OF MANUFACTURING MOLDED ARTICLE OF THERMOPLASTIC RESIN

[75] Inventors: Hisashi Tahara; Takayuki Ito, both of Hiratsuka, Japan

[73] Assignee: Mitsubishi Engineering-Plastics Corp., Tokyo, Japan

[*] Notice: This patent is subject to a terminal disclaimer.

[21] Appl. No.: 09/084,896

[22] Filed: May 28, 1998

[30] Foreign Application Priority Data

May 28, 1997 [JP] Japan .................................. 9-138438
Jun. 17, 1997 [JP] Japan .................................. 9-159780

[51] Int. Cl.[7] .................................................. B29C 45/37
[52] U.S. Cl. ............................. 264/328.1; 264/328.16; 249/111; 249/134; 249/135; 425/192 R; 425/552
[58] Field of Search ....................... 264/328.16, 328.1; 249/134, 111, 135; 425/190, 192 R, 195, 552

[56] References Cited

U.S. PATENT DOCUMENTS

| | | | |
|---|---|---|---|
| 3,516,957 | 6/1970 | Gray et al. | 264/328.16 |
| 4,150,079 | 4/1979 | Chang | 264/328.16 |
| 4,808,351 | 2/1989 | Mukherjee et al. | 264/328.16 |
| 5,324,473 | 6/1994 | Baresich | 264/328.16 |
| 5,376,317 | 12/1994 | Maus et al. | 264/328.16 |
| 5,458,818 | 10/1995 | Kim et al. | 264/328.16 |
| 5,489,410 | 2/1996 | Baumgartner et al. | 264/328.16 |
| 5,676,896 | 10/1997 | Izumida et al. | 264/328.7 |
| 5,741,446 | 4/1998 | Tahara et al. | |

FOREIGN PATENT DOCUMENTS

| | | |
|---|---|---|
| 55-55839 | 4/1980 | Japan . |
| 61-100425 | 5/1986 | Japan . |
| 62-208919 | 9/1987 | Japan . |
| 5-111937 | 5/1993 | Japan . |
| 5-200789 | 8/1993 | Japan . |
| 6-35134 | 5/1994 | Japan . |
| 6-218769 | 8/1994 | Japan . |
| 8-318534 | 12/1996 | Japan . |

*Primary Examiner*—Jill L. Heitbrink
*Attorney, Agent, or Firm*—Wenderoth, Lind & Ponack, L.L.P.

[57] ABSTRACT

A mold assembly for molding a thermoplastic resin, which comprises; (a) a first mold member and a second mold member for manufacturing a molded article of a thermoplastic resin, (b) an insert block provided in the first mold member, said insert block constituting part of a cavity, having a thickness of 0.1 mm to 10 mm and being formed of a material having a thermal conductivity of $2 \times 10^{-2}$ cal/cm·sec·°C. or less, and (c) a molten thermoplastic resin introduction portion provided in the second mold member, wherein an insert block covering portion is formed in the second mold member, and when the first mold member and the second mold member are clamped to each other, (A) a clearance between the insert block and the insert block covering portion is equal to, or less than, 0.03 mm, and (B) an amount of overlapping of the insert block and the insert block covering portion is equal to, or greater than, 0.5 mm.

22 Claims, 28 Drawing Sheets

TAB PORTION    MOLDED ARTICLE

MOLDED ARTICLE

MOLD ASSEMBLY FOR MOLDING THERMOPLASTIC RESIN AND METHOD OF MANUFACTURING MOLDED ARTICLE OF THERMOPLASTIC RESIN

BACKGROUND OF THE INVENTION AND RELATED ART

The present invention relates to a mold assembly for molding a thermoplastic resin and a method of manufacturing a molded article of a thermoplastic resin by means of the above mold assembly. More specifically, it relates to a mold assembly which serves to manufacture a molded article having an improved transferred surface and having no defect in appearance by an injection molding method, an injection compression molding method, a blow molding method or the like, and a method of manufacturing a molded article of a thermoplastic resin by means of the above mold assembly. Or, it relates to a method of manufacturing a molded article of a thermoplastic resin, which method can effectively prevent occurrence of a sink mark on the molded article.

Generally, a mold used for manufacturing a molded article of a thermoplastic resin (to be simply referred to as "mold" hereinafter) is formed from a metal material that is not deformed under a high pressure exerted at the time of injecting or introducing a molten thermoplastic resin (to be sometimes simply referred to as "molten resin" hereinafter) into a cavity, i.e., a hollow portion, provided in the mold, or filling the cavity with the molten resin. The metal material is selected, for example, from carbon steel, stainless steel, aluminum alloy or copper alloy. Injecting or introducing a molten resin into a cavity provided in a mold or filling a cavity with a molten resin is sometimes simply referred to as "introducing a molten resin into a cavity" hereinafter. A molten resin is introduced into the cavity, and as a result, a molded article having a desired form and having a surface on which a surface of the mold is transferred is obtained. The surface of the mold which constitutes the cavity is sometimes referred to as "cavity wall of the mold" hereinafter.

A thermoplastic resin is generally classified into two types of resins such as an amorphous thermoplastic resin and a crystalline thermoplastic resin. An amorphous resin starts to be solidified or softened at its glass transition temperature $T_g$. A crystalline thermoplastic resin is melted at a temperature equal to, or higher than, its melting point $T_m$, and a crystal is formed and grown at a temperature equal to, or lower than, its crystallization initiation temperature $T_c$, and the crystalline thermoplastic rein is solidified.

When a molded article is manufactured by means of the above mold made of a metal, it is difficult to form the molded article having a surface state similar to that of a cavity wall of the mold. Generally, a mold is made of a metal material which is not deformed by a high stress brought by a pressure of an introduced molten resin, and the metal material has an excellent thermal conductivity. Therefore, as soon as the molten resin introduced into the cavity contacts the cavity wall of the mold, it starts to be instantaneously cooled. As a result, a solidification layer is formed in a molten resin portion which contacts the cavity wall of the mold, the molded article is liable to have defects in appearance such as a weld-mark or a flow mark, and there is also a problem that the poor transfer of the cavity wall of the mold on the surface of the molded article takes place. In a molded article having a projection such as a lib or boss (thick wall portion), further, a sink mark is often formed on a portion of one surface of the molded article which portion is opposed to the projection (a lib or boss) formed on the other surface of the molded article.

For overcoming the above-explained various problems, generally, there is employed a method in which a cavity wall of a mold is forced to be transferred on a surface of a molded article by injecting a molten resin into a cavity under high pressure, or a method in which development of a solidification layer of a thermoplastic resin is delayed by setting the mold temperature at a high level, for preventing occurrence of a weld-mark or a flow mark and for preventing occurrence of poor transfer of the cavity wall of the mold on the surface of the molded article. However, the former method has the following problem; the molding machine is increased in size, and the mold itself is increased in size and thickness, all of which require additional costs. Further, the molded article has a residual stress inside due to the introduction of the molten resin into the cavity under high pressure, and as a result, the molded article is poor in quality. On the other hand, the latter method has the following problems. Since the mold temperature is set at a level close to and lower than the deflection temperature of the used thermoplastic resin under load for preventing the development of the solidification layer, a longer period of time is required for cooling the resin in the cavity. As a result, the molding cycle takes a long time, and the productivity decreases. Further, there is another problems that since the mold temperature is high, the shrinkage amount of the thermoplastic resin increases at a cooling time and a sink mark is much more increased in size and/or depth.

For preventing appearance defects of a molded article such as a weld-mark and a flow mark caused by the development of the solidification layer in that portion of the molten resin which contacts to the cavity all of the mold and the poor transfer of the cavity all of the mold on the molded article, for example, JP-A-55-55839, JP-A-61-100425, JP-A-62-208919, JP-A-5-111937, JP-A-5-200789, JP-B-6-35134 and JP-A-6-218769 disclose methods in which a member having a low thermal conductivity is provided or attached to a cavity wall of a mold in order to delay the development of a solidification layer and prevent molding defects such as a weld-mark and a flow mark.

However, the method of simply attaching the member having a low thermal conductivity to a portion of the mold with an adhesive has the following problems, and the mold as a whole is poor in durability, so that it is difficult to mass-produce molded articles.

(1) When a clearance between the member having a low thermal conductivity and an attaching portion of the mold where the member having a low thermal conductivity is attached is small, the insert block is broken by repeating an increase and a decrease in the temperature of the mold since the coefficient of linear expansion differs between the material for constituting the mold and the material for constituting the member. Further, the member having a low thermal conductivity may be broken since it suffers a stress caused by an injection pressure.

(2) When a clearance between the member having a low thermal conductivity and an attaching portion of the mold where the member having a low thermal conductivity is attached is large, a molten resin penetrates a space between the attaching portion and the member in the molding operation, and mold flashes occur on a molded article. Further, when the molded article is released from the mold, the peripheral portion of the member having a low thermal conductivity suffers resistance, and as a result, the member having a low thermal conductivity may be broken.

The method of delaying the development of a solidification layer by using a member having a low thermal conductivity, which is formed of a heat-resistant plastic, has the following problems. Since such a member has low rigidity and has a poor surface hardness, the member having a low thermal conductivity is deformed and damaged when used for a long period of time. There is another member having a low thermal conductivity, which is prepared by forming a thin film of ceramic or the like on a metal surface by a chemical deposition method. However, such a member has a problem in that the thin film has poor durability and peels off the metal surface. The above members are therefore used in an experimental mold or in a simple mold and are not competent for use for long period of time.

Applicant in Japanese Patent Application No. 7-152519 (JP-A-8-318534, corresponding to U.S. Pat. No. 5,741,446) proposed a mold assembly comprising a mold, an insert block and a cover plate. The above mold assembly is feasible for overcoming the above problems. However, it cannot accommodate the cover plate in a mold depending upon some forms of molded articles, and the position where the insert block can be placed is limited in some cases. That is, in some cases, the insert block cannot be attached to a portion of a mold corresponding to that portion of a molded article which should be imparted with an excellent surface property. For example, when a molded article has an undercut portion, it is required to provide the mold assembly with a slide core for taking out the molded article having an undercut portion from the mold assembly. In the mold assembly having the above structure, however, it is difficult to provide the mold assembly with the cover plate.

A sink mark is formed for one reason that a resin shrinks together with the cooling and solidification of a molten resin, and is therefore a phenomenon which a general injection molding method cannot avoid. For overcoming the above sink mark problem, for example, there has been proposed a method in which a semi-molten thermoplastic resin is compressed at an injection molding time to compensate a shrunk volume of the semi-molten thermoplastic resin, i.e., a method in which the volume of a cavity is decreased by the shrunk volume. There has been also proposed another method of preventing the formation of a sink mark, in which a hollow portion is formed inside a molten resin introduced into a cavity of a mold by introducing an inert high-pressure fluid to exert a pressure on the molten resin from the hollow portion to the cavity wall of the mold. In many cases, however, it is difficult to reliably prevent the formation of a sink mark even if the above methods are employed.

OBJECT AND SUMMARY OF THE INVENTION

It is therefore a first object of the present invention to provide a mold assembly for molding a thermoplastic resin, which is feasible for continuous operation for a long period of time without causing the breakage of an insert block formed of a very fragile material such as ceramic or glass, which permits the reliable transfer of a surface state of the insert block constituting a cavity wall on a surface of a molded article and which provides a high freedom of a position where the insert block is arranged in mold members, and a method of manufacturing a molded article of a thermoplastic resin by means of the above mold assembly.

It is a second object of the present invention to provide a method of manufacturing a molded article of a thermoplastic resin, which can reliably prevent occurrence of a sink mark on a portion of one surface of a molded article which portion is opposed to a projection formed on the other surface of the molded article without any special device, which serves to decrease a stress remaining in a molded article, and which permits the reliable transfer of a surface constituting a cavity of a mold on the surface of the molded article.

A mold assembly for molding a thermoplastic resin according to a first aspect of the present invention for achieving the above first object comprises;

(a) a first mold member and a second mold member for manufacturing a molded article of a thermoplastic resin, (b) an insert block provided in the first mold member, said insert block constituting part of a cavity, having a thickness of 0.1 mm to 10 mm and being formed of a material having a thermal conductivity of $2 \times 10^{-2}$ cal/cm·sec·°C. or less, and (c) a molten thermoplastic resin introduction portion provided in the second mold member, wherein an insert block covering portion is formed in the second mold member, and when the first mold member and the second mold member are clamped to each other, (A) a clearance ($C_{11}$) between the insert block and the insert block covering portion is equal to, or less than, 0.03 mm ($C_{11} \leq 0.03$ mm), and (B) an amount of overlapping ($\Delta S_{11}$) of the insert block and the insert block covering portion is equal to, or greater than, 0.5 mm ($\Delta S_{11} \geq 0.5$ mm).

In the above-structured mold assembly, the insert block covering portion may be structurally a kind of a groove or an incision provided in a surface of the second mold member facing (opposed to) the insert block.

A mold assembly for molding a thermoplastic resin according to a second aspect of the present invention for achieving the above first object comprises;

(a) a first mold member and a second mold member for manufacturing a molded article of a thermoplastic resin, (b) an insert block provided in the first mold member, said insert block constituting part of a cavity, having a thickness of 0.1 mm to 10 mm and being formed of a material having a thermal conductivity of $2 \times 10^{-2}$ cal/cm·sec·°C. or less, and (c) a cover plate provided between the insert block and the second mold member, attached to the first mold member, and provided with a molten thermoplastic resin introduction portion, wherein an insert block covering portion is formed in the second mold member, and when the first mold member and the second mold member are clamped to each other, (A) a clearance ($C_{21}$) between the insert block and the insert block covering portion is equal to, or less than, 0.03 mm ($C_{21} \leq 0.03$ mm), (B) an amount of overlapping ($\Delta S_{21}$) of the insert block and the insert block covering portion is equal to, or greater than, 0.5 mm ($\Delta S_{21} \geq 0.5$ mm), (C) a clearance ($C_{22}$) between the insert block and the cover plate is equal to, or less than, 0.03 mm ($C_{22} \leq 0.03$ mm), and (D) an amount of overlapping ($\Delta S_{22}$) of the insert block and the cover plate is equal to, or greater than, 0.5 mm ($\Delta S_{22} \geq 0.5$ mm), and the cover plate overlaps only part of the insert block.

In the above-structured mold assembly, the molten thermoplastic resin introduction portion can have, for example, a direct gate structure.

A mold assembly for molding a thermoplastic resin according to a third aspect of the present invention for achieving the above first object comprises;

(a) a first mold member and a second mold member for manufacturing a molded article of a thermoplastic resin, (b) a first insert block provided in the first old member, said first insert block constituting part of a cavity, having a thickness of 0.1 mm to 10 mm and being formed of a material having a thermal conductivity of $2\times10^{-2}$ cal·sec·°C. or less, (c) a second insert block provided in the second mold member, said second insert block constituting part of the cavity, having a thickness of 0.1 mm to 10 mm and being formed of a material having a thermal conductivity of $2\times10^{-2}$ cal/cm·sec·°C. or less, and (d) a cover plate provided between the first insert block and the second insert block, attached to at least one of the first mold member and the second mold member, and provided with a molten thermoplastic resin introduction portion, wherein, when the first mold member and the second mold member are clamped to each other, (A) a clearance ($C_{30}$) between a surface of the first insert block facing (opposed to) the second insert block and a surface of the second insert block facing (opposed to) the first insert block is equal to, or less than, 0.03 mm ($C_{30} \leq 0.03$ mm), (B) an amount of overlapping ($\Delta S_{30}$) of the surface of the first insert block facing (opposed to) the second insert block and the surface of the second insert block facing (opposed to) the first insert block is equal to, or greater than, 0.5 mm ($\Delta S_{30} \geq 0.5$ mm), (C) a clearance ($C_{31}$) between the first insert block and the cover plate and a clearance ($C_{32}$) between the second insert block and the cover plate are equal to, or less than, 0.03 mm ($C_{31} \leq 0.03$ mm and $C_{32} \leq 0.03$ mm), respectively, and (D) an amount of overlapping ($\Delta S_{31}$) of the first insert block and the cover plate and an amount of overlapping ($\Delta S_{32}$) of the second insert block and the cover plate are equal to, or greater than, 0.5 mm ($\Delta S_{31} \geq 0.5$ mm and $\Delta S_{32} \geq 0.5$ mm), respectively, and the over plate overlaps only part of the first and second insert blocks.

In the above-structured mold assembly, the molten thermoplastic resin introduction portion can have, for example, a side gate structure.

A method of manufacturing a molded article of a thermoplastic resin according to a first aspect of the present invention for achieving the above first object, by means of a mold assembly for molding a thermoplastic resin, said mold assembly comprising;

(a) a first mold member and a second mold member for manufacturing the molded article of a thermoplastic resin, (b) an insert block provided in the first mold member, said insert block constituting part of a cavity, having a thickness of 0.1 mm to 10 mm and being formed of a material having a thermal conductivity of $2\times10^{-2}$ cal·sec·°C. or less, and (c) a molten thermoplastic resin introduction portion provided in the second mold member, wherein an insert block covering portion is formed in the second mold member, and when the first mold member and the second mold member are clamped to each other, (A) a clearance ($C_{11}$) between the insert block and the insert block covering portion is equal to, or less than, 0.03 mm ($C_{11} < 0.03$ mm), and p2 (B) an amount of overlapping ($\Delta S_{11}$) of the insert block and the insert block covering portion is equal to, or greater than, 0.5 mm ($\Delta S_{11} \geq 0.5$ mm), said manufacturing method comprising;
introducing a molten thermoplastic resin into the cavity through the molten thermoplastic resin introduction portion, and
then, cooling and solidifying the thermoplastic resin to manufacture the molded article.

A method of manufacturing a molded article of thermoplastic resin according to a second aspect of the present invention for achieving the above first object, by means of a mold assembly for molding a thermoplastic resin, said mold assembly comprising;

(a) a first mold member and a second mold member for manufacturing the molded article of a thermoplastic resin, (b) an insert block provided in the first mold member, said insert block constituting part of a cavity, having a thickness of 0.1 mm to 10 mm and being formed of a material having a thermal conductivity of $2\times10^{-2}$ cal·sec·°C. or less, and (c) a cover plate provided between the insert block and the second mold member, attached to the first mold member, and provided with a molten thermoplastic resin introduction portion, wherein the insert block covering portion is formed in the second mold member, and when the first mold member and the second mold member are clamped each other, (A) a clearance ($C_{21}$) between the insert block and the insert block covering portion is equal to, or less than, 0.03 mm ($C_{21} \leq 0.03$ mm), (B) an amount of overlapping ($\Delta S_{21}$,) of the insert block and the insert block covering portion is equal to, or greater than, 0.5 mm ($\Delta S_{21} \geq 0.5$ mm), (C) a clearance ($C_{22}$) between the insert block and the cover plate is equal to, or less than, 0.03 mm ($C_{22} \leq 0.03$ mm), and (D) an amount of overlapping ($\Delta S_{22}$) of the insert block and the cover plate is equal to, or greater than, 0.5 mm ($\Delta S_{22} \geq 0.5$ mm), and the cover plate overlaps only part of the insert block, said manufacturing method comprising;
introducing a molten thermoplastic resin into the cavity through the molten thermoplastic resin introduction portion, and
then, cooling and solidifying the thermoplastic resin to manufacture the molded article.

A method of manufacturing a molded article of a thermoplastic resin according to a third aspect of the present invention for achieving the above first object, by means of a mold assembly for molding a thermoplastic resin, said mold assembly comprising;

(a) a first mold member and a second mold member for manufacturing the molded article of a thermoplastic resin, (b) a first insert block provided in the first mold member, said first insert block constituting part of a cavity, having a thickness of 0.1 mm to 10 mm and being formed of a material having a thermal conductivity of $2\times10^{-2}$ cal/cm·sec·°C. or less, (c) a second insert block provided in the second mold member, said second insert block constituting part of the cavity, having a thickness of 0.1 mm to 10 mm and being formed of a material having a thermal conductivity of $2 \times 10^{-2}$ cal/cm·sec·°C. or less, and (d) a cover plate provided between the first insert block and the second insert block, attached to at least one of the first mold member and the second mold member, and provided with a molten thermoplastic resin introduction portion, wherein, when the first mold member and the second mold member are clamped to each other, (A) a clearance ($C_{30}$) between a surface of the first insert block facing (opposed to) the second insert block and a surface of the second insert block facing (opposed to) the first insert block is equal to, or less than, 0.03 mm ($C_{30} \leq 0.03$ mm), (B) an amount of overlapping ($\Delta S_{30}$) of the surface of the first insert block facing (opposed to) the second insert block and the surface of the second insert block facing (opposed to) the first insert block is equal to, or greater than, 0.5 mm ($\Delta S_{30} \geq 0.5$ mm), (C) a clearance ($C_{31}$) between the first insert block and the cover plate and a clearance ($C_{32}$) between the second insert block and the cover plate are equal to, or less than, 0.03 mm ($C_{31} \leq 0.03$ mm and $C_{32} \leq 0.03$ mm), respectively, and (D) an amount of overlapping ($\Delta S_{31}$) of the first insert block and the cover plate and an amount of overlapping ($\Delta S_{32}$) of the second insert block and the cover plate are equal to, or greater than, 0.5 mm ($\Delta S_{31} \geq 0.5$ mm and $\Delta S_{32} \geq 0.5$ mm), respectively, and the cover plate overlaps only part of the first and second insert blocks, said manufacturing method comprising;
    introducing a molten thermoplastic resin into the cavity through the molten thermoplastic resin introduction portion, and
    then, cooling and solidifying the thermoplastic resin to manufacture the molded article.

Generally, the mold assembly is provided with a knock-out pin for taking out a molded article from the mold assembly. However, a mark of the top end of the knock-put pin may be left on the surface of a molded article depending upon the form of the molded article, and it is therefore difficult to provide the knock-out pin. In the above case, in the mold assembly for molding a thermoplastic resin according to the second or third aspect of the present invention or in the method of manufacturing a molded article according to the second or third aspect of the present invention, there may be employed a structure in which a tab-forming portion communicating with the cavity is formed in the cover plate for taking out a molded article from the mold assembly, whereby the molded article has a tab portion formed thereon. The molded article is taken out from the mold assembly by setting the knock-out pin to the above tab portion. The tab portion formed on the molded article can be removed in a later step.

The term "constituting part of a (the) cavity" means "constituting part of a (the) cavity wall which defines the outer form of a molded article". More specifically, the cavity is formed, for example, of the surfaces provided in the first and second mold members and constituting part of the cavity, the surface provided in the insert block and constituting part of the cavity, and in some cases, the surface provided in the cover plate and constituting part of the cavity. These surfaces or each surface constituting part of the cavity will be referred to as "cavity wall of the mold", "cavity wall of the insert block" and "cavity wall of the cover plate".

The method of manufacturing a molded article of a thermoplastic resin according to a fourth aspect of the present invention for achieving the above second object of the present invention comprises introducing the molten thermoplastic resin into a cavity formed in a mold to produce a molded article having a projection, wherein:
    a surface of that portion of the mold which portion faces (or is opposed to) a portion of the mold for forming the projection is constituted of an insert block having a thickness of 0.1 mm to 10 mm and being formed of a material having a thermal conductivity of $2 \times 10^{-2}$ cal/cm·sec·°C. or less, said surface constituting part of the cavity, and
    a mold temperature T (unit: ° C.) is set as shown in Table 1 depending upon a thermoplastic resin to be used.

The method of manufacturing a molded article of a thermoplastic resin according to a fifth aspect of the present invention for achieving the above second object of the present invention comprises introducing the molten thermoplastic resin into a cavity formed in a mold through a molten thermoplastic resin introduction portion to produce a molded article, wherein:
    a surface of that portion of the mold which portion faces (or is opposed to) the molten thermoplastic resin introduction portion is constituted of an insert block having a thickness of 0.1 mm to 10 mm and being formed of a material having a thermal conductivity of $2 \times 10^{-2}$ cal·sec·°C. or less, said surface constituting part of the cavity, and
    a mold temperature T (unit: ° C.) is set as shown in Table 1 depending upon a thermoplastic resin to be used.

TABLE 1

(1) When an amorphous thermoplastic resin having a glass transition temperature $T_g$ (unit: ° C.), the mold temperature T (unit: ° C.) is set in the range of $T_g-80<T<T_g-10$, preferably $T_g-70<T<T_g-15$, more preferably $T_g-60<T<T_g-20$.

(2) When a crystalline thermoplastic resin having a crystallization initiation temperature $T_c$ (° C.) is used, the mold temperature T (unit: ° C.) is set in the range of $T_c-130<T<T_c-10$, preferably, $T_c-120<T<T_c-15$, more preferably $T_c-110<T<T_c-20$.

(3) When the thermoplastic resin to be molded is a polymer alloy material which is formed of an amorphous thermoplastic resin having a glass transition temperature $T_g$ (unit: ° C.) and a crystalline thermoplastic resin and which has a greater content (% by weight) of the amorphous thermoplastic resin than the content of the crystalline thermoplastic resin, the mold temperature T (unit: ° C.) is set in the range of $T_g-90<T<T_g-10$, preferably $T_g-80<T<T_g-15$, more preferably $T_c-110<T<T_c-20$.

(4) When the thermoplastic resin to be molded is a polymer alloy material which is formed of an amorphous thermoplastic resin having a glass transition temperature $T_g$ (unit: ° C.) and a crystalline thermoplastic resin and of which the content (% by weight) of the amorphous thermoplastic resin and the content (% by weight) of the crystalline thermoplastic resin are the same, the mold temperature T (unit: ° C.) is set in the range of $T_g-100<T<T_g-10$, preferably $T_g-90<T<T_g-15$, more preferably $T_g-80<T<T_g-20$.

(5) When the thermoplastic resin to be molded is a polymer alloy material which is formed of an amorphous thermoplastic resin and a crystalline thermoplastic resin having a crystallization initiation temperature $T_c$ (° C.) and which has a greater content (% by weight) of the crystalline thermoplastic resin than the content of the amorphous thermoplastic resin, the mold temperature T (unit: ° C.) is set in the range of $T_c-120<T<T_c-10$, preferably $T_c-110<T<T_c-15$, more preferably $T_c-100<T<T_c-20$.

The occurrence of a sink mark on a molded article is caused not only by shrinkage of a thermoplastic resin which occurs together with the cooling and solidification of the molten thermoplastic resin in a cavity but also by a decrease in adhesion of the thermoplastic resin to a surface constituting the cavity of the mold (cavity wall of the mold). That is, when the molten resin which is introduced into the cavity and contacts the cavity wall of the mold is rapidly cooled, a solidification layer is rapidly formed in the thermoplastic resin in the cavity. As a result, the adhesion of the thermoplastic resin to the cavity wall of the mold decreases and the thermoplastic resin partly separates from the cavity wall of the mold to cause a sink mark on the molded article. In the method of manufacturing a molded article of a thermoplastic resin according to the fourth aspect of the present invention, the insert block is provided, and the mold temperature is set at a predetermined temperature depending upon the thermoplastic resin to be used, thereby to prevent the rapid cooling of the molten resin in contact with the insert block. As a result, the solidification layer is not rapidly formed any longer in the thermoplastic resin in the cavity. The mold temperature is a temperature set in the mold before the introduction of the molten thermoplastic resin into the cavity of the mold, and it is a temperature when the temperature of the mold is brought into a constant state by heating the mold with proper heating means. Therefore, a decrease in the adhesion of the thermoplastic resin to the cavity wall of the mold can be inhibited, and the separation of part of the thermoplastic resin from the cavity wall of the mold can be inhibited. As a result, the occurrence of a sink mark on the molded article can be prevented. When the mold temperature is lower than the lower limit of the temperature shown in Table 1, it is no longer possible to prevent the rapid cooling of the molten resin which is in contact with the insert block. As a result, the solidification layer is rapidly formed in the thermoplastic resin in the cavity, and it is no longer possible to prevent the occurrence of a sink mark. When the mold temperature is higher than the upper limit of the temperature shown in Table 1, the molded article may be deformed after it is taken out if the cooling time of the resin in the cavity is extended. There may be therefore a problem that a molding cycle takes a longer time.

Generally, since a projection-formed portion of a molded article has a large thickness as compared with other portions, the shrinkage amount of the resin in the projection-formed portion is large, and a sink mark is liable to be formed on a portion of one surface of the molded article which portion is opposed to the projection formed on the other surface of the molded article. In the method of manufacturing a molded article of a thermoplastic resin according to the fourth aspect of the present invention, the surface, constituting part of the cavity, of that portion of the mold which portion faces (or is opposed to) the portion of the mold for forming the projection is constituted of the insert block, whereby the occurrence of a sink mark on a portion of one surface of the molded article which portion is opposed to the projection formed on the other surface of the molded article, can be effectively prevented. The sink mark amount (depth) on the above portion of one surface of the molded article improved concerning a sink mark does not exceed 20 μm. A sink mark on the surface of the molded article is visually easily observable, and when the sink mark amount exceeds 20 μm, it is distinctly observable. In the method of manufacturing a molded article of a thermoplastic resin according to the fourth aspect of the present invention, the thickness, $t_0$ (unit: mm), of the portion of the molded article which portion is in the vicinity of the portion of the molded article provided with the projection and which portion is not provided with any projection is preferably $1 \leq t_0 \leq 5$. When $t_0$ is less than 1 mm, in general, a sink mark hardly arises. When $t_0$ exceeds 5 mm, a sink mark arises not because of a decrease in the adhesion of the thermoplastic resin to the cavity wall of the mold but mainly because of the shrinkage of the thermoplastic resin in the cavity, and in the method of manufacturing a molded article of a thermoplastic resin according to the fourth aspect of the present invention, therefore, it is likely to be difficult to prevent the occurrence of a sink mark.

In the method of manufacturing a molded article of a thermoplastic resin according to the fourth aspect of the present invention, there is included an embodiment in which the projection is constituted of a rib or has a rib form for imparting a molded article with rigidity and strength. In this case, when the thickness of the portion of the molded article which portion is in the vicinity of the portion of the molded article provided with a rib and which portion is not provided with any rib is $t_0$ (unit: mm), the width W of the rib is preferably 1 mm to 7 mm ($1 \leq W \leq 7$) regardless of any value of $t_0$. When the thickness W of the rib is less than 1 mm, in general, a sink mark hardly arises. When it exceeds 7 mm, it is likely to be difficult to prevent the occurrence of a sink mark even in the method of manufacturing a molded article of a thermoplastic resin according to the fourth aspect of the present invention. The width of a rib is preferably as shown in Table 2 described below depending upon a thermoplastic resin to be used. There may be employed an embodiment in which the projection is constituted of a boss used for assembling the molded article and other part. The term "boss" refers to a projection provided to a molded article for reinforcing the molded article, making an alignment easy in assembly or attaching the molded article to other part or other part to the molded article. In this case, when the thickness of the portion of the molded article which portion is in the vicinity of the portion of the molded article provided with the boss and which portion is not provided with any boss is $t_0$ (unit: mm), the thickness t of the boss is preferably 1 mm to 5 mm ($1 \leq t \leq 5$) regardless of any value of $t_0$. When the thickness t of the boss is less than 1 mm, in general, a sink mark hardly arises. When it exceeds 5 mm, it is likely to be difficult to prevent the occurrence of a sink mark even in the method of manufacturing a molded article of a thermoplastic resin according to the fourth aspect of the present invention. When the boss is shaped so as to be hollow and cylindrical, the thickness t of the boss can be shown by (outer diameter−inner diameter)/2. The thickness of the boss is preferably as shown in Table 3 to be described later depending upon a thermoplastic resin used. In Tables, "amorphous thermoplastic resin rich" means the use of a polymer alloy material of which the amorphous thermoplastic resin content (% by weight) is greater than its crystalline thermoplastic resin content (% by weight), "crystalline thermoplastic resin rich" means the use of a polymer alloy material of which the crystalline thermoplastic resin content (% by weight) is greater than its amorphous thermoplastic resin content (% by weight), and "equal ratio" means the use of a polymer alloy material of which the amorphous thermoplastic resin content (% by weight) and the crystalline thermoplastic resin content (% by weight) are the same.

TABLE 2

| Thermoplastic resin used | Range of width W of rib (unit: mm) |
| --- | --- |
| Amorphous thermoplastic resin | 1 to 7, preferably 1 to 6.5, more preferably 1 to 6 |
| Crystalline thermoplastic resin | 1 to 7, preferably 1 to 6, more preferably 1 to 5 |
| Polymer alloy materials | |
| Amorphous thermoplastic resin rich | 1 to 7, preferably 1 to 6.5, more preferably 1 to 6 |
| Equal ratio | 1 to 7, preferably 1 to 6.5, more preferably 1 to 6 |
| Crystalline thermoplastic resin rich | 1 to 7, preferably 1 to 6, more preferably 1 to 5 |

TABLE 3

| Thermoplastic resin used | Range of thickness t of boss (unit: mm) |
| --- | --- |
| Amorphous thermoplastic resin | 1 to 5, preferably 1 to 4.5, more preferably 1 to 4 |
| Crystalline thermoplastic resin | 1 to 5, preferably 1 to 4, more preferably 1 to 3 |
| Polymer alloy materials | |
| Amorphous thermoplastic resin rich | 1 to 5, preferably 1 to 4.5, more preferably 1 to 4 |
| Equal ratio | 1 to 5, preferably 1 to 4.5, more preferably 1 to 4 |
| Crystalline thermoplastic resin rich | 1 to 5, preferably 1 to 4, more preferably 1 to 3 |

In the method of manufacturing a molded article of a thermoplastic resin according to a fifth aspect of the present invention, the surface, constituting part of the cavity, of that portion of the mold which portion faces (or is opposed to) the molten thermoplastic resin introduction portion constituted, for example, of a direct gate or an overlap gate, is constituted of the inset block, whereby the occurrence of a sink mark can be prevented on a portion of one surface of the molded article which portion is opposite to the mark of the thermoplastic resin introduction portion formed on the other surface of the molded article. The sink mark amount (depth) on the above portion of one surface of the molded article improved concerning a sink mark does not exceed 20 $\mu$m. The thickness $t_0$ (unit: mm) of the portion of the molded article which portion is in the vicinity of the portion of the molded article provided with the mark of the thermoplastic resin introduction portion and which portion does not have any mark of the thermoplastic resin introduction portion is preferably $1 \leq t_0 \leq 5$. Further, the area of the mark of the thermoplastic resin introduction portion is preferably 4 mm² to 50 mm². When the mark of the thermoplastic resin introduction portion is less than 4 mm², in general, a sink mark hardly arises. When it exceeds 50 mm², it is likely to be difficult to prevent the occurrence of a sink mark even in the method of manufacturing a molded article of a thermoplastic resin according to the fifth aspect of the present invention.

Generally, a mold release agent or a lubricant is added to a thermoplastic resin for alleviating the adhesion between the cavity wall of the mold and the thermoplastic resin introduced into the cavity and improving mold releasability. In the method of manufacturing a molded article of a thermoplastic resin according to the fourth or fifth aspect of the present invention, the amount of the mold release agent or the lubricant is preferably 0.4% by weight or less. In the method of manufacturing a molded article of a thermoplastic resin according to the fourth or fifth aspect of the present invention, it is required to improve the adhesion between a thermoplastic resin at an initial stage of its introduction to the cavity and the cavity wall of the mold. It is therefore required to prevent a decrease in the above adhesion which occurs under the influence of the addition of the above additive (mold release agent or lubricant). When the amount of the mold release agent or the lubricant is greater than 0.4% by weight, the adhesion decreases, and the effect on preventing the occurrence of a sink mark may decrease. The lower limit of the mold release agent or the lubricant is preferably 0.001% by weight.

In the method of manufacturing a molded article of a thermoplastic resin according to the fourth or fifth aspect of the present invention, it is also preferred to use the mold assembly specified in the above first to third aspects of the present invention when part of the surface constituting a cavity is constituted of the insert block. In this case, the maintenance of the insert block is eased, and at a molding time, the insert block formed of a very fragile material such as ceramic or glass is not broken, no burr is formed on a molded article, the insert block is feasible for use for a long period of time and a surface state of the insert block can be reliably transferred on the surface of a molded article.

The method of manufacturing a molded article of a thermoplastic resin according to the fourth or fifth aspect of the present invention may preferably use the mold assembly according to the first aspect of the present invention which comprises;

(a) the first mold member and the second mold member for manufacturing the molded article of a thermoplastic resin, (b) the insert block provided in the first mold member, (c) the molten thermoplastic resin introduction portion provided in the second mold member, wherein the insert block covering portion is formed in the second mold member, and when the first mold member and the second mold member are clamped to each other, (A) a clearance ($C_{11}$) between the insert block and the insert block covering portion is equal to, or less than, 0.03 mm ($C_{11} \leq 0.03$ mm), and (B) an amount of overlapping ($\Delta S_{11}$) of the insert block and the insert block covering portion is equal to, or greater than, 0.5 mm ($\Delta S_{11} \geq 0.5$ mm).

The method of manufacturing a molded article of a thermoplastic resin according to the fourth or fifth aspect of the present invention may preferably use the mold assembly according to the second aspect of the present invention which comprises;

(a) the first mold member and the second mold member for manufacturing the molded article of a thermoplastic resin, (b) the insert block provided in the first mold member, and (c) the cover plate provided between the insert block and the second mold member, attached to the first mold member, and provided with the molten thermoplastic resin introduction portion, wherein the insert block covering portion is formed in the second mold member, and when the first mold member and the second mold member are clamped each other,
- (A) a clearance ($C_{21}$) between the insert block and the insert block covering portion is equal to, or less than, 0.03 mm ($C_{21} \leq 0.03$ mm),
- (B) an amount of overlapping $\Delta S_{21}$) of the insert block and the insert block covering portion is equal to, or greater than, 0.5 mm ($\Delta S_{21} \geq 0.5$ mm),
- (C) a clearance ($C_{22}$) between the insert block and the cover plate is equal to, or less than, 0.03 mm ($C_{22} \leq 0.03$ mm), and
- (D) an amount of overlapping ($\Delta S_{22}$) of the insert block and the cover plate is equal to, or greater than, 0.5 mm ($\Delta S_{22} > 0.5$ mm), and the cover plate overlaps only part of the insert block.

The method of manufacturing a molded article of a thermoplastic resin according to the fourth or fifth aspect of the present invention may preferably use the mold assembly according to the third aspect of the present invention which comprises;
- (a) the first mold member and the second mold member for manufacturing the molded article of a thermoplastic resin,
- (b) a first insert block provided in the first mold member, said first insert block having a thickness of 0.1 mm to 10 mm and being formed of a material having a thermal conductivity of $2 \times 10^{-2}$ cal/cm·sec·°C. or less,
- (c) a second insert block provided in the second mold member, said second insert block having a thickness of 0.1 mm to 10 mm and being formed of a material having a thermal conductivity of $2 \times 10^{-2}$ cal/cm·sec·°C. or less, and
- (d) the cover plate provided between the first insert block and the second insert block, attached to at least one of the first mold member and the second mold member, and provided with the molten thermoplastic resin introduction portion, wherein said first insert block and/or said second insert block correspond or corresponds to the insert block, and when the first mold member and the second mold member are clamped to each other,
- (A) a clearance ($C_{30}$) between a surface of the first insert block facing (opposed to) the second insert block and a surface of the second insert block facing (opposed to) the first insert block is equal to, or less than, 0.03 mm ($C_{30} \leq 0.03$ mm),
- (B) an amount of overlapping ($\Delta S_{30}$) of the surface of the first insert block facing (opposed to) the second insert block and the surface of the second insert block facing (opposed to) the first insert block is equal to, or greater than, 0.5 mm ($\Delta S_{30} \geq 0.5$ mm),
- (C) a clearance ($C_{31}$) between the first insert block and the cover plate and a clearance ($C_{32}$) between the second insert block and the cover plate are equal to, or less than, 0.03 mm ($C_{31} \leq 0.03$ mm and $C_{32} \leq 0.03$ mm), respectively, and
- (D) an amount of overlapping ($\Delta S_{31}$) of the first insert block and the cover plate and an amount of overlapping ($\Delta S_{32}$) of the second insert block and the cover plate are equal to, or greater than, 0.5 mm ($\Delta S_{31} \geq 0.5$ mm and $\Delta S_{32} \geq 0.5$ mm), respectively, and the cover plate overlaps only part of the first and second insert blocks.

In the method of manufacturing a molded article of a thermoplastic resin according to the fourth or fifth aspect of the present invention, a knock-out pin is also arranged in a mold for taking out a molded article from the mold. In some cases, however, it is difficult to provide a mold with the knock-out pin since a mark of the top end of the knock-put pin may be left on the surface of a molded article depending upon the form of the molded article. Even in the above case, in the method of manufacturing a molded article of a thermoplastic resin according to the fourth or fifth aspect of the present invention, the mold assembly according to the second or third aspect of the present invention may have a structure in which the cover plate is provided with a tab-forming portion communicating with the cavity for taking out a molded article from the mold. As a result, the molded article has a tab portion formed. The molded article can be taken out by setting the knock-out pin to the above tab portion. The tab portion formed on the molded article can be removed at a later step.

When the insert block, the first insert block or the second insert block (these blocks may be simply referred to as "insert block") has a thickness of less than 0.1 mm, the insert block has almost no heat insulation effect, which leads to rapid cooling of a molten thermoplastic resin in the cavity. As a result, there is a high possibility of poor appearances such as a weld-mark, a flow mark and the occurrence of a sink mark. The insert block can be fixed or attached to the mold member of a metal or a metal alloy, which constitutes the mold, for example, with a thermosetting adhesive. When the insert block has a thickness of less than 0.1 mm, the insert block retains a nonuniform stress if the coating thickness of the adhesive is nonuniform. As a result, the surface of a molded article may have undulations, or the insert block may break under the pressure of an introduced molten resin into the cavity. When the insert block has a thickness of greater than 10 mm, the heat insulation effect of the insert block is large to excess, and it is therefore required to increase the cooling time of the resin in the cavity. Otherwise, the molded article may be deformed after it is released from the mold. There is therefore a problem in that the molding cycle is made long. The thickness of the insert block is 0.1 mm to 10 mm, preferably 0.5 mm to 10 mm, more preferably 2 mm to 5 mm.

When the first mold member and the second mold member are clamped to each other, the clearance ($C_{11}$, $C_{21}$, $C_{22}$, $C_{30}$, $C_{31}$ and $C_{32}$) is equal to, or less than, 0.03 mm, practically 0.001 mm to 0.03 mm (0.001 mm $\leq C_{11}$, $C_{21}$, $C_{22}$, $C_{30}$, $C_{31}$ and $C_{32} \leq 0.03$ mm), preferably 0.003 mm to 0.03 mm (0.003 mm $\leq C_{11}$, $C_{21}$, $C_{22}$, $C_{30}$, $C_{31}$ and $C_{32} \leq 0.03$ mm). The minimum value of the clearance can be set such that the peripheral portion of the insert block undergoes no fine cracking, or it can be set at a value to avoid the following problem. When the mold temperature is increased, the insert block expands to contact the insert block covering portion of the mold member, the covering plate or other insert block, so that a stress is exerted on fine cracks on the peripheral portion of the insert block to break the insert block. When the clearance ($C_{11}$, $C_{21}$, $C_{22}$, $C_{30}$, $C_{31}$ and $C_{32}$) is greater than 0.03 mm, there are problems that a molten resin penetrates a gap between the insert block and the insert block covering portion, between the insert block and the cover plate or between the first insert block and the second insert block to cause a cracking on the insert block and cause mold flashes on a molded article. There is another problem that the insert block is broken when a molded article is taken out from the mold.

When the amount ($\Delta S_{11}$, $\Delta S_{21}$, $\Delta S_{22}$, $\Delta S_{30}$, $\Delta S_{31}$, $\Delta S_{32}$) of the overlapping is less than 0.5 mm, a molten resin contacts fine cracks formed in the peripheral portion of the insert block to grow the cracks, so that the insert block is broken in some cases.

In the present invention, the material for constituting the insert block can be processed by a general grinding method so as to form an uneven surface or a curvature, and the insert block can be formed in almost any form if it is not specially complicated. The insert block can be produced by placing a ceramic powder or molten glass in a shaping mold, press-molding it and then, heat-treating the shaped product. Further, the insert block can be produced by placing plate-like glass on a tooling and allowing it to shape itself in a furnace.

When an uneven surface is formed on the insert block, it is required to grind edges of a concavo-convex portion with a diamond grinder in order to avoid the concentration of a stress thereon for preventing the breakage of the insert block caused by the contact of fine cracks formed in the edges with a molten resin. Otherwise, it is preferred to avoid the concentration of a stress by forming a curvature surface having a radius of 0.3 mm or less or a C-surface-processed surface (a surface chamfered at an angle of 45 degrees).

When there is no risk that the so-prepared insert block having a predetermined form drops from an insert block attaching portion of the mold member to be damaged at the time of disposing the insert block, or when the insert block can be disposed in the insert block attaching portion without any adhesive, the insert block can be directly disposed in the insert block attaching portion without any adhesive. Otherwise, the insert block may be bonded to the insert block attaching portion with a thermosetting adhesive such as an epoxy adhesive, a silicone adhesive, an urethane adhesive or acrylic adhesive. In some cases, the insert block may be fixed with a bolt. Further, an insert block attaching core provided with an insert block attaching portion may be attached to the mold member, and the insert block may be attached to the insert block attaching portion of the insert block attaching core.

The clearance (D) between the insert block attaching portion of the mold member and the insert block can be close to 0, while the clearance (D) is practically preferably 0.005 mm or more. The clearance (D) refers to a gap between the insert block attaching portion of the mold member and the insert block, measured along the cavity wall of the insert block. Although depending upon the coefficient of linear expansion of the material for constituting the insert block, it is sometimes difficult to prevent the breakage of the insert block caused by a difference in coefficients of linear expansion between the material for constituting the insert block attaching portion and the material for constituting the insert block when the clearance (D) is too small. The clearance (D) can be set such that the above problem does not take place. When the clearance (D) is too large, the position of the insert block deviates and the positional stability of the insert block against the insert block attaching portion is insufficient. As a result, the insert block may break. The clearance (D) is therefore preferably not greater than about 2 mm.

The material for constituting the insert block is required to have a thermal conductivity of $2 \times 10^{-2}$ cal/cm·sec·°C. or less for preventing rapid cooling of the molten thermoplastic resin in the cavity, or for preventing the occurrence of a sink mark on the surface of the molded article by inhibiting rapid cooling of the molten resin in the cavity. When the insert block is formed of a material having a thermal conductivity greater than the above value, the molten resin in the cavity is rapidly cooled by the insert block. As a result, the molded article of the thermoplastic resin can only have an appearance equivalent to that of a molded article produced by the use of a general mold formed of carbon steel or the like without an insert block.

The material for constituting the insert block used in the present invention may be ceramic selected from the group consisting of zirconia, alumina and titania, or glass selected from the group consisting of soda-lime glass, quartz glass, heat resisting glass and glass-ceramics. In particular, the material for constituting the insert block, the first insert block or the second insert block may be ceramic selected from the group consisting of $ZrO_2$, $ZrO_2$—CaO, $ZrO_2$—$Y_2O_3$, $ZrO_2$—$CeO_2$, $ZrO_2$—MgO, $ZrO_2$—$SiO_2$, $K_2O$—$TiO_2$, $Al_2O_3$, $Al_2O_3$—TiC, $Ti_3N_2$, $3Al_2O_3$—$2SiO_2$, MgO—$SiO_2$, $2MgO$—$SiO_2$, MgO—$Al_2O_3$—$SiO_2$ and titania. Further, the material for constituting the insert block, the first insert block or the second insert block is preferably ceramic of $ZrO_2$, $ZrO_2$—$Y_2O_3$ or $ZrO_2$—$CeO_2$, or glass-ceramics.

When the insert block is produced from glass-ceramics, the insert block is preferably produced from glass-ceramics having a crystallinity of at least 10%, preferably at least 60%, more preferably 70 to 100%. When the crystallinity is at least 10%, a crystal is uniformly dispersed in the whole of glass, and the glass is therefore remarkably improved in a heat shock strength and in interfacial debonding or delamination, so that the damage of the insert block at a molding time can be greatly decreased. When the crystallinity is less than 10%, an interfacial debonding or delamination is liable to occur on the surface of the insert block at a molding time. Preferably, the glass-ceramics for constituting the insert block has a coefficient of linear expansion of $1 \times 10^{-6}$/K or less, and the heat shock strength is at least 400° C.

The heat shock strength refers to a temperature at which a 100 mm×100 mm×3 mm sheet of glass breaks when it is heated to the temperature and then, placed in water at 25° C. The heat shock strength of 400° C. means that a 100 mm×100 mm×3 mm sheet of glass is not broken when it is heated to 400° C. and placed in water at 25° C. When heat resisting glass is measured for the above heat shock strength, it shows only about 180° C. Therefore, when a molten resin having a temperature (e.g., about 300° C.) higher than the above is brought into contact with the insert block, the insert block may be distorted and the insert block may break. The heat shock strength has something to do with the crystallinity of glass, and when the insert block is formed of glass-ceramics having a crystallinity of at least 10%, the breakage of the insert block at a molding time can be reliably prevented.

The glass-ceramics includes glass in which β-eucryptite type crystal and β-spodumene type crystal are formed as main crystal, obtained by adding a small amount of a nucleating agent such as $TiO_2$ and $ZrO_2$ to a raw material glass, melting the glass at a temperature of at least 1600° C., shaping it by a pressing, blowing, rolling or casting method, further heat-treating it for crystallization, and thereby growing a crystal of $Li_2O$—$Al_2O_3$—$SiO_2$ system in glass. Further, the glass-ceramics include glass obtained by melting CaO—$Al_2O_3$—$SiO_2$ glass at 1400 to 1500° C., placing it in water to pulverize it into small particles, integrating the particles, shaping the particles into the form of a plate on a refractory setter and heat-treating the shaped product to form a β-wollastonite crystal. Further, the glass-ceramics includes glass which a mica crystal is formed by heat-treating $SiO_2$—$B_2O_3$—$Al_2O_3$—MgO—$K_2O$—F glass and glass in which a cordierite crystal is formed by heat-treating MgO—$Al_2O_3$—$SiO_2$ glass.

In the above glass-ceramics, the amount of crystal particles in the glass matrix can be represented on the basis of an index of crystallinity. The crystallinity can be determined by measuring the glass-ceramics for amounts of a crystal phase and an amorphous phase with an analyzer such as an X-ray diffraction apparatus.

When the insert block is formed of ceramic, a convex form of a fine projected surface of the ceramic may be transferred to the surface of a molded article in some cases since the ceramic is porous. The glass-ceramics has fine crystal particles, the inter-particle adhesion thereof is excellent, and it is not porous. Therefore, the glass-ceramics has an advantage in that a mirror surface is easily formed as the surface of a molded article.

At least one thin layer may be formed on the surface of the insert block from the above material or metal compound by surface treatment method such as a sputtering method, an ion plating method or the like. In this case, pores of the ceramic can be filled, and a molded article can be further improved in surface properties. Preferably, the thickness of the above thin layer does not exceed 20 $\mu$m. When the above thickness exceeds 20 $\mu$m, the effect on heat insulation may decreases, the adhesion of the thin layer to the surface of the insert block may decrease, the thin layer may sag in a peripheral portion of the insert block, the thin layer may be damaged or the surface of the thin layer may undulate.

When a molded article is required to have a mirror surface property (definition), a surface roughness $R_y$ of the cavity wall (the surface which constitutes part of the cavity) of the insert block is preferably 0.03 $\mu$m or less. When the surface roughness is greater than 0.03 $\mu$m, the mirror surface property is insufficient, and the properties required of a molded article, e.g., surface smoothness (mirror surface property or definition), are sometimes not satisfied. For this purpose, the cavity wall of the insert block can be diamond-lapped to attain the surface roughness $R_y$ of 0.03 $\mu$m or less, and further, may be polished. The lapping can be carried out with a lapping machine. The lapping treatment is preferably carried out in the final producing step of the insert block. The glass-ceramics can form a mirror surface at a cost which is about half of the cost required for lapping general carbon steel, so that the cost of production of the mold assembly can be decreased. The surface roughness $R_y$ can be measured according to JIS B0601. For producing a molded article having a delustered surface or a hairlines surface, a fine uneven surface or hairlines can be formed on the cavity wall of the insert block by sand blast treatment or etching.

The method of manufacturing a molded article, provided by the present invention, includes an injection molding method, a blow molding method and a multi-color molding method which are generally used for molding a thermoplastic resin, and an injection molding method is the most preferred.

In some cases, the mold assembly of the present invention may have a structure in which the volume of the cavity is variable in the production of a molded article. For this purpose, for example, a core member which can be moved by means of, for example, a hydraulic cylinder may be provided to the molded assembly.

In the method of manufacturing a molded article of a thermoplastic resin by means of a mold assembly having the above structure, provided by the present invention, there may be employed a method in which the first mold member and the second mold member are clamped and the position of the core member is controlled, so as to have a cavity volume ($V_c$) greater than the volume ($V_M$) of a molded article to be produced, a molten thermoplastic resin is introduced into the above cavity (volume $V_c$), and then, the core member is moved to decrease the volume of the cavity to the volume ($V_M$) of the molded article before the initiation of the introduction of the thermoplastic resin, concurrently with the said initiation, during the introduction or after completion of the introduction. The point of time when the volume of the cavity becomes the volume ($V_M$) of the molded article may be set so as to be a point of time during the introduction of a thermoplastic resin or after the completion of the introduction (including a point of time when the introduction is just completed).

In the above clamping of the mold, the relationship between the volume ($V_M$) of a molded article to be produced and the cavity volume ($V_c$) preferably satisfies 0.1 mm$\leq \Delta t \leq$6 mm, wherein $\Delta t = t_1 - t_0$ in which $t_0$ is a thickness of the molded article and $t_1$ is a distance of the cavity in the thickness direction of the molded article in the mold clamping. When $\Delta t < 0.1$ mm, it is sometimes difficult to produce a molded article from a molten thermoplastic resin having a poor fluidity, and it is difficult to decrease a stress which is to remain in the molded article. When $\Delta t > 6$ mm, air may be included in a molded article and the molded article may be degraded in quality.

In the method of manufacturing a molded article of a thermoplastic resin, provided by the present invention, a hollow portion may be formed inside a thermoplastic resin in a cavity by further providing the mold assembly with a pressurized-fluid introducing device and introducing a pressurized fluid into the molten thermoplastic resin introduced into the cavity. The pressurized-fluid introducing device may be disposed in a pressurized-fluid introducing device attaching portion which is inside a molten resin injection nozzle of an injection molding machine, a molten thermoplastic resin introduction portion of a mold member (e.g., inside a gate portion) or a mold member and is opened to the cavity, depending upon the form of a molded article to be produced. The introduction of the pressurized fluid into the molten thermoplastic resin in the cavity can be initiated during the introduction of the molten thermoplastic resin or concurrently with or after completion of the introduction. It is preferred to continue the introduction of the pressurized fluid into the resin in the cavity until after the resin is cooled to solidness. The molten thermoplastic resin may be introduced into the cavity in such an amount that the cavity is completely filled with the molten thermoplastic resin, or it may be introduced in such an amount that the cavity is insufficiently filled with it.

The above fluid is preferably a substance which is in a gaseous or liquid state at room temperature under atmospheric pressure and which is neither reactive, nor mixable, with the molten thermoplastic resin when it is introduced into the molten thermoplastic resin. Specific examples of the above fluid include substances in a gaseous state at room temperature such as nitrogen gas, carbon dioxide gas, air and helium, liquids such as water, and gases liquefied under elevated pressure. of these, an inert gas such as nitrogen gas or helium gas is preferred. The pressurized fluid is more preferably an inert pressurized fluid which does not cause burning on a hollow portion of a molded article by adiabatic compression. When nitrogen gas is used, it is preferred to use a nitrogen gas having a purity of at least 90%. Further, a foaming resin, a fiber-reinforced resin material or the like may be used as a pressurized fluid. In this case, the hollow portion is filled with the foaming resin, the fiber-reinforced resin material or the like, and in the present invention, the hollow portion conceptually includes such a structure.

The thermoplastic resin in the present invention can be selected from all of generally used thermoplastic resins. Specifically, the thermoplastic resin includes amorphous thermoplastic resins and crystalline thermoplastic resins. Examples of the amorphous thermoplastic resins include styrene-containing resins such as a polystyrene resin, an ABS resin, an AES resin and an AS resin; a methacrylic resin; a polycarbonate resin; a modified PPE resin; a polyarylate resin; and a polyester carbonate resin. Examples of the crystalline thermoplastic resins include polyolefin resins such as a polyethylene resin and a polypropylene resin; polyamide resins such as polyamide-6, polyamide-66 and polyamide MXD6; a polyoxymethylene (polyacetal) resin; polyester resins such as a polyethylene terephthalate (PET) resin and a polybutylene ethylene terephthalate (PBT) resin; a polyphenylene sulfide resin; a polysulfone resin; a polyether sulfone resin; a polyetherimide resin; a polyamideimide resin; a polyimide resin; a polyether ketone resin; a polyether ether ketone resin; and a liquid crystalline polymer.

A crystalline thermoplastic resin gives the molded article improved in hardness and elasticity since it has an increased density and melting point when crystallized. A crystalline thermoplastic resin is characteristically excellent in chemical resistance since water, a dye and a plasticizer scarcely penetrate its crystal structure. In manufacturing a molded article by molding a crystalline thermoplastic resin, generally, there is employed a method in which the mold temperature is set at a level considerably lower than the deflection temperature of the crystalline thermoplastic resin under load in advance so as to promote the cooling and solidifying of the molten crystalline thermoplastic resin introduced into the cavity of the mold. A conventional mold has an excellent thermal conductivity since it is produced from a metal material. When a mold of a metal material is used and when the mold temperature is set at a level considerably lower than the deflection temperature of a crystalline thermoplastic resin under load as described above, the molten crystalline thermoplastic resin introduced into the cavity begins to be cooled as soon as it is brought into contact with the cavity wall of the mold. As a result, an amorphous layer or a thin low-crystallinity layer is formed as a surface of the molded article. Such a layer is generally called a skin layer. The molded article having the skin layer has a problem that it is greatly degraded in surface properties. For example, a molded article formed of a polyoxymethylene resin (polyacetal resin) as a crystalline thermoplastic resin is very poor in resistance to frictional wear and abrasion and weatherability. Further, the transfer of the cavity wall of the mold on the surface of a molded article is also poor, and a sink mark arises on the surface of the molded article.

In the method of manufacturing a molded article of a thermoplastic resin according to the first to fifth aspects of the present invention, the molten thermoplastic resin introduced into the cavity is not rapidly cooled. Even when a crystalline thermoplastic resin is used, therefore, there is caused no decrease in the crystallinity of the resin, the resin surface of a molded article has a high crystallinity, and a decrease in the resin surface properties such as cracking caused by the deterioration of the resin can be prevented.

In the manufacturing method according to the first to fifth aspects of the present invention, a polymer alloy material may be used as a thermoplastic resin. The polymer alloy material includes a blend of at least two thermoplastic resins and a block or graft copolymer in which at least two thermoplastic resins are chemically bound. The polymer alloy material is widely used as a highly functional material having characteristic performances of individual thermoplastic resins. The thermoplastic resins as components for the polymer alloy material which is a blend of at least two thermoplastic resins include styrene resins such as a polystyrene resin, an ABS resin, an AES resin and an AS resin, polyolefin resins such as a polyethylene resin and a polypropylene resin, a methacrylic resin, a polycarbonate resin, polyamide resins such as polyamide 6, polyamide 66 and polyamide MXD6, a modified PPE resin, polyester resins such as a polybutylene terephthalate resin and a polyethylene terephthalate resin, a polyoxymethylene resin, a polysulfone resin, a polyimide resin, a polyphenylene sulfide resin, a polyarylate resin, a polyether sulfone resin, a polyether ketone resin, a polyether ether ketone resin, a polyester carbonate resin, a liquid crystalline polymer and an elastomer. A polymer alloy material of a blend of a polycarbonate resin and an ABS resin is a polymer alloy material which is a blend of two thermoplastic resins. The polymer alloy material of a polycarbonate resin and an ABS resin will be described as polycarbonate resin/ABS resin. A polymer alloy material of at least two thermoplastic resins will be similarly described hereinafter. The polymer alloy material which is a blend of at least two thermoplastic resins includes polycarbonate resin/PET resin, polycarbonate resin/PBT resin, polycarbonate resin/polyamide resin, polycarbonate resin/PBT resin/PET resin, modified PPE resin/HIPS resin, modified PPE resin/polyamide resin, modified PPE resin/PBT resin/PET resin, modified PPE resin/polyamide MXD6 resin, polyoxymethylene resin/polyurethane resin, PBT resin/PET resin, and polycarbonate resin/liquid crystalline polymer. The polymer alloy material which is a block or graft copolymer obtained by chemically binding at least two thermoplastic resins includes an HIPS resin, an ABS resin, an AES resin and an AAS resin.

The method of manufacturing a molded article of a thermoplastic resin according to the present invention can effectively prevent the occurrence of defective appearances (non-uniformity in color and cloudiness) which are phenomena characteristic of a polymer alloy material which is a blend of an amorphous thermoplastic resin and a crystalline thermoplastic resin. That is, a molded article formed of a polymer alloy material generally has the following problems. The molded article is poor in appearance (particularly gloss). In particular, that portion of the molded article which increases or decreases in thickness or a weld portion of the molded article is liable to have a poor appearance. What causes the above is related to the material of a mold. As explained above, generally, the mold is formed from a metal material, which has a good thermal conductivity. A molten polymer alloy material introduced into the cavity starts to be cooled on being brought into contact with the cavity wall of the mold. As a result, a solidification layer is formed in the molten polymer alloy material, which causes poor transfer, poor gloss or a sink mark. In the present invention, the molten polymer alloy material is not rapidly cooled when introduced into the cavity. As a result, not only the occurrence of a sink mark can be prevented, but also the molded article is remarkably improved in gloss, and the molded article excellent in mirror surface properties can be easily obtained.

Further, the thermoplastic resin may contain a stabilizer, an ultraviolet light absorbent, a mold releasing agent, a dye and a pigment. Furthermore, the thermoplastic resin may contain an inorganic fiber or filler or an organic filler such as glass beads, mica, kaolin and calcium carbonate.

The manufacturing method of the present invention may use a thermoplastic resin containing 5 to 80% by weight of an inorganic fiber. When much importance is placed on the strength of a molded article, the inorganic fiber preferably has an average length of 5 μm to 5 mm, preferably 10 μm to 0.4 mm. When much importance is placed on definition (mirror surface properties), the inorganic fiber preferably has an average length of 5 μm to 0.4 mm, preferably 5 μm to 0.2 mm, more preferably 5 μm to 0.1 mm. In these cases, the inorganic fiber preferably has an average diameter of 0.01 μm to 15 μm, preferably 0.1 μm to 13 μm, more preferably 0.1 μm to 10 μm.

In a prior art method of manufacturing a molded article of a thermoplastic resin containing an inorganic fiber, inorganic fibers are deposited on a surface of a molded article, and as a result, there is liable to be caused a problem that the appearance of the molded article is poor or that the definition (mirror surface properties) is degraded. It has been therefore difficult to use a thermoplastic resin containing an inorganic fiber for producing a molded article which is required to have excellent appearance properties and definition. The phenomenon of deposition of inorganic fibers on a surface of a molded article is observable as an emergence of inorganic fibers on the surface of the molded article. For overcoming the problem of deposition of inorganic fibers on the surface of the molded article, prior art has employed a method in which a molten resin is improved in fluidity by decreasing the viscosity of a thermoplastic resin. However, when the content of the inorganic fiber is increased, it is difficult to prevent the deposition of inorganic fibers on the surface of the molded article. It has been therefore difficult to apply a thermoplastic resin containing an inorganic fiber to a molded article which is required to have excellent appearance properties in spite of its excellent performances. The cause of deposition of inorganic fibers on a surface of a molded article when the inorganic fiber content increases has some relations with the material of a mold. Since a mold is generally produced from a metal material having a good thermal conductivity, a molten resin containing an inorganic fiber, introduced into a cavity, starts to be instantaneously cooled as soon as it is brought into contact with the cavity wall of the mold. As a result, a solidification layer is formed in the molten resin contacting the cavity wall of the mold, and not only a sink mark is caused, but also inorganic fibers are deposited. Moreover, there is caused another problem that transfer of the cavity wall of the mold on the surface of the molded article is insufficient. In the present invention, since the molten thermoplastic resin introduced into the cavity is not rapidly cooled, no solidification layer is formed in the molten resin contacting the cavity wall of the mold, and the occurrence of a sink mark and the deposition of inorganic fibers can be reliably prevented.

The content of the inorganic fiber in the thermoplastic resin (i.e., the amount of the inorganic fiber added to the thermoplastic resin) may be in the range sufficient to form a molded article which can satisfy a required flexural modulus (e.g., at least 3.0 GPa when the molded article is measured according to ASTM D790). The upper limit of content of the inorganic fiber exists just before the content found when the flowability of the molten thermoplastic resin in the cavity is too low to mold the thermoplastic resin or when a molded article having an excellent mirror surface property can be no longer produced. Specifically, when the thermoplastic resin is a crystalline thermoplastic resin, the above upper limit is about 80% by weight. When the thermoplastic resin is an amorphous thermoplastic resin, the above upper limit may be about 50% by weight since the flowability of the molten amorphous thermoplastic resin is lower than that of the molten crystalline one. When the above content is less than 5% by weight, the flexural modulus, elastic modulus and coefficient of linear expansion required of a molded article cannot be obtained. When the above content exceeds 80% by weight, the production of a molded article by molding is difficult since the flowability of the molten thermoplastic resin decreases, or no molded article having an excellent mirror surface property may be produced.

When the inorganic fiber has an average length of less than 5 μm or when the inorganic fiber has an average diameter less than 0.01 μm, no molded article having the flexural modulus required can be obtained. When the inorganic fiber has an average length of more than 5 mm, or when the inorganic fiber has an average diameter of more than 15 μm, there is a problem that the surface of the molded article is no longer a mirror surface.

The inorganic fiber having an average length and an average diameter in the above ranges is preferably surface-treated with a silane-coupling agent or the like, and compounded with a thermoplastic resin, and the compound is pelletized to form a molding material. The thus-obtained molding material is molded, and the mold assembly in which the insert block is incorporated is used for the molding, or the mold temperature is controlled depending upon a thermoplastic resin used, whereby there can be obtained a molded article having a high rigidity, a high elastic modulus, a low coefficient of linear expansion and a high deflection temperature under load (heat resistance) and having an excellent mirror surface property (definition), or having no sink mark.

The inorganic fiber used is preferably at least one member selected from the group consisting of a glass fiber, a carbon fiber, wollastonite, an aluminum borate whisker fiber, a potassium titanate whisker fiber, a basic magnesium sulfate whisker fiber, a calcium silicate whisker fiber and a calcium sulfate whisker fiber. These inorganic fibers may be used alone or in combination.

The average length of the inorganic fiber refers to a weight-average length. The inorganic fiber can be measured for a length as follows. Molding pellets containing an inorganic fiber or a molded article are/is dipped in a liquid in which the resin component of the thermoplastic resin is soluble. When the inorganic fiber is a glass fiber, the resin component is combusted at 600° C. or higher. The residual inorganic fibers are observed through a microscope, etc. Generally, a photograph of the inorganic fibers is taken, and inorganic fibers are manually measured for a length, or an apparatus specialized for measuring a fiber length is used. A number-average length is affected by finely broken fibers to a great extent, and it is therefore preferred to use a weight-average length. In the measurement of a weight-average length, fragments of the inorganic fibers crushed too finely are removed. When the length of the inorganic fiber is smaller than the size which is twice as large as the nominal diameter of the inorganic fiber, the measurement is difficult. Therefore, for example, inorganic fibers having a length at least twice as large as the nominal diameter are measured.

The molded article obtained from the thermoplastic resin containing an inorganic fiber by the manufacturing method of the present invention may constitute a door handle of an automobile. The door handle of an automobile is required to have the physical property values shown in Table 4. For satisfying the properties shown in Table 4, it is preferred to use a thermoplastic resin containing an inorganic fiber which satisfies requirements shown in Table 5. The door handle of an automobile comprises a body member fixed to a door, and a handle member connected to the body member with a spring or a fixing part. The door handle of an automobile includes an outside door handle of slide type (pull-up type) or push-button type with an outside hinge or an inside hinge, and an inside door handle of slide type housed in a door trim.

TABLE 4

| | |
|---|---|
| Flexural modulus: | at least 5.0 GPa, preferably 5 to 25 GPa |
| Coefficient of linear expansion: | $3.0 \times 10^{-5}$/K or less, preferably 0.5 to $3.0 \times 10^{-5}$/K |
| Deflection temperature under load: | at least 140° C. |
| Definition: | at least 85% |

TABLE 5

| | |
|---|---|
| Average length: | 5 µm to 400 µm, preferably 5 µm to 70 µm |
| Average diameter: | 0.01 µm to 15 µm, preferably 0.1 µm to 10 µm |
| Content: | 15 to 80% by weight, preferably 20 to 60% by weight |

The method of manufacturing a molded article of a thermoplastic resin containing an inorganic fiber, provided by the present invention, may further include the step of forming a light reflection thin film on at least part of the surface of the molded article. The thickness of the light reflection thin film can be a thickness sufficient for effectively reflecting light. The thickness of the light reflection thin film is at least 50 nm, preferably 50 nm to 500 nm, more preferably 100 nm to 300 nm. When the above thickness is less than 50 nm, the definition is sometimes insufficient. When it is over 500 nm, the surface smoothness of a molded article is decreased to cause a problem in the definition in some cases. The material for the light reflection thin film includes metals such as gold, platinum, silver, chromium, nickel, phosphorus—nickel, aluminum, copper, beryllium, beryllium—copper and zinc, metal compounds of these, and alloys of these metals. The method of forming the above thin film includes PVD (Physical Vapor Deposition) methods such as;

(a) vacuum deposition methods such as an electron beam heating method, a resistance heating method and a flash deposition method, (b) a plasma deposition method, (c) sputtering methods such as a bipolar sputtering method, a direct-current sputtering method, a direct-current magnetron sputtering method, a high-frequency sputtering method, a magnetron sputtering method, an ion-beam sputtering method and a bias sputtering method, and (d) ion plating methods such as a DC (direct current) method, an RF method, a multi-cathode method, an activation reaction method, an HCD (hollow cathode discharge) method, an electric field deposition method, a high-frequency ion-plating method and a reactive ion-plating method.

From the viewpoint of the definition and cost, it is the most preferred to form the light reflection thin film by vacuum-depositing aluminum.

A mirror is one type among the molded articles obtained by the above method. That is, the molded article is a constituent of a mirror. Specifically, the mirror includes mirrors of an automobile such as an inside rear-view mirror, a wing mirror, a fender mirror, a mirror inside a speed meter; a roof mirror (roof prism) of a camera; an optical mirror of a copying machine and a polygonal mirror of a laser beam printer. A mirror part or a molded article for constituting a mirror is required to have physical property values shown in Table 6. The value of definition in Table 6 is for a mirror part (a molded article before formation of a light reflection thin film on its surface). For satisfying the physical property values, it is preferred to use a thermoplastic resin containing an inorganic fiber which satisfies requirements shown in Table 7. When a mirror formed of a molded article and a light reflection thin film is manufactured according to the method of manufacturing a molded article of a thermoplastic resin, provided by the present invention, the mass producibility of mirrors is excellent over that of glass mirrors manufactured according to a conventional method, and assembly portion(s) can be integrally produced by molding. Therefore, it can be expected to decrease the number of parts and decrease their production cost.

TABLE 6

| | |
|---|---|
| Flexural modulus: | at least 5.0 GPa |
| Coefficient of linear expansion: | $3.0 \times 10^{-5}$/K or less |
| Deflection temperature under load: | at least 100° C. |
| Definition: | at least 85% |

TABLE 7

| | |
|---|---|
| Average length: | 5 to 100 µm, preferably 5 to 70 µm |
| Average diameter: | 0.01 to 15 µm, preferably 0.1 to 10 µm |
| Content: | 15 to 80% by weight |

A reflector is another type among the molded articles obtained by the above method. That is, the molded article is a constituent of a reflector. Specific examples of the reflector are those included in a head lamp, a turn lamp, a searchlight, a rotating lamp and an emergency lamp. The molded article constituting a reflector part (a molded article before formation of a light reflection thin film on its surface) is required to have physical property values shown in Table 8. For satisfying the physical property values, it is preferred to use a thermoplastic resin containing an inorganic fiber which satisfies requirements shown in Table 9. When a reflector formed of a molded article and a light reflection thin film is manufactured according to the method of manufacturing a molded article of a thermoplastic resin, provided by the present invention, the mass producibility of reflectors is excellent over that of reflectors manufactured from glass or a thermosetting resin according to a conventional method, and assembly portion(s) can be integrally produced by molding. Therefore, it can be expected to decrease the number of parts and decrease their production cost. Further, the thus-obtained reflector is free from deformation caused by heat and its thermal expansion amount is also very small.

TABLE 8

| | |
|---|---|
| Coefficient of linear expansion: | $3.0 \times 10^{-5}$/K or less, preferably 0.5 to $3.0 \times 10^{-5}$/K |
| Deflection temperature under load: | at least 140° C., preferably 140 to 260° C. |

TABLE 9

| | |
|---|---|
| Average length: | 5 to 100 µm, preferably 5 to 70 µm |

TABLE 9-continued

| | |
|---|---|
| Average diameter: | 0.01 to 15 μm, preferably 0.05 to 13 μm, more preferably 0.1 to 10 μm |
| Content: | 15 to 80% by weight |

The method of manufacturing a molded article of a thermoplastic resin containing an inorganic fiber, provided by the present invention, may further include the step of forming a coating on at least part of the surface of the molded article. The coating is preferably formed of at least one coating composition selected from the group consisting of an acrylic coating composition, an urethane coating composition and an epoxy coating composition. After the surface of the molded article is dusted off, a coating may be formed on at least part of the surface of the molded article by applying a coating composition to the surface of the molded article by a brushing, spraying, electrostatic coating or dipping method and by drying the resultant coating. Since the molded article obtained by the method of the present invention has little residual stress, the molded article is almost free from cracking caused by the application of the coating composition to the molded article. Further, since the molded article obtained by the method of the present invention has an excellent definition, and the molded article to which the coating composition is applied still has an appearance excellent in definition. It is preferred to use a coating composition having a curing temperature which does not exceed the deflection temperature of the thermoplastic resin under load, as a raw material. An exterior member of an automobile is one type among molded article obtained by the above method. That is, the molded article is to constitute an exterior member of an automobile. Specific examples of the molded article include a front fender, a rear fender, a door, a bonnet, a roof and a trunk hood. The molded article as an exterior member of an automobile is required to have the following physical property values shown in Table 10. For satisfying the physical property values, it is preferred to use a thermoplastic resin containing an fiber which satisfies the following requirements shown in Table 11. A coating may be formed on at least part of the surface of the above-mentioned door handle of an automobile.

TABLE 10

| | |
|---|---|
| Flexural modulus: | at least 4.0 GPa, preferably at least 4.5 GPa |
| Coefficient of linear expansion: | $4.0 \times 10^{-5}/K$ or less preferably $3.5 \times 10^{-5}/K$ or less |
| Deflection temperature under load: | at least 100° C., preferably at least 110° C. |

TABLE 11

| | |
|---|---|
| Average length: | 5 to 400 μm, preferably 5 to 200 μm |
| Average diameter: | 0.01 to 15 μm, preferably 0.1 to 10 μm |
| Content: | 15 to 80% by weight, preferably 20 to 60% by weight |

The method of manufacturing a molded article of a thermoplastic resin containing an inorganic fiber, provided by the present invention, may further include the step of forming a hardcoating on at least part of the surface of the molded article. The hardcoating is preferably at least one member selected from the group consisting of an acrylic hardcoating, an urethane hardcoating and a silicone hardcoating. After the surface of the molded article is dusted off, a hardcoating can be formed on at least part of the surface of the molded article by applying a solution selected from an acrylic, urethane or silicone hardcoating solution to the surface of the molded article by a dipping, flow-coating or spraying method, and by drying the resultant hardcoating to solidness. The thickness of the hardcoating on the surface of the molded article is 1 μm to 30 μm, preferably 3 μm to 15 μm. When the thickness of the hardcoating is less than 1 μm, the hardcoating is poor in durability. When it exceeds 30 μm, the hardcoating is liable to undergo cracking. When the adhesion between the hardcoating and the molded article is insufficient, the adhesion can be increased by applying a primer coating to the molded article before a top coating is formed. Since the molded article has little residual strain, almost no cracking caused by the formation of the hardcoating occurs on the molded article. Further, the surface of the molded article obtained according to the present invention is excellent in definition, and the molded article on which a hardcoating is formed still has an appearance excellent in definition. A pillar for an automobile such as a front pillar, a center pillar or a rear pillar is one type among molded articles obtained by the above method. The molded article constituting a pillar part (a molded article before formation of a hardcoating on its surface) is required to have physical property values shown in Table 12. For satisfying the physical property values, it is preferred to use a thermoplastic resin containing an inorganic fiber which satisfies requirements shown in Table 13.

TABLE 12

| | |
|---|---|
| Flexural modulis: | at least 4.0 GPa |
| Coefficient of linear expansion: | $4.0 \times 10^{-5}/K$ or less |
| Deflection temperature under load: | at least 100° C. |

TABLE 13

| | |
|---|---|
| Average length: | 5 to 400 μm, preferably 5 to 200 μm |
| Average diameter: | 0.01 to 15 μm, preferably 0.1 to 10 μm |
| Content: | 15 to 80% by weight, preferably 20 to 60% by weight |

The method of manufacturing a molded article of a thermoplastic resin according to the present invention may use a thermoplastic resin containing a metal powder having an average particle diameter of 0.1 μm to 1 mm, preferably 0.2 μm to 0.5 mm, or metal flakes having an average thickness of 0.1 μm to 200 μm, preferably 1 μm to 150 μm and having a greater average outer diameter than the average thickness, in an amount of 0.01 to 80% by weight, preferably 0.1 to 60% by weight, more preferably 1 to 50% by weight.

A molded article of a thermoplastic resin having a metallic color has a smaller weight than a metal part and has a metallic appearance, and it is used as one of various automobile parts or parts of industrial products. Generally, a molded article is imparted with a metallic color by coating the molded article with a coating composition containing metal particles which give a metallic color or kneading metal particles which give a metallic color with a resin as a raw material. A metallic appearance can be relatively easily formed on a molded article by coating the molded article regardless of the size of metal particles contained in a coating composition. For imparting a molded article with depth in appearance, there is a problem that it is required to apply another clear coating composition, which increases production steps in number. On the other hand, in the method of kneading metal particles with a resin as a raw material, metal particles having a small diameter are liable to give a molded article in cloudy gray, and it is difficult to impart a molded article with a metallic appearance. Further, there is another problem that when metal particles having a large diameter are used, a molded article has an intensely glistening appearance since metal particles are deposited on the surface of the molded article. It is therefore required to define the diameter of the metal particles. Even in this case, it is not so possible to impart a molded article with a color having depth in appearance as in a molded article to which a clear coating is applied. Under the circumstance, a clear coating is applied even to a molded article obtained from a kneaded mixture of a resin as a raw material and metal particles in order to impart the molded article with a color having depth in appearance. It is because metal particles are deposited on the surface of a molded article to form an uneven surface that depth in appearance of the molded article cannot be obtained by any prior art method. This phenomenon has a relation to the material of a mold. In a prior art technique, a mold is formed of a metal material having a good thermal conductivity, and a molten resin introduced into a cavity begins to be cooled as soon as it contacts the cavity wall of the mold. As a result, a solidification layer is formed in the molten resin containing metal particles, and metal particles are deposited on the surface of the molded article, which results in a poor gloss. In the present invention, the thermoplastic resin introduced into the cavity is not rapidly cooled, and no solidification layer is formed in the molten resin which contacts the cavity wall of the mold, and therefore, no metal particles are deposited on the surface of the molded article. Causing a poor gloss can be therefore reliably prevented.

When the content of the metal powder or the metal flakes is less than 0.01% by weight, the molded article has an insufficient metallic color tone. When the above content exceeds 80% by weight, the molded article has nothing but a glaring appearance, or the metal particles or metal flakes are deposited on the surface of the molded article, and it is very difficult to impart the surface of the molded article with a deep and glossy appearance. When the average particle diameter of the metal powder is less than 0.1 $\mu$m, no deeply and glossily metallic appearance is obtained. When the above average particle diameter exceeds 1 mm, metal particles are easily deposited on the surface of the molded article, and no deep or glossy appearance is obtained. When metal flakes having an average thickness of less than 0.1 $\mu$m are used, the metal flakes undergo cracking when kneaded with the resin, and the molded article shows a degraded metallic color tone. When the above average thickness exceeds 200 $\mu$m, metal flakes are easily deposited on the surface of the molded article, and it is therefore difficult to impart the surface of the molded article with a deep and glossy appearance. Further, when the average outer diameter of the metal flakes is smaller than the average thickness, it is difficult to impart the surface of the molded article with a deep and glossy appearance.

The metal powder can be measured for an average particle diameter, and the metal flakes can be measured for an average thickness and an average outer diameter, with an image analysis apparatus. When the metal powder or the metal flakes are contained in a resin, the resin is carbonized or is dissolved in a solvent and then, the metal powder can be measured for an average particle diameter, or the metal flakes can be measured for an average thickness and an average outer diameter.

The metal of the metal powder and the metal flakes includes gold, silver, platinum, copper, aluminum, chromium, iron, nickel, and compounds and alloys of these metals. A chromium oxide powder or an aluminum powder is particularly preferred as a metal powder, or aluminum flakes are particularly preferred as metal flakes, for obtaining a metallic color tone with a deep and glossy appearance or in view of a cost or an aesthetical appearance.

In the above embodiments, the thermoplastic resin may contain an inorganic fiber in an amount of 1 to 50% by weight, preferably 5 to 40% by weight. In this case, the total content of the metal powder or the metal flakes and the inorganic fiber is preferably 50% by weight or less. The inorganic fiber includes a glass fiber, glass beads, a carbon fiber, wollastonite, an aluminum borate whisker fiber, a potassium titanate whisker fiber, a basic magnesium sulfate whisker fiber, a calcium silicate whisker fiber and a calcium sulfate whisker fiber. When the content of the inorganic fiber is too small, a molded article may have insufficient strength in some cases. When the content of the inorganic fiber exceeds 50% by weight, inorganic fibers may be deposited on a surface of a molded article.

For preventing the distortion of a molded article caused by the shrinkage of a molded resin, generally, it is preferred to make a temperature difference between the first and second mold members the smallest possible by considering the thermal conductivity and the thickness of the first and second mold members and the insert block. Particularly when plastic which is excellent in heat resistance and strength but is poor in moldability, such as engineering plastic or super-engineering plastic, is used, generally, it is molded at a mold temperature of at least 80° C., and defects in appearance such as a sink mark and a flow mark occur in many cases. However, the mold assembly of the present invention gives a heat insulation effect, and there can be obtained a molded article having an excellent appearance free of a sink mark even if the mold temperature was set at 80° C. or less. Further, when a thermoplastic resin containing a metal powder or metal flakes is used, the phenomenon of these materials being deposited on a surface of a molded article does not occur, and there can be also obtained a molded article excellent in appearance properties such as mirror surface property. This is because the flowability and the transfer performance of a molten thermoplastic resin can be improved since the cooling and solidification of the molten thermoplastic resin introduced into the cavity can be delayed with the insert block. Or, the rapid cooling of the molten resin which is introduced into the cavity and brought into contact with the insert block can be prevented by means of the insert block and by controlling the mold temperature depending upon a thermoplastic resin to be used, and as a result, the cooling and solidification of the molten resin introduced into the cavity can be delayed, so that the occurrence of a sink mark can be prevented and the flowability and the transfer performance of the molten resin can be improved. For example, when a mold made of carbon steel is used to manufacturing a molded article of a polyoxymethylene resin as a crystalline thermoplastic resin at a mold temperature of 100° C., the surface of the molded article has an amorphous skin layer having a thickness of about 50 $\mu$m. On the other hand, in the method of manufacturing a molded article of a thermoplastic resin according to the present invention, it has been found that no skin layer is formed on a molded article even at the same mold temperature and that the mold article shows remarkably improved abrasion resistance and weatherability. For example, when a mold made of carbon steel is used to manufacturing a molded article of a polymer alloy material at a mold temperature of 80° C., the thus-obtained molded article has a poor gloss on the surface. In contrast, it has been found that a molded article obtained by the method of manufacturing a molded article of a thermoplastic resin according to the present invention has a excellent gloss on the surface even when the mold temperature is similarly set at 80° C.

Further, since the flowability of a molten thermoplastic resin is improved, the pressure for introducing the molten thermoplastic resin into the cavity can be set at a lower level, to decrease the residual stress in the molded article. As a result, the molded article is improved in quality. Further, decreasing the injection pressure leads to a decrease in the thickness of the mold member and a decrease in the size of the molding machine, which finally leads to a decrease in the production cost of molded articles.

The insert block used in the present invention is produced from a material having a low coefficient of heat expansion. Further, it is produced independently of the mold member and disposed inside the mold member. Therefore, the insert block not only has a high heat insulation effect but also is easy to maintain. The insert block formed of glass-ceramics has a low coefficient of linear expansion and high heat shock strength, and it is therefore almost free of breakage and cracking.

The mold assembly of the present invention has a high heat insulation effect based on the insert block and therefore can prevent the rapid cooling of the molten thermoplastic resin introduced into the cavity, so that the occurrence of poor appearances such as a weld-mark, a flow mark and a sink mark can be effectively prevented. Further, since the insert block is maintained with the insert block covering portion or the cover plate in the ranges of the predetermined clearance or the amount of the overlapping, the appearance of end portions of the molded article is not impaired, nor do mold flashes occur on the end portions of the molded article. Further, since the molten thermoplastic resin is not brought into contact with fine crazes remaining on the peripheral portion of the insert block, the breakage of the insert block can be prevented.

In the method of manufacturing a molded article of a thermoplastic resin according to the present invention, the rapid cooling of the molten thermoplastic resin introduced into the cavity can be alleviated by means of the mold assembly provided with the insert block having heat insulation properties. Therefore, the molded article having excellent mirror surface properties can be reliably and easily produced even at a low mold temperature, and the formation of a solidification layer or a skin layer can be prevented. Further, the method of manufacturing a molded article of a thermoplastic resin according to the present invention enables the production of a molded article from a molten thermoplastic resin having poor flowability. Further, the pressure for the introduction of the molten thermoplastic resin can be decreased, and as a result, the pressure exerted on the insert block can be decreased, which leads to the effective prevention of the deformation and breakage of the insert block. Moreover, the residual stress in the molded article can be further decreased, and there can be produced a high-quality molded article.

In molding, further, the surface of the molded article can be uniformly compressed by means of the mold assembly structured so as to have a variable cavity volume, and therefore, the occurrence of a sink mark on the surface of the molded article can be prevented. In the method of manufacturing a molded article of a thermoplastic resin according to the present invention, a pressurized fluid can be introduced into the molten thermoplastic resin in the cavity, and in this case, the resin in the cavity is pressed toward the cavity wall. As a result, the occurrence of a sink mark on the surface of the molded article can be reliably prevented. Furthermore, since the cooling and solidification of the molten resin which contacts the insert block are delayed, the phenomenon that a resin which starts to be solidified in the vicinity of the cavity wall constituted of the insert block and an inside resin are mixed with each other can be avoided, and there can be avoided the occurrence of color non-uniformity or a defective appearance on the surface of the molded article in the vicinity of a thick-wall portion of the molded article.

BRIEF DESCRIPTION OF THE DRAWINGS

The present invention will be explained on the basis of Examples with reference of drawings hereinafter.

DESCRIPTION OF THE PREFERRED EMBODIMENTS

EXAMPLE 1

Figure 1A:
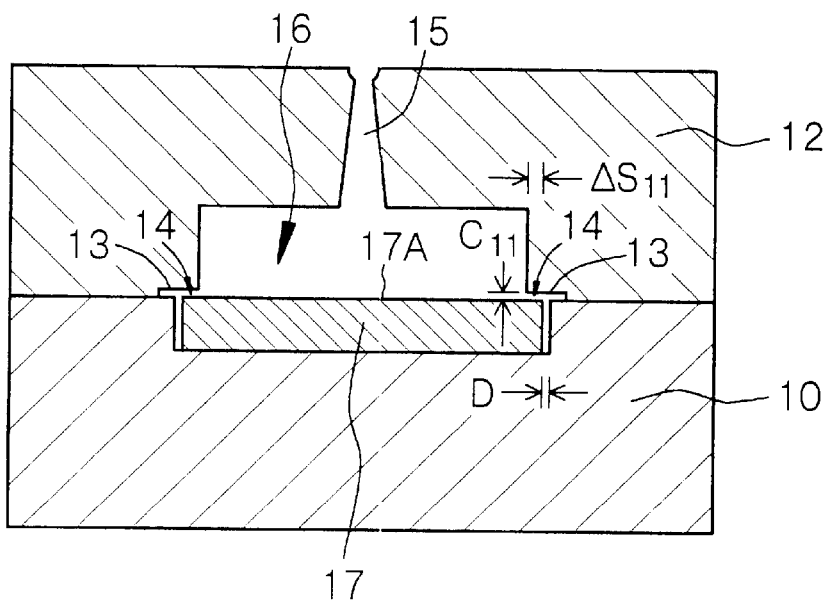
FIGS. 1A, 1B and 1C are a schematic cross-sectional view of a mold assembly for molding a thermoplastic resin in Example 1 at a time of claming and schematic cross-sectional views of the mold assembly during its assembling.
Figure 1B:
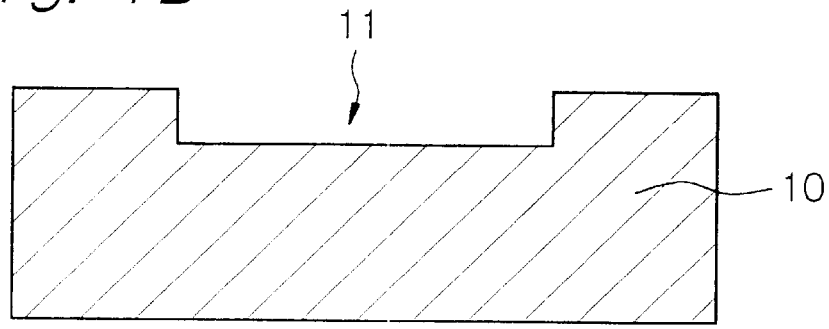
Figure 1C:
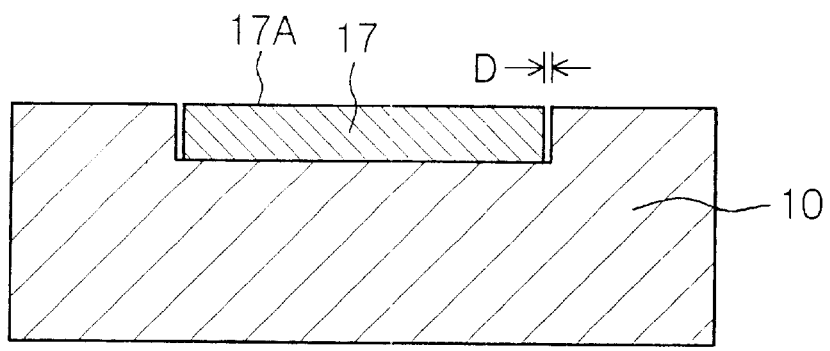
Figure 2:
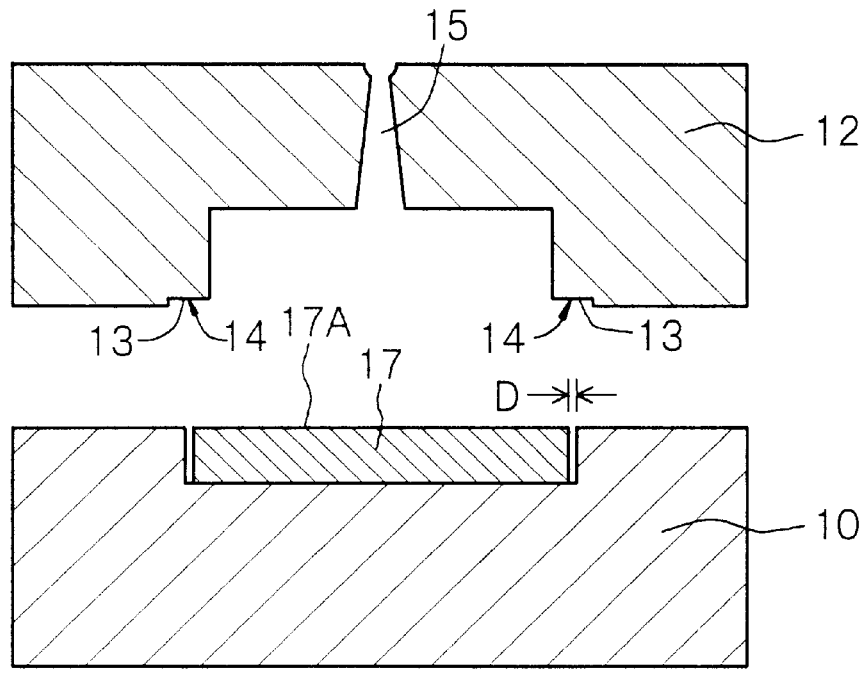
FIG. 2 is a schematic cross-sectional view of the mold assembly for molding a thermoplastic resin in Example 1 at a time of opening the mold members.

Example 1 is concerned with the mold assembly for molding a thermoplastic resin, and the method of manufacturing a molded article of a thermoplastic resin, according to the first aspect of the present invention. FIG. 1A shows a schematic cross-sectional view of the mold assembly in Example 1 viewed when it is clamped, and FIG. 2 shows a schematic cross-sectional view of the mold assembly viewed when it is opened. Further, FIGS. 1B and 1C show schematic cross-sectional views of the mold assembly viewed when it is being assembled.

The mold assembly in Example 1 has a first mold member (movable mold member) 10 and a second mold member (fixed mold member) 12 for manufacturing a molded article of a thermoplastic resin, an insert block 17 and a molten thermoplastic resin introduction portion 15 provided in the second mold member 12. The insert block 17 is disposed in the first mold member 10, constitutes part of a cavity 16 and has a thickness of 3.00 mm. An insert block covering portion 14 is formed in the second mold member 12. Specifically, the insert block covering portion 14 is a kind of an incision 13 formed in the surface of the second mold member 12 facing (opposed to) a cavity wall 17A of the insert block 17.

The insert block 17 and the insert block covering portion 14 are arranged to have a clearance ($C_{11}$) of 0.03 mm or less ($C_{11} \leq 0.03$ mm) in a state where the first mold member 10 and the second mold member 12 are clamped as shown in FIG. 1A. Further, the insert block covering portion 14 is arranged to overlap the insert block 17 in an amount ($\Delta S_{11}$) of overlapping of at least 0.5 mm ($\Delta S_{11} \geq 0.5$ mm). In Example 1, zirconia (for example, $ZrO_2$) was used as a material for constituting the insert block 17. The zirconia has a thermal conductivity of $0.8 \times 10^{-2}$ cal/cm·sec·°C.

In the mold assembly in Example 1, the cavity 16 has a size of 100 mm×100 mm×4 mm and has a form of a rectangular parallelepiped. The insert block 17 has a size of 102.00 mm×102.00 mm×3.00 mm. The insert block 17 was fabricated by cutting and grinding, and the cavity wall 17A of the insert block 17 was ground and finished with a diamond grinder so as to have a surface roughness $R_y$ of 0.02 μm.

The first mold member (movable mold member) 10 was fabricated from carbon steel S55C. The first mold member 10 was cut so as to form an insert block attaching portion 11 having internal dimensions of 102.20 mm×102.20 mm× a depth of 3.02 mm (see FIG. 1B) for the insert block 17. Then, the insert block 17 was attached to the insert block attaching portion 11 (see FIG. 1C) with a silicone adhesive (not shown). A space gage was used to measure a clearance (D) between the insert block 17 and the insert block attaching portion 11, and it was found that the clearance was 0.05 mm at a minimum.

The second mold member (fixed mold member) 12 was fabricated from carbon steel S55C. The molten thermoplastic resin introduction portion 15 of a direct gate having a diameter of 5 mm was formed in the center of the second mold member (fixed mold member) 12.

The above-fabricated first mold member (movable mold member) 10 and second mold member (fixed mold member) 12 were assembled to obtain a mold assembly in Example 1. In the mold assembly, the clearance ($C_{11}$) between the insert block 17 and the insert block covering portion 14 was 0.02 mm ($C_{11}=0.02$ mm). Further, the amount ($\Delta S_{11}$) of overlapping of the insert block covering portion 14 over the insert block 17 was 1.0 mm ($\Delta S_{11}=1.0$ mm). As described above, the mold assembly has a structure in which the end portion (peripheral portion) of the insert block 17 and a molten resin introduced into the cavity 16 are in no contact with each other.

The thus-completed mold assembly was attached to a molding machine, heated up to 130° C. with a mold temperature controller and then, rapidly cooled to 40° C. to show that the insert block 17 formed of zirconia had no damages such as cracking.

Figure 3:
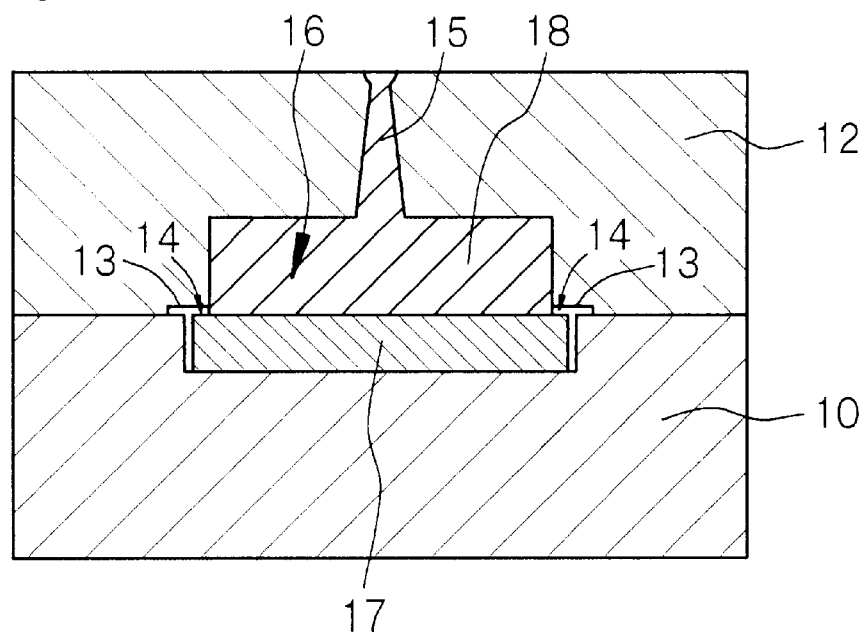
FIG. 3 is a schematic cross-sectional view of the mold assembly in a state where a molten thermoplastic resin is introduced into a cavity of the mold assembly in Example 1.

An injection molding machine SH-100 supplied by Sumitomo Heavy Industries, Ltd. was used as a molding machine, and the mold assembly was heated to 90° C. An polymer alloy material of a polycarbonate resin and a polyester resin containing a glass fiber (GMB4030, supplied by Mitsubishi Engineering Plastics Corp., glass fiber content of 30% by weight) was used as a thermoplastic resin for injection molding. The molding conditions were set at a mold temperature of 90° C., a resin temperature of 290° C. and an injection pressure of 800 kgf/cm²–G. The glass fiber had an average length of 400 µm and an average diameter of 13 µm. A predetermined amount of a molten resin 18 was introduced (injected) into the cavity 16 through the molten thermoplastic resin introduction portion (gate portion) 15 (see FIG. 3), the thermoplastic resin was cooled to solidness, and after 20 seconds, the mold assembly was opened. Then, a molded article was taken out from the mold assembly.

That surface of the molded article which had been in contact with the insert block 17 had no observable of glass fibers and had a remarkably high mirror (specular) surface property. Nor did the molded article show any molding defects such as a flow mark and a jetting. When the above molding operation was continuously carried out 10000 cycles, the insert block 17 suffered no damages such as breakage.

In Example 1, the insert block 17 may be formed of $ZrO_2$—$Y_2O_3$ or $ZrO_2$—$CeO_2$ in place of $ZrO_2$.

EXAMPLE 2

Figure 4A:
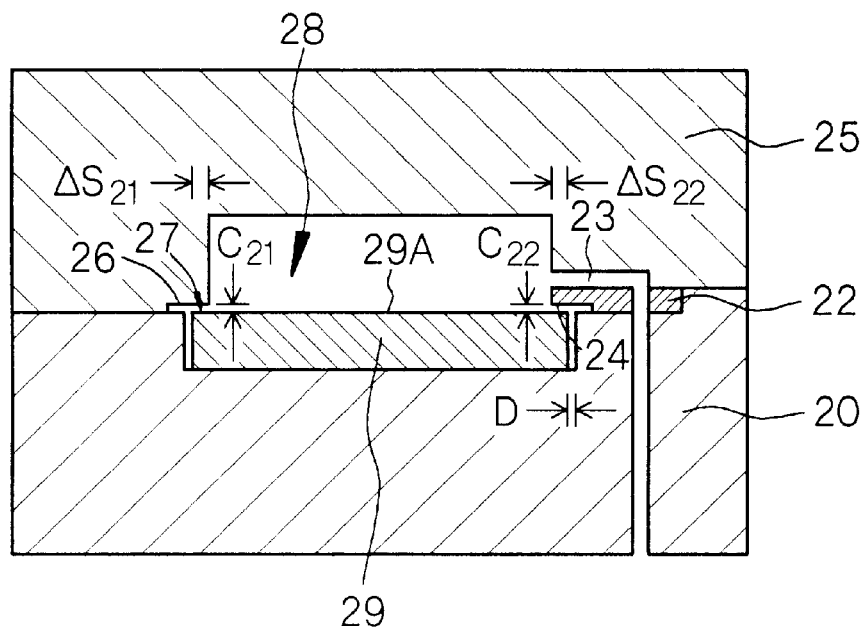
FIGS. 4A and 4B are schematic cross-sectional views of a mold assembly for molding a thermoplastic resin in Example 2 at a time of clamping the mold members.
Figure 4B:
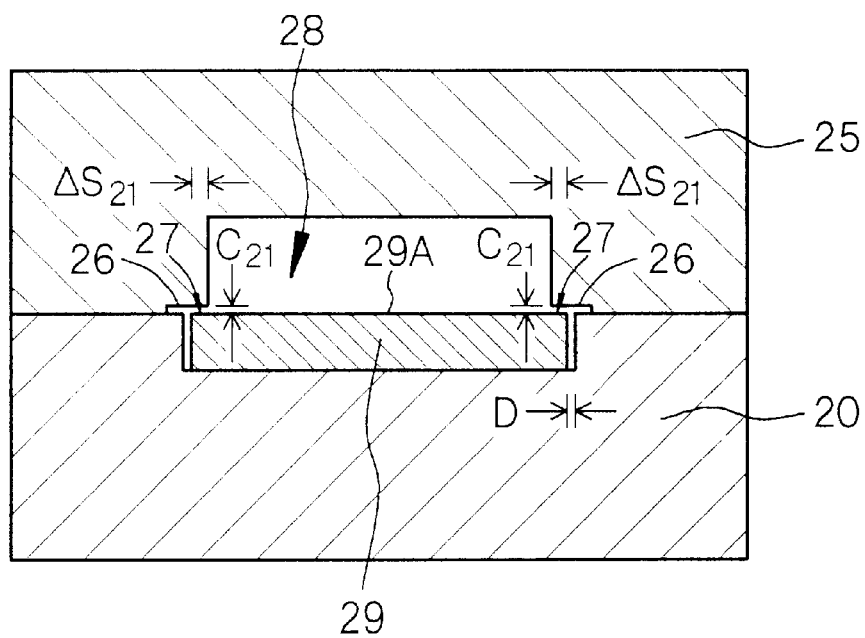
Figure 5A:
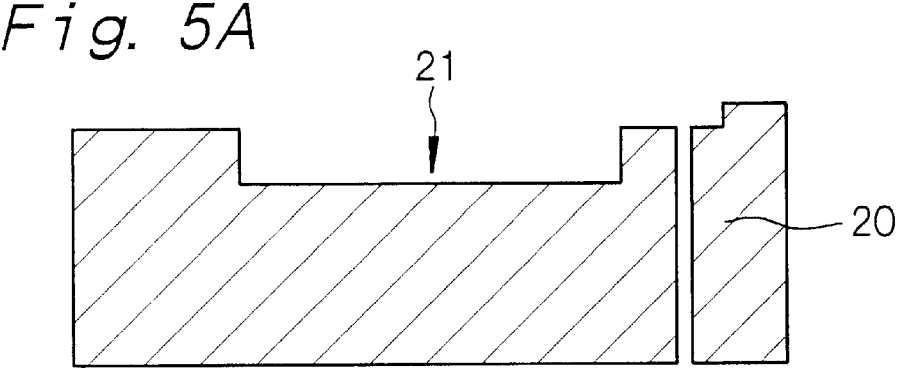
FIGS. 5A, 5B and 5C are schematic cross-sectional views of a mold assembly for molding a thermoplastic resin in Example 2, which mold assembly is being assembled.
Figure 5B:
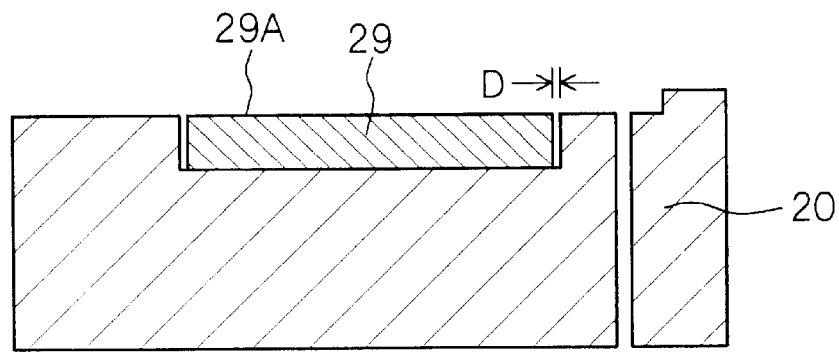
Figure 5C:
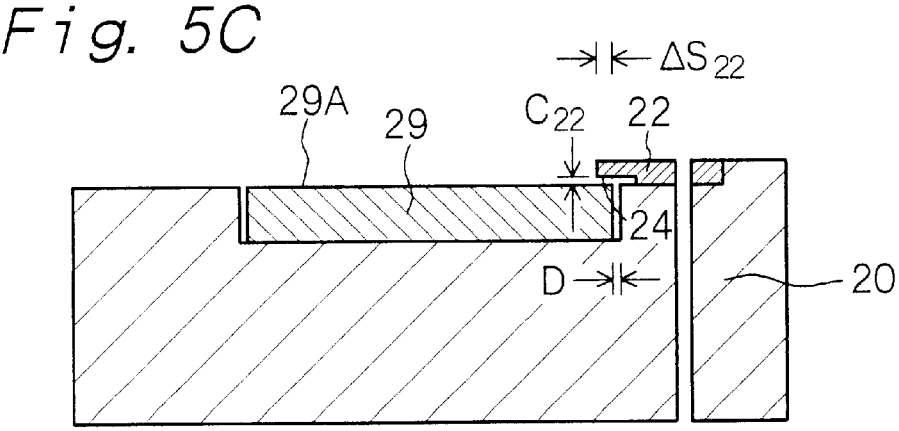
Figure 6:
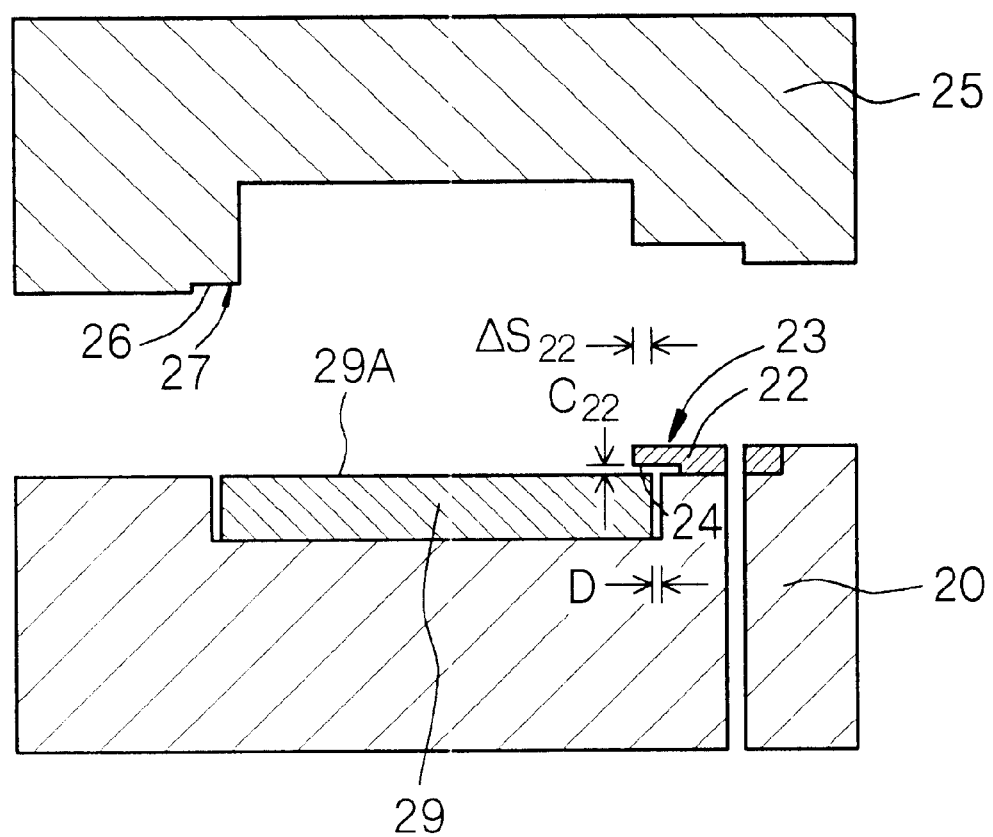
FIG. 6 is a schematic cross-sectional view of the mold assembly for molding a thermoplastic resin in Example 2 at a time of opening the mold members.

Example 2 is concerned with the mold assembly for molding a thermoplastic resin, and the method of manufacturing a molded article of a thermoplastic resin, according to the second aspect of the present invention. FIGS. 4A and 4B show schematic cross-sectional views of the mold assembly in Example 2 viewed when it is clamped, and FIG. 6 shows a schematic cross-sectional view of the mold assembly viewed when it is opened. FIGS. 5A, 5B and 5C show schematic cross-sectional views of the mold assembly viewed when it is being assembled. FIG. 4A, 5A, 5B, 5C and 6 show schematic cross-sectional views taken by cutting a cover-plate-including region of the mold assembly with a perpendicular plane. FIG. 4B shows a schematic cross-sectional view taken by cutting a cover-plate-non-including region of the mold assembly with a perpendicular plane in parallel with the above perpendicular plane.

The mold assembly for molding a thermoplastic resin in Example 2 has a first mold member (fixed mold member) 20 and a second mold member (movable mold member) 25 for manufacturing a molded article of a thermoplastic resin, an insert block 29 and a cover plate 22. The insert block 29 is disposed in the first mold member 20, constitutes part of the cavity and has a thickness of 3.00 mm. The cover plate 22 is disposed between the insert block 29 and the second mold member 25, attached to the first mold member 20 and has a molten thermoplastic resin introduction portion 23. The second mold member 25 is provided with an insert block covering portion 27. The insert block covering portion 27 is a kind of an incision 26 formed in a surface of the second mold member 12 facing (opposed to) a cavity wall 29A of the insert block 29.

The insert block 29 and the insert block covering portion 27 are arranged to have a clearance ($C_{21}$) of 0.03 mm or less ($C_{21} \leq 0.03$ mm) in a state where the first mold member 20 and the second mold member 25 are clamped (see FIG. 4A). Further, the insert block covering portion 27 is arranged to overlap the insert block 29 in an amount ($\Delta S_{21}$) of overlapping of at least 0.5 mm ($\Delta S_{21} \geq 0.5$ mm). Further, the insert block 29 and that surface 24 of the cover plate 22 which faces (or is opposed to) the insert block are arranged to have a clearance ($C_{22}$) of 0.03 mm or less ($C_{22} \geq 0.03$ mm), and the cover plate 22 is arranged to have an amount ($\Delta S_{22}$) of overlapping of at least 0.5 mm ($\Delta S_{22} \geq 0.5$ mm) over the insert block 29. As shown in FIGS. 4A and 4B, the cover plate 22 overlaps only part of the insert block 29. In Example 2, zirconia (for example, $ZrO_2$) was also used as a material for constituting the insert block 29. In the mold assembly in Example 2, the molten thermoplastic resin introduction portion 23 provided in the cover plate 22 had a direct gate structure.

In the mold assembly in Example 2, a cavity 28 has a size of 100 mm×100 mm×4 mm and has a form of a rectangular parallelepiped. The insert block 29 has a size of 102.00 mm×102.00 mm×3.00 mm. The insert block 29 was fabricated by cutting and grinding, and the cavity wall 29A of the insert block 29 was ground and finished with a diamond grinder so as to have a surface roughness $R_y$ of 0.02 µm.

The first mold member (movable mold member) 20 was fabricated from carbon steel S55C. The first mold member 20 was cut so as to form an insert block attaching portion 21 having internal dimensions of 102.20 mm×102.20 mm× a depth of 3.02 mm (see FIG. 5A) for the insert block 29. Then, the insert block 29 was attached to the insert block attaching portion 21 (see FIG. 5B) with a silicone adhesive (not shown). A space gage was used to measure a clearance (D) between the insert block 29 and the insert block attaching portion 21, and it was found that the clearance was 0.05 mm at a minimum.

The cover plate 22 was fabricated from carbon steel, and attached to a predetermined position on the first mold member 20 (see FIG. 5C) with a bolt (not shown). The cover plate 22 had the molten thermoplastic resin introduction portion (gate portion) 23. The insert block 29 and that surface 24 of the cover plate 22 which faced (or was opposed to) the insert block had a clearance ($C_{22}$) of 0.02 mm ($C_{22}=0.02$ mm), and an amount ($\Delta S_{22}$) of overlapping of the cover plate 22 over the insert block 29 was 1.0 mm ($\Delta S_{22}=1.0$ mm).

The second mold member (movable mold member) 25 was fabricated from carbon steel S55C.

The above-fabricated first mold member (fixed mold member) 20 and second mold member (movable mold member) 25 were assembled to obtain a mold assembly in Example 2. In the mold assembly, the clearance ($C_{21}$) between the insert block 29 and the insert block covering portion 27 was 0.02 mm ($C_{21}=0.02$ mm). Further, an amount $\Delta S_{21}$) of overlapping of the insert block covering portion 27 over the insert block 29 was 1.0 mm ($\Delta S_{21}=1.0$ mm). As described above, the mold assembly has a structure in which the end portion (peripheral portion) of the insert block 27 and a molten resin introduced into the cavity 28 are in no contact with each other.

The thus-completed mold assembly was attached to a molding machine, heated up to 130° C. with a mold temperature controller and then, rapidly cooled to 40° C. to show that the insert block 29 formed of zirconia had no damages such as cracking.

The same injection molding machine as that used in Example 1 was used as an injection molding machine, and the mold assembly was heated up to 90° C. The same polymer alloy material of a polycarbonate resin and a polyester resin containing a glass fiber as that used in Example was injection-molded under the same conditions as those in Example 1. A predetermined amount of the molten resin was introduced (injected) into the cavity 28 through the molten thermoplastic resin introduction portion (gate portion) 23 and then, cooled to solidness, and after 20 seconds, the mold assembly was opened. Then, a molded article was taken out from the mold assembly.

That surface of the molded article which had been in contact with the insert block 29 had no observable glass fibers and had a remarkably high mirror (specular) surface property. Nor did the molded article show any molding defects such as a flow mark and a jetting. When the above molding operation was continuously carried out 10000 cycles, the insert block 29 suffered no damages such as breakage.

In Example 2, the insert block 29 may be formed of $ZrO_2$—$Y_2O_3$ or $ZrO_2$—$CeO_2$ in place of $ZrO_2$.

EXAMPLE 3

Figure 7A:
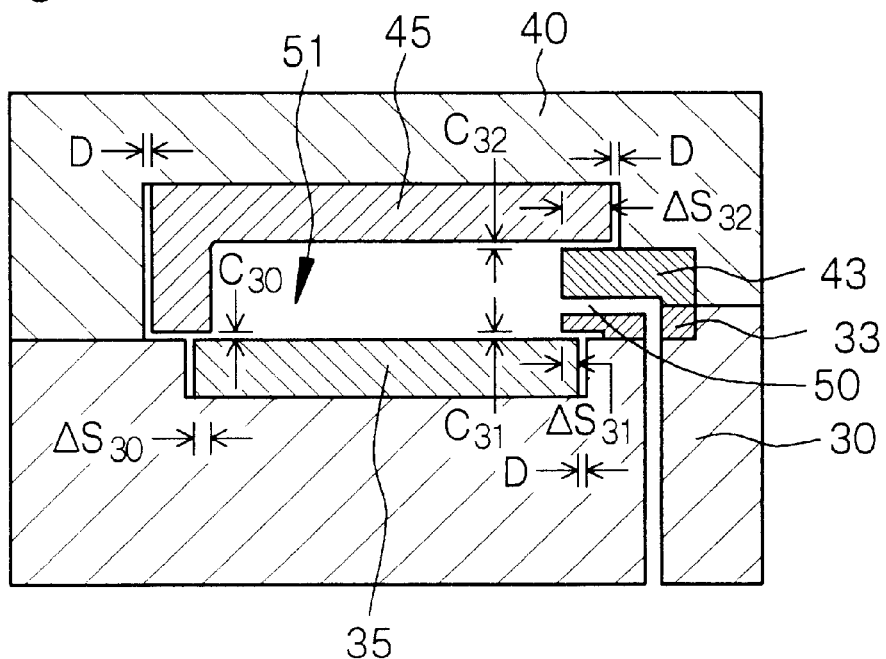
FIGS. 7A and 7B are schematic cross-sectional views of a mold assembly for molding a thermoplastic resin in Example 3 at a time of clamping the mold members.
Figure 7B:
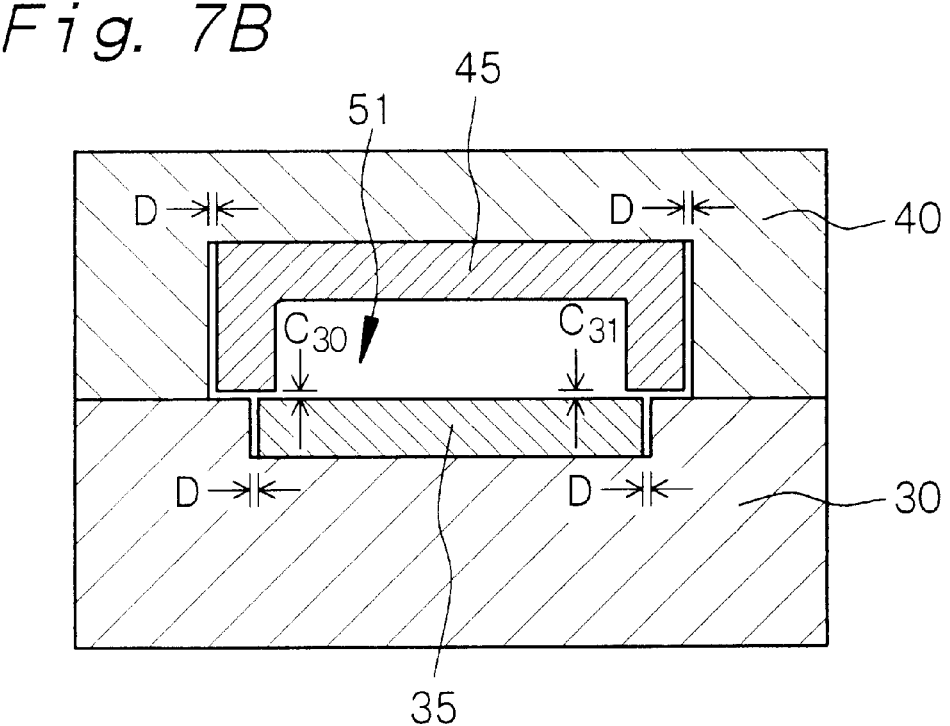
Figure 8A:
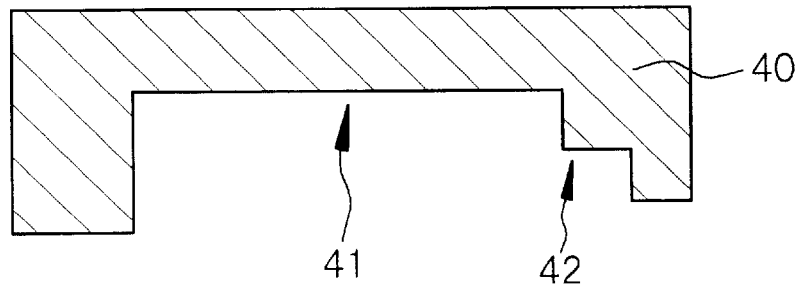
FIGS. 8A, 8B, 8C and 8D are schematic cross-sectional views of the mold assembly for molding a thermoplastic resin in Example 3, which mold assembly is being assembled.
Figure 8B:
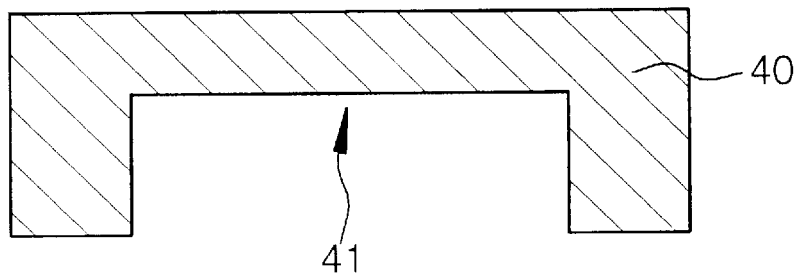
Figure 8C:
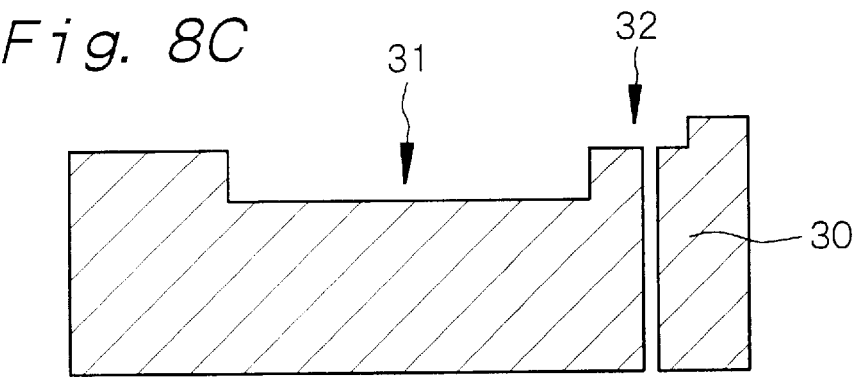
Figure 8D:
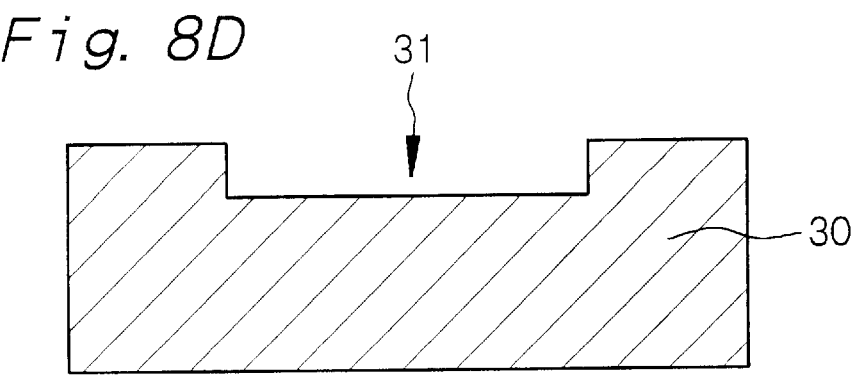
Figure 9A:
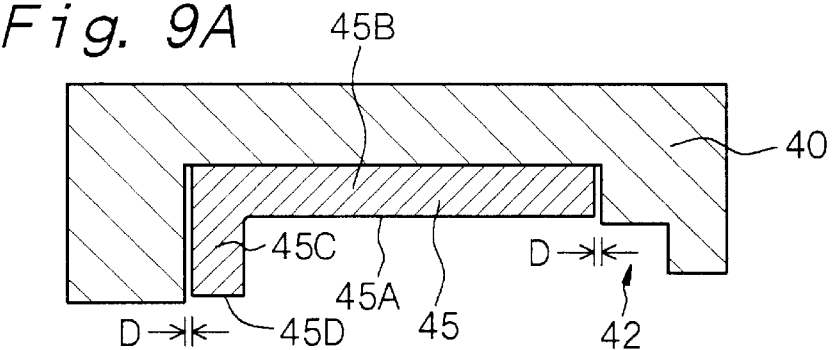
FIGS. 9A, 9B, 9C and 9D, subsequent to FIGS. 8A, 8B, 8C and 8D, are schematic cross-sectional views of the mold assembly for molding a thermoplastic resin in Example 3, which mold assembly is being assembled.
Figure 9B:
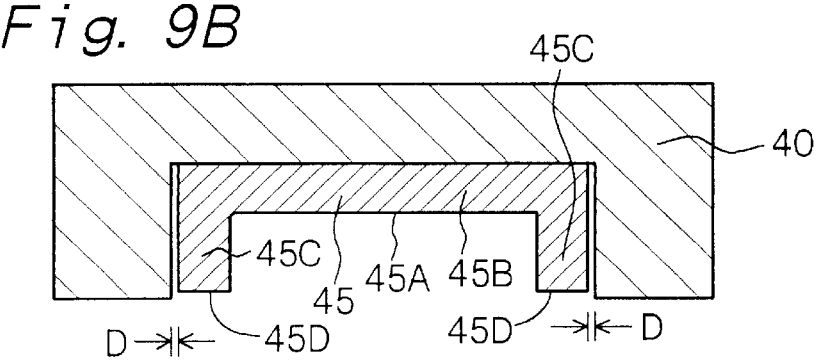
Figure 9C:
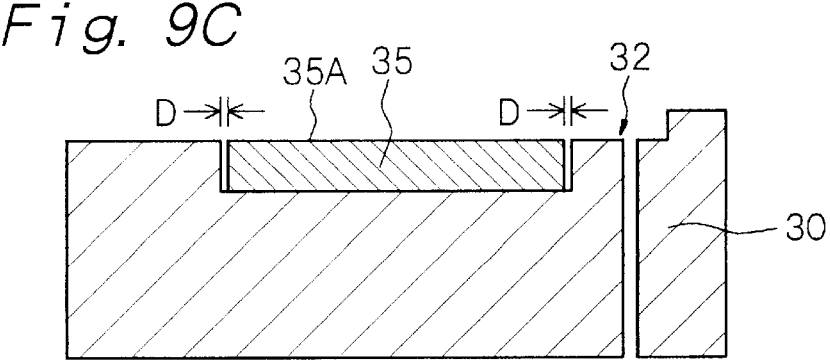
Figure 9D:
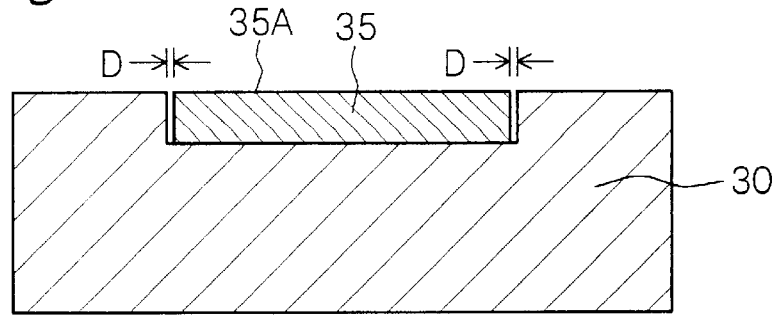
Figure 10A:
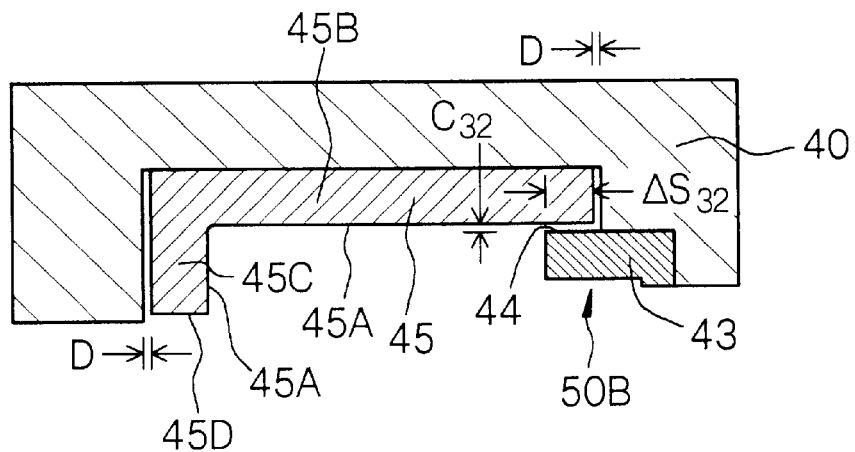
FIGS. 10A and 10B are schematic cross-sectional views of the mold assembly for molding a thermoplastic resin in Example 3 at a time of opening the mold members.
Figure 10B:
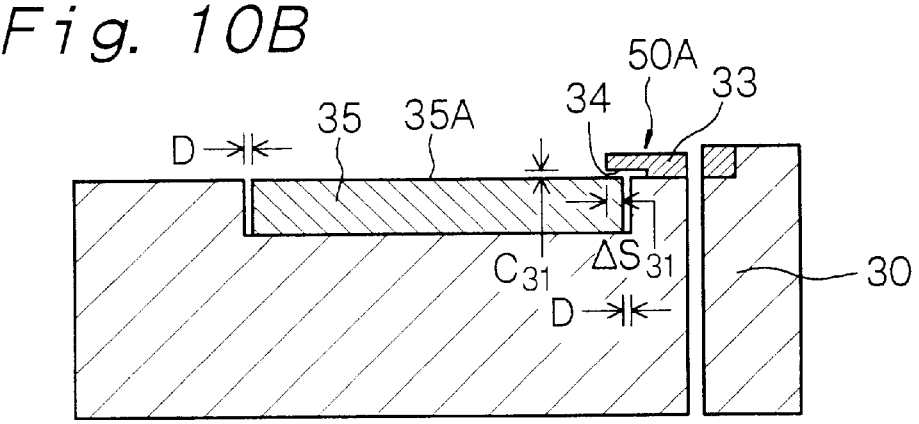

Example 3 is concerned with the mold assembly for molding a thermoplastic resin, and the method of manufacturing a molded article of a thermoplastic resin, according to the third aspect of the present invention. FIGS. 7A and 7B show schematic cross-sectional views of the mold assembly in Example 3. FIGS. 8A, 8B, 8C, 8D, 9A, 9B, 9C, 9D, 10A and 10B show schematic cross-sectional views of the mold assembly viewed when it was being assembled. FIGS. 7A, 8A, 8C, 9A, 9C and 10A show cross-sectional views taken by cutting the cover-plate-including region of the mold assembly with a perpendicular plane. FIGS. 7B, 8B, 8D, 9B, 9D and 10B show cross-sectional views taken by cutting the cover-plate-non-including region of the mold assembly with a perpendicular plane in parallel with the above perpendicular plane.

The mold assembly in Example 3 has a first mold member (fixed mold member) 30 and a second mold member (movable mold member) 40 for manufacturing a molded article of a thermoplastic resin, a first insert block 35, a second insert block 45 and cover plates 33 and 43. The first insert block 35 is disposed in the first mold member (fixed mold member) 30, constitutes part of a cavity 51 and has a thickness of 3.00 mm. The second insert block 45 is disposed in the second mold member (movable mold member) 40, constitutes part of the cavity 51 and has a thickness of 2.00 mm. The cover plates 33 and 43 are disposed between the first insert block 35 and the second insert block 45, attached to the first and second mold members 30 and 40, respectively, and have a molten thermoplastic resin introduction portion (gate portion) 50.

In the mold assembly in Example 3, the cavity 51 has a size of 100 mm×100 mm×3 mm and has a form of a rectangular parallelepiped. In Example 3, the first insert block 35 and the second insert block 45 were fabricated from zirconia by cutting and grinding. The first insert block 35 has a size of 102.00 mm×102.00 mm×3.00 mm. The cavity wall 35A of the first insert block 35 was ground and finished with a diamond grinder so as to have a surface roughness $R_y$ of 0.02 μm. The zirconia used has a thermal conductivity of $0.8×10^{-2}$ cal/cm·sec·°C.

The first mold member (movable mold member) 30 was fabricated from carbon steel S55C. The first mold member 30 was cut so as to form an insert block attaching portion 31 having internal dimensions of 102.20 mm×102.20 mm× a depth of 3.02 mm for the first insert block 35, whereby the insert block attaching portion 31 was formed in the first mold member 30 (see FIGS. 8C and 8D). Reference numeral 32 indicates a first cover plate attaching portion. Then, the insert block 35 was attached to the insert block attaching portion 31 (see FIGS. 9C and 9D) with a silicone adhesive (not shown). A space gage was used to measure a clearance (D) between the insert block 35 and the insert block attaching portion 31, and it was found that the clearance was 0.05 mm at a minimum.

The second insert block 45 was fabricated by press-shaping zirconia so as to form a concave-shaped cavity wall and sintering it. The second insert block 45 has a concave-shaped portion. The second insert block 45 has an external size of 106.00 mm×106.00 mm, and the concave-shaped portion has a size of 100.00 mm×100.00 mm. The bottom 45B of the concave-shaped portion has a thickness of 2.00 mm, the rising portion 45C from the bottom has a thickness (height) of 5.00 mm. Therefore, a portion to constitute the cavity 51 has a height (thickness) of 3.00 mm. In the concave-shaped portion of the second insert block 45, the internal side surfaces 45A (to constitute a cavity wall) of the bottom 45B and the rising portion 45C were ground and finished with a diamond grinder so as to have a surface roughness $R_y$ of 0.02 μm. Further, the boundary portion between the bottom 45B and the rising portion 45C was formed of a curved surface having a radius of 0.1 mm. For attaching the second cover plate 43 to the second mold member 40, part of the rising portion 45C of the second insert block 45 is removed (see FIGS. 9A and 9B).

The second mold member (movable mold member) 40 was fabricated from carbon steel S55C. The second mold member 40 was cut so as to form an insert block attaching portion 41 having internal dimensions of 106.20 mm×106.20 mm× a depth of 5.02 mm for the second insert block, 45, whereby the insert block attaching portion 41 was formed in the second mold member 40 (see FIGS. 8A and 8B). Reference numeral 42 indicates a second cover plate attaching portion. Then, the second insert block 45 was attached to the insert block attaching portion 41 (see FIGS. 9A and 9B) with a silicone adhesive (not shown). A space gage was used to measure a clearance (D) between the second insert block 45 and the insert block attaching portion 41, and it was found that the clearance was 0.05 mm at a minimum.

The first cover plate 33 was fabricated from carbon steel, and fixed to a predetermined position on the first mold member 30 (see FIG. 10B) with a bolt (not shown). Part 50A of the molten thermoplastic resin introduction portion was formed in the first cover plate 33. The second cover plate 43 was fabricated from carbon steel, and fixed to a predetermined position on the second mold member 40 (see FIG. 10A) with a bolt (not shown). Part 50B of the molten thermoplastic resin introduction portion was formed in the second cover plate 43. The first cover plate 33 and the second cover plate 43 are to constitute the molten thermoplastic resin introduction portion 50 in a state where the first mold member 30 and the second mold member 40 are clamped.

The above-fabricated first mold member (fixed mold member) 30 and the second mold member (movable mold member) 40 were assembled to obtain the mold assembly in Example 3. In the above mold assembly, a clearance ($C_{30}$) between that surface 35A of the first insert block 35 which faced (or was opposed to) the second insert block 45 and that surface 45D of the second insert block 45 which faced (or was opposed to) the first insert block was 0.01 mm. Further, a clearance ($C_{31}$) between the first insert block 35 and that surface 34 of the first cover plate 33 which faced (or was opposed to) the first insert block 35 was 0.01 mm, and a clearance($C_{32}$) between the second insert block 45 and that surface 44 of the second cover plate 43 which faced (or was opposed to) the second insert block 45 was 0.01 mm. Further, an amount ($\Delta S_{30}$) of overlapping of that surface 35A of the first insert block 35 which faced (or was opposed to) the second insert block 45 and that surface 45D of the second insert block 45 which faced (or was opposed to) the first insert block 35 was 1.0 mm. An amount ($\Delta S_{31}$) of overlapping of the first cover plate 33 over the first insert block 35 was 1.0 mm. On the other hand, an amount ($\Delta S_{32}$) of overlapping of the second cover plate 43 over the second insert block 45 was 3.0 mm. The first and second cover plates 33 and 43 overlap only part of the first and second insert blocks 35 and 45.

The thus-completed mold assembly was attached to a molding machine, heated up to 130° C. with a mold temperature controller and then, rapidly cooled to 40° C. to show that the first and second insert blocks 35 and 45 formed of zirconia had no damages such as cracking.

The same injection molding machine as that used in Example 1 was used as an injection molding machine, and the mold assembly was heated up to 90° C. A polycarbonate resin containing a glass fiber (GS2020MKR, supplied by Mitsubishi Engineering Plastics Corp., glass fiber content of 20% by weight) as a thermoplastic resin was injection-molded. The molding conditions were set at a mold temperature of 90° C., a resin temperature of 310° C. and an injection pressure of 800 kgf/cm$^2$–G. The glass fiber had an average length of 400 μm and an average diameter of 13 μm. A predetermined amount of the molten resin was introduced (injected) into the cavity 51 through the molten thermoplastic resin introduction portion (gate portion having a side gate structure) 50, the thermoplastic resin was cooled to solidness, and after 20 seconds, the mold assembly was opened. Then, a molded article was taken out from the mold assembly.

Those surfaces of the molded article which had been in contact with the first and second insert blocks 35 and 45 had no observable of glass fibers and had a remarkably high mirror (specular) surface property. Nor did the molded article show any molding defects such as a flow mark and a jetting. When the above molding operation was continuously carried out 10000 cycles, the first and second insert blocks 35 and 45 suffered no damages such as breakage.

Example 3 used a structure in which the cover plates 33 and 43 provided with the molten thermoplastic resin introduction portion (gate portion) 50 were attached to the first and second mold members 30 and 40, respectively. Alternatively, there may be employed a structure in which a cover plate is attached to one of the first mold member 30 or the second mold member 40.

Comparative Example 1

Figure 29:
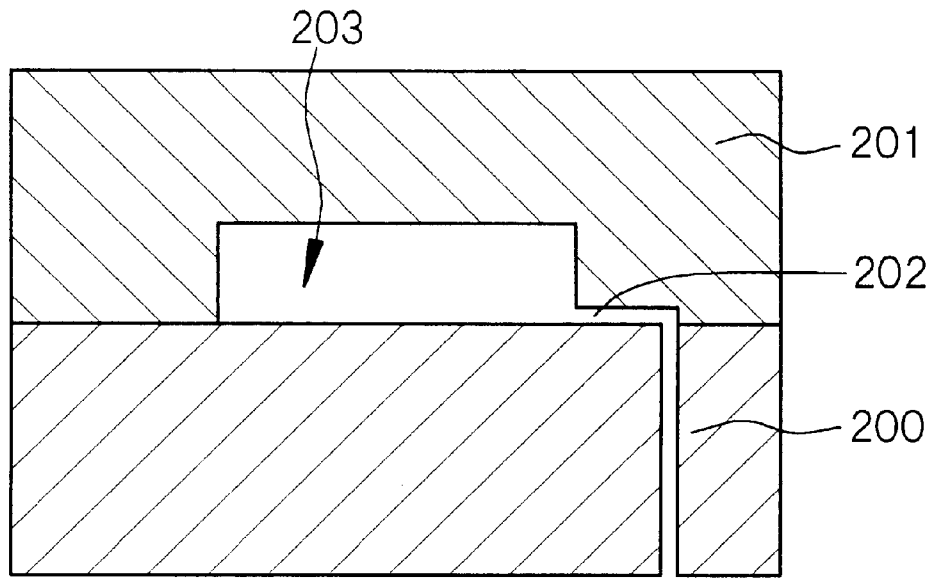
FIG. 29 is a schematic cross-sectional view of a mold assembly used in Comparative Example 1, at a time of clamping the mold members.

FIG. 29 shows a schematic cross-sectional view of a mold assembly used in Comparative Example 1. The mold assembly was constituted of a first mold member (fixed mold member) 200 and a second mold member (movable mold member) 201 which were fabricated from carbon steel (thermal conductivity 11×10$^{-2}$ cal/cm·sec·°C.) and had a cavity wall specularly finished so as to have a surface roughness $R_y$ of 0.02 μm. The same thermoplastic resin as that used in Example 1 was injection-molded under the same molding conditions as those in Example 1. Reference numeral 202 indicates a molten thermoplastic resin introduction portion, and reference numeral 203 indicates a cavity. The molten resin in the cavity 203 showed poor fluidity, and it was difficult to completely fill the cavity 203 with the molten resin. Therefore, the injection pressure was increased by 200 kgf/cm$^2$–G, and the molding was carried out at an injection pressure of 1000 kgf/cm$^2$–G to obtain a molded article. The molded article had molding defects such as a flow mark and a jetting. Further, the surface of the molded article had observable glass fibers, and the molded article was extremely poor in mirror surface property as compared with the molded article obtained in Example 1.

Comparative Example 2

In Comparative Example 2, the mold assembly used in Example 1 was used, the clearance ($C_{11}$) was changed, and the same thermoplastic resin as that used in Example 1 was used for injection-molding under the same injection molding conditions as those in Example 1. That is, the clearance ($C_{11}$) was changed to 0.00 mm and to 0.05 mm. When the clearance ($C_{11}$) was 0.00 mm, the insert block 17 was broken when the mold assembly was clamped, and no molding was possible. When the clearance ($C_{11}$) was 0.05 mm, mold flashes occurred on an edge portion of the molded article, cracking occurred in an edge portion of the insert block 17 after 100 molding shots, and the molding was no longer possible.

Comparative Example 3

Figure 30:
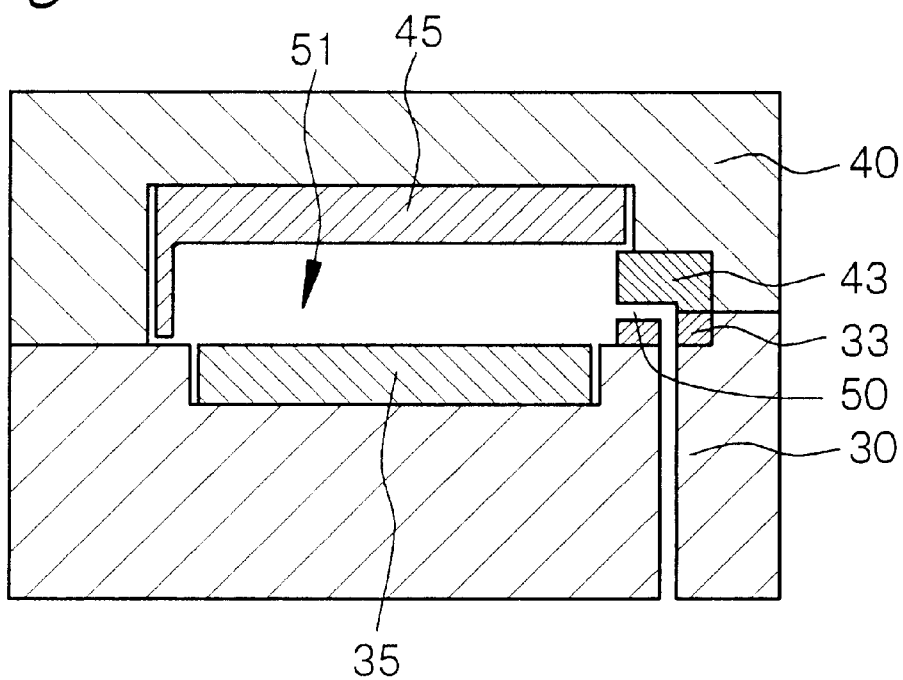
FIG. 30 is a schematic cross-sectional view of a mold assembly used in Comparative Example 3, at a time of clamping the mold members.

In Comparative Example 3, the mold assembly used in Example 3 was modified as FIG. 30 shows its schematic cross-sectional view. That is, the internal side surface of the second insert block 45 and the first and second cover plates 33 and 43 were cut and ground so as to form a cavity 51 having a form of a rectangular parallelepiped having a size of 104 mm×104 mm×3 mm. Namely, there was no overlapping of that surface 35A of the first insert block 35 which faced (or was opposed to) the second insert block 45 and that surface 45D of the second insert block 45 which faced (or was opposed to) the first insert block 33. Nor was there an overlapping of the first cover plate 33 over the first insert block 35. A space between the first insert block 35 and the insert block attaching portion 31 was opened to the cavity 51.

The above mold assembly was used, and the same thermoplastic resin as that used in Example 3 was injection-molded under the same injection-molding conditions as those in Example 3. As a result, due to a high stress caused when the molten thermoplastic resin was introduced, mold flashes occurred on a molded article in the first molding shot because of the molten resin having flowed into the space between the first cover plate 33 and the first insert block 35. In the third molding shot, a cracking took place in a portion of the first insert block 35 in the vicinity of the molten thermoplastic resin introduction portion (gate portion having a side gate structure) 50, and the molding was no longer possible.

EXAMPLE 4

Figure 11A:
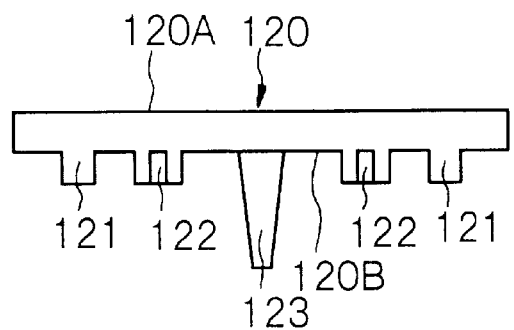
FIGS. 11A, 11B and 11C are schematic front view, schematic plan view and schematic bottom view of a molded article manufactured in Example 4.
Figure 11B:
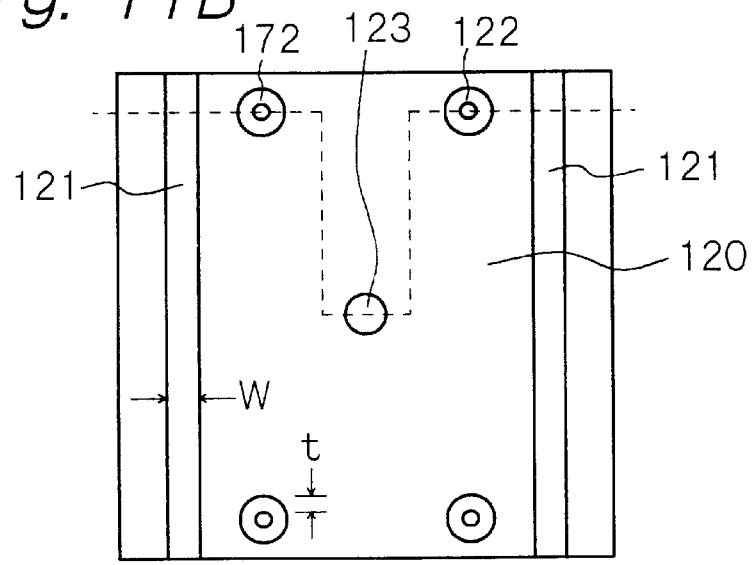
Figure 11C:
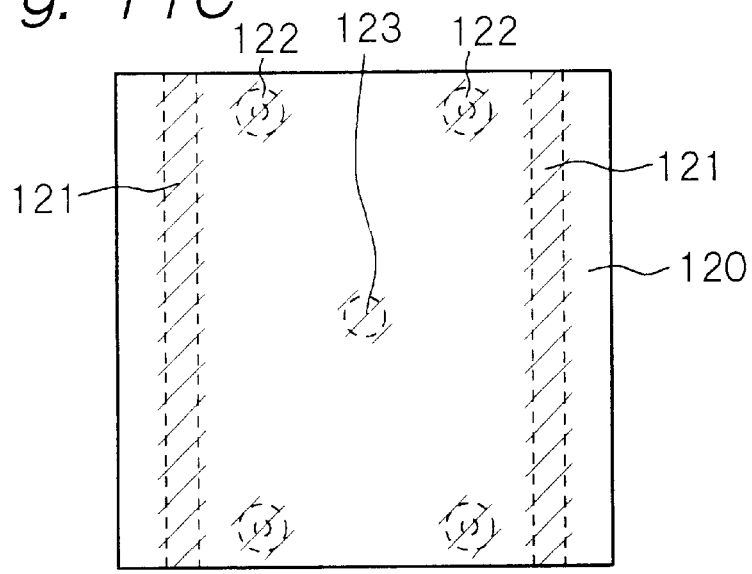
Figure 12A:
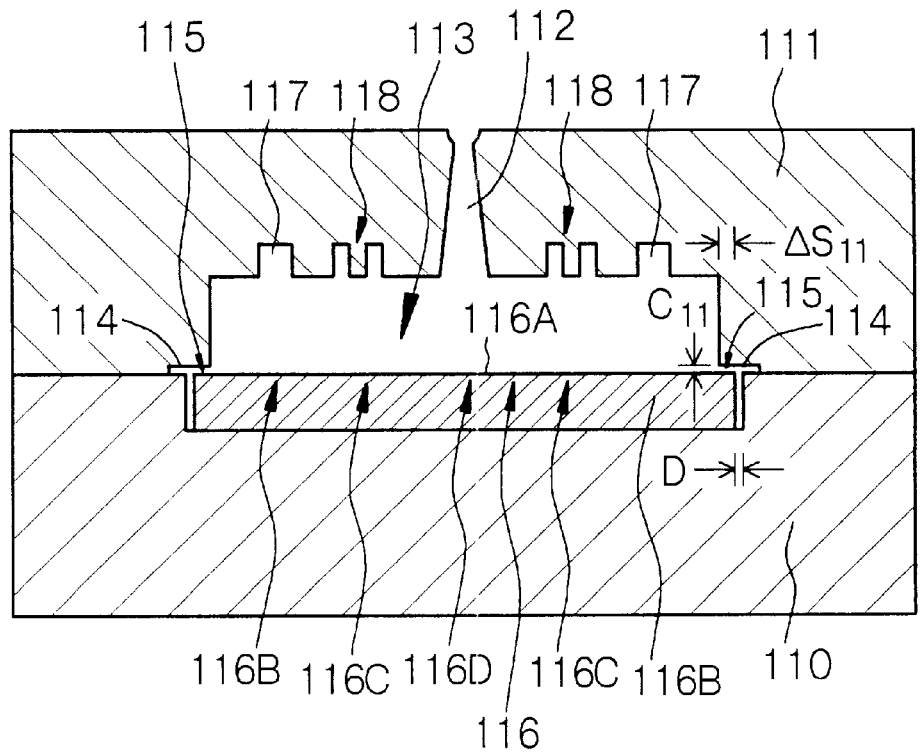
FIGS. 12A and 12B are schematic partial cross-sectional views of a mold assembly used in Example 4.
Figure 12B:
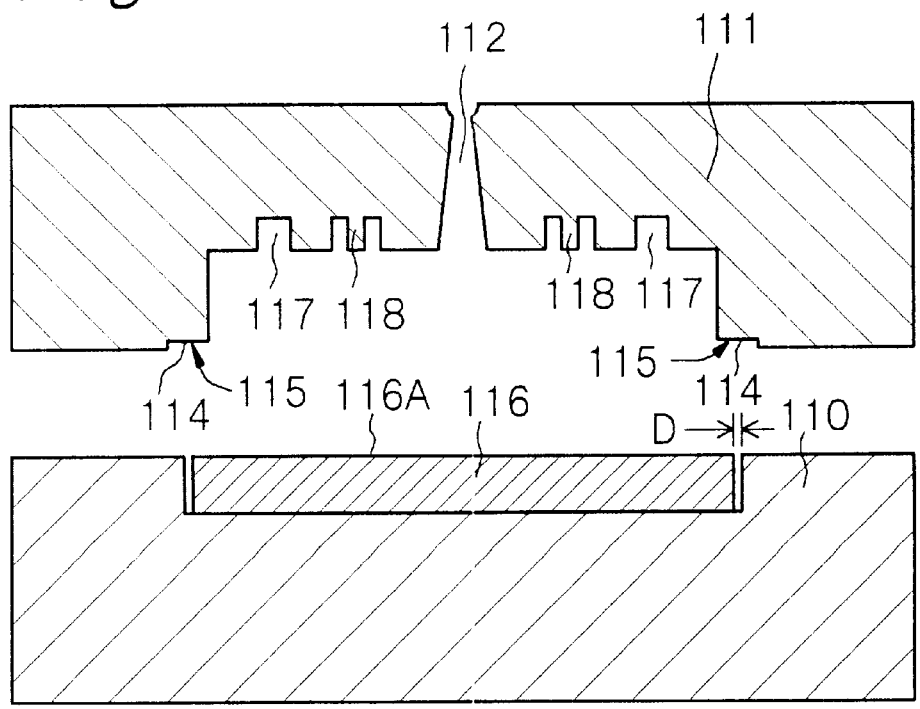

Example 4 is concerned with the method of manufacturing a molded article of a thermoplastic resin according to the fourth and fifth aspects of the present invention. FIG. 11A shows a schematic front view of a molded article 120 obtained in Example 4, FIGS. 11B shows a schematic plan view of the molded article 120, and FIG. 11C shows a schematic bottom view of the molded article 120. FIGS. 12A and 12B show schematic cross-sectional views of a mold assembly. The cross-sectional views shown in FIGS. 12A and 12B are along dotted lines in FIG. 11B. FIG. 12A shows a schematic cross-sectional view of the mold assembly viewed when it is clamped, and FIG. 12B shows a schematic cross-sectional view of the mold viewed when it is opened. The mold assembly used in Example 4 was a mold assembly for molding a thermoplastic resin according to the first aspect of the present invention.

The mold article 120 formed in Example 4 has a size of 100 mm×100 mm×4 mm and has a form of a rectangular parallelepiped (plate). Projections are formed on a back surface (the other surface) 120B of the molded article 120. These projections are ribs 121 and bosses 122. Further, a thermoplastic resin introduction portion mark 123 is also formed and left on the back surface 120B of the molded article 120. In FIG. 11C, slanting lines indicate those portions on a front surface (one surface) 120A opposite to the back surface 120B, which portions are opposed to the projections 121 and 122 and the thermoplastic resin introduction portion mark 123. In prior art production methods, sink marks occur in those portions indicated by the slanting lines in many cases. In Example 4, the each rib has a width W of 5 mm and a height of 5 mm. Further, each boss has a thickness t of 3 mm and a height of 5 mm. On the other hand, the thermoplastic resin introduction portion mark 123 has a diameter of 4 mm (cross sectional area of 12.56 mm$^2$). Those portions of one surface 120A of the molded article 120 which portions are opposed to the projections 121 and 122 formed on the other surface 120B will be referred to as "molded article surface portions opposed to the projections 121 and 122", hereinafter for convenience. Further, a portion of one surface 120A of the molded article 120 which portion is opposed to the thermoplastic resin introduction portion mark 123 formed on the other surface 120B of the molded article 120 will be referred to as "molded article surface portion opposed to the thermoplastic resin introduction portion mark 123", hereinafter for convenience.

In the mold assembly, those surfaces, constituting part of the cavity, (cavity walls 116B and 116C) of the mold assembly which face (or are opposed to) portions 117 (mold portions 117) of the mold assembly (for forming the ribs 121) and portions 118 (mold portions 118) of the mold assembly (for forming the bosses 122) for forming the projections 121 and 122 of the molded article 120 are constituted of an insert block 116 having a thickness of 0.1 mm to 10 mm and being formed of a material having a thermal conductivity of 2×10$^{-2}$ cal/cm·sec·°C. or less. Further, that surface, constituting part of the cavity, (cavity wall 116D) of the mold assembly which faces (or is opposed to) a molten thermoplastic resin introduction portion 112 is constituted of the insert block 116 having a thickness of 0.1 mm to 10 mm and being formed of the material having a thermal conductivity of 2×10$^{-2}$ cal/cm·sec·°C. or less. More specifically, the above mold assembly is structured as follows. It has (a) a first mold member 110 and a second mold member 111 for manufacturing a molded article of a thermoplastic resin, (b) the insert block 116 which is disposed in the first mold member 110, constitutes part of a surface constituting a cavity 113 and has a thickness of 0.1 mm to 10 mm (3.00 mm in Example 4), and (c) the molten thermoplastic resin introduction portion 112 provided in the second mold member 111. And, the second mold member 111 is provided with an insert block covering portion 115, and in a state where the first mold member 110 and the second mold member 111 are clamped, (A) the insert block 116 and the insert block covering portion 115 are arranged to have a clearance ($C_{11}$) of 0.03 mm or less ($C_{11} \leq 0.03$ mm), and (B) the insert block covering portion 115 is arranged to have an amount ($\Delta S_{11}$) of overlapping of at least 0.5 mm ($\Delta S_{11} \geq 0.5$ mm) over the insert block 116. In the thus-structured mold assembly, the insert block covering portion 115 can be structured as a kind of an incision 114 formed in that surface of the second mold member 111 which faces (or is opposed to) the insert block 116.

Figure 13A:
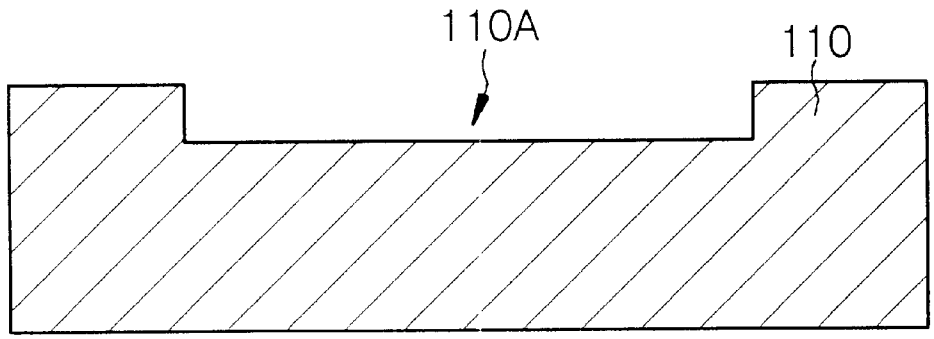
FIGS. 13A, 13B and 13C are schematic cross-sectional views of the mold assembly shown in FIGS. 12A and 12B, which mold assembly is being assembled.
Figure 13B:
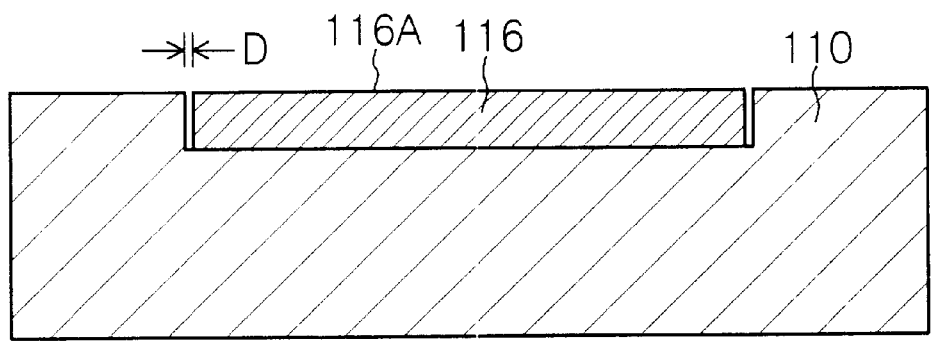
Figure 13C:
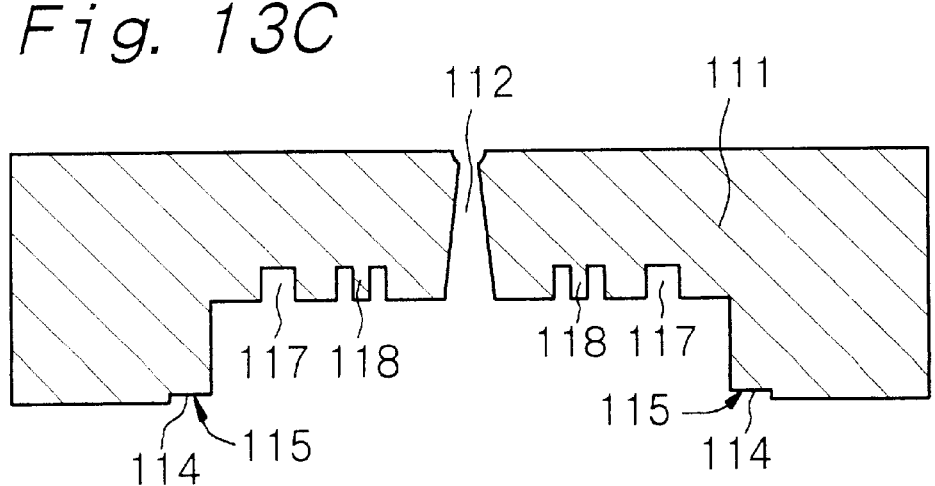

FIGS. 13A, 13B and 13C show schematic cross-sectional views of the mold assembly viewed when it is being assembled.

The cavity 113 formed in the mold assembly had a size of 100 mm×100 mm×4 mm. That is, the cavity had a form of a rectangular parallelepiped. In Example 4, the insert block 116 was fabricated from zirconia by cutting and grinding. The insert block 116 had a size of 102.00 mm×102.00 mm×3.00 mm. The cavity wall 116A (surface to constitute the cavity 113) of the insert block 116 was ground and finished with a diamond grinder so as to have a surface roughness $R_y$ of 0.02 μm. The zirconia used has a thermal conductivity of 0.8×10$^{-2}$ cal/cm·sec·°C.

The first mold member (movable mold member) 110 was fabricated from carbon steel S55C. The first mold member 110 was cut so as to form an insert block attaching portion 110A having internal dimensions of 102.20 mm×102.20 mm× a depth of 3.02 mm for the insert block 116 (see FIG. 13A) and then, the insert block 116 was attached to the insert block attaching portion 110A (see FIG. 13B) with a silicone adhesive (not shown). A space gage was used to measure a clearance (D) between the insert block 116 and the insert block attaching portion 110A, and it was found that the clearance was 0.05 mm at a minimum.

The second mold member (fixed mold member) 111 was fabricated from carbon steel S55C. The gate portion 112 having a direct gate structure as a molten thermoplastic resin introduction portion having a diameter of 4 mm was formed in the center of the second mold member 111. Further, the cavity 113 having a size of 100 mm×100 mm×4 mm and the mold portions 117 for forming the projections 121 of the molded article and the mold portions 118 for forming the projections 122 of the molded article were engraved in the second mold member 111 (see FIG. 13C).

The thus-fabricated first mold member (movable mold member) 110 and second mold member (fixed mold member) 111 are assembled whereby a mold assembly can be obtained. In the above mold assembly, a clearance ($C_{11}$) between the insert block 116 and the insert block covering portion 115 was 0.02 mm ($C_{11}$=0.02 mm), and an amount ($\Delta S_{11}$) of overlapping of the insert block covering portion 115 over the insert block 116 was 1.0 mm ($\Delta S_{11}$=1.0 mm). In this manner, there can be formed a structure in which the edge portion of the insert block 116 is out of contact with a molten resin introduced into the cavity 113.

The completed mold assembly was attached to a molding machine, heated up to 130° C. with a mold temperature controller and rapidly cooled to 40° C., to show that the insert block 116 formed of zirconia had no damages such as cracking.

The same molding machine as that used in Example 1 was used, and thermoplastic resins (A) to (F) shown in the following Table 14 were used. Each of these thermoplastic resins contained 0.2% by weight of a mold release agent or a lubricant. The mold temperature T (unit: °C.) was set as shown in the following Table 15 depending upon thermoplastic resins used. All thermoplastic resins are supplied by Mitsubishi Engineering Plastics Corp.

TABLE 14

Thermoplastic resin (A): Polycarbonate resin as an amorphous thermoplastic resin (S3000, $T_g$=145° C.) Thermoplastic resin (B): Polybutylene terephthalate resin as a crystalline thermoplastic resin (501R5, $T_c$=193° C.

Thermoplastic resin (C): Polycarbonate resin/polybutylene terephthalate resin as a polymer alloy material (MB4303, weight ratio=7:3, $T_g$ of polycarbonate resin=145° C.

Thermoplastic resin (D): Polycarbonate resin/polybutylene terephthalate resin as a polymer alloy material (GMB4030, weight ratio=7:3, $T_g$ of polycarbonate resin=145° C., containing 30% by weight of a glass fiber having an average length of 200 μm and an average diameter of 13 μm Thermoplastic resin (E): Polycarbonate resin/polybutylene terephthalate resin as a polymer alloy material (weight ratio=1:1, $T_g$ of polycarbonate resin=145° C.

Thermoplastic resin (F): Polycarbonate resin/polybutylene terephthalate resin as a polymer alloy material (5710G30, weight ratio=3:7, $T_g$ of polybutylene terephthalate resin=193° C., containing 30% by weight of a glass fiber having an average length of 200 μm and an average diameter of 13 μm

TABLE 15

| Thermoplastic resins used | T(° C.) | Temperature (° C.) of molten thermoplastic resin |
|---|---|---|
| (A) | 80(= $T_g$ − 65) | 290 |
| (B) | 70(= $T_c$ − 123) | 250 |
| (C) | 100(= $T_g$ − 45) | 290 |
| (D) | 65(= $T_g$ − 80) | 280 |
| (E) | 80(= $T_g$ − 65) | 270 |
| (F) | 80(= $T_c$ − 113) | 250 |

The injection pressure was set at 700 kgf/cm²−G, and a predetermined amount of a molten thermoplastic resin was introduced (injected) into the cavity 113 through the gate portion 112, and after 20 seconds, the mold assembly was opened. Then, a molded article was taken out from the mold assembly.

Concerning all the thermoplastic resins, those portions of one surface of the molded article 120 which portions had been in contact with the insert block 116 (the molded article surface portions opposed to the projections 121 and 122 and the molded article surface portion opposed to the thermoplastic resin introduction mark 123) showed almost no sink marks in spite of the presence of the ribs 121, the bosses 122 and the thermoplastic resin introduction portion mark 123 on the other surface (back surface) 120B. Further, when the thermoplastic resin (D) or (F) containing a glass fiber was used, glass fibers were not precipitated, and the molded articles had remarkably high mirror surface properties. Further, molding defects such as a flow mark and a jetting were not observed, either. The molded article surface portions opposed to the projections 121 and 122 and the molded article surface portion opposed to the thermoplastic resin introduction portion mark 123 (to which portions indicated by slanting lines in FIG. 11C correspond) were measured with a surface roughness tester to show amounts (depths) of sink marks of 2 μm to 15 μm.

When the above molding of each resin was continuously carried out 10000 cycles, the insert block 116 suffered no damages such as breakage.

Comparative Example 4

A mold assembly used in Comparative Example 4 was the same as the mold assembly used in Example 4 except that the insert block 116 used in Example 4 was replaced with an insert block formed of carbon steel (thermal conductivity 11×10⁻² cal/cm·sec·°C.) which had been mirror-finished so as to have a surface roughness $R_y$ of 0.02 μm. And, the same thermoplastic resins (A) to (D) as those used in Example 4 were used for molding under the same conditions as those in Example 4. However, each molten thermoplastic resin was poor in fluidity in the cavity 113, and it was difficult to completely fill the cavity 113 with each molten thermoplastic resin. The injection pressure was increased by 200 kgf/cm²−G, and the molding was carried out at 900 kgf/cm²−G. In the molded article surface portions opposed to projections 121 and 122 of each molded article and the molded article surface portion opposed to a thermoplastic resin introduction portion mark 123 of each molded article (to which the portions indicated by slanting lines in FIG. 11C correspond), amounts (depths) of sink marks were 30 μm to 100 μm. Moreover, molding defects such as a flow mark and a jetting occurred. Further, the molded article of the thermoplastic resin (D) had glass fibers deposited on the surface and was extremely poor in mirror surface property as compared with the counterpart in Example 4.

Comparative Example 5

Comparative Example 5 used the same mold assembly as that used in Example 4 and the same thermoplastic resins (A) to (D) as those used in Example 4. However, the mold temperature T was changed as shown in the following Table 6.

TABLE 16

| Thermoplastic resin used | T (° C.) | |
|---|---|---|
| (A) | 60(= $T_g$ − 85) | <$T_g$ − 80 |
| (B) | 60(= $T_c$ − 133) | <$T_c$ − 130 |
| (C) | 50(= $T_g$ − 95) | <$T_g$ − 90 |
| (D) | 40(= $T_g$ − 105) | <$T_g$ − 90 |

In the molded article surface portions opposed to projections 121 and 122 of each molded article and the molded article surface portion opposed to a thermoplastic resin introduction portion mark 123 of each molded article (to which the portions indicated by slanting lines in FIG. 11C correspond), amounts (depths) of sink marks were 25 μm to 50 μm. Moreover, molding defects such as a flow mark and a jetting occurred. Further, the molded article of the thermoplastic resin (D) had glass fibers deposited on the surface and was extremely poor in mirror surface property as compared with the counterpart in Example 4.

Comparative Example 6

Comparative Example 6 used the same mold assembly as that used in Example 4 and the same thermoplastic resin (A) (which further contained 0.45% by weight of a mold release agent). The thermoplastic resin (A) containing the mold release agent was molded under the same conditions as those in Example 4.

In the molded article surface portions opposed to projections 121 and 122 and the molded article surface portion opposed to a thermoplastic resin introduction portion mark 123 of the obtained molded article (to which the portions indicated by slanting lines in FIG. 11C correspond), sink marks were visually clearly observed although they were very small. Amounts (depths) of sink marks were measured to show 22 μm to 30 μm. No molding defects such as a flow mark and a jetting were found.

Figure 14A:
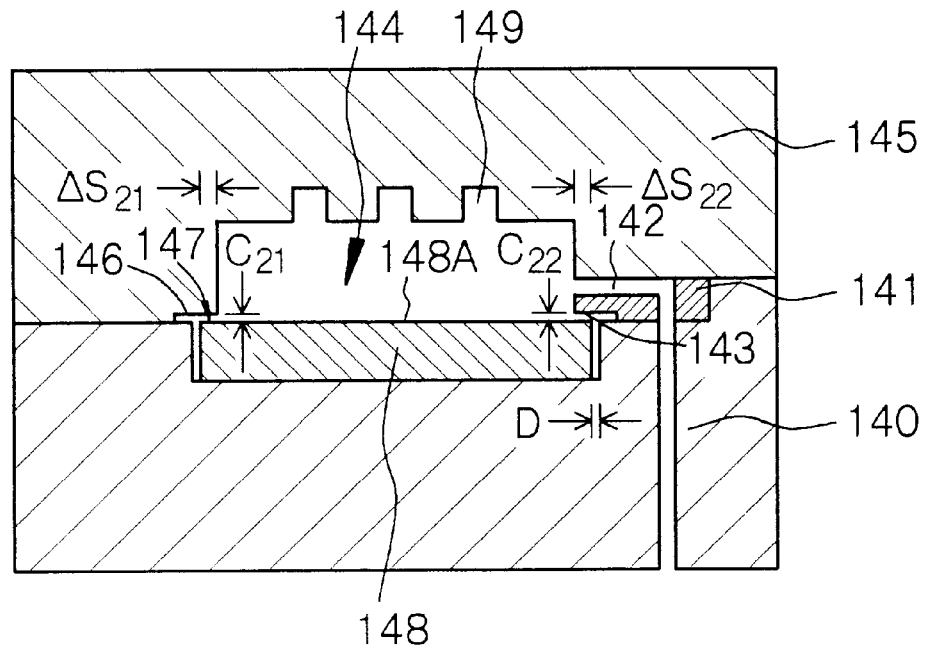
FIGS. 14A and 14B are schematic cross-sectional views of a mold assembly at a time of clamping the mold members, which mold assembly is structurally different from that shown in FIGS. 11A, 11B and 11C to some extent and is suitable for use in the method of manufacturing a molded article of a thermoplastic resin according to the present invention.
Figure 14B:
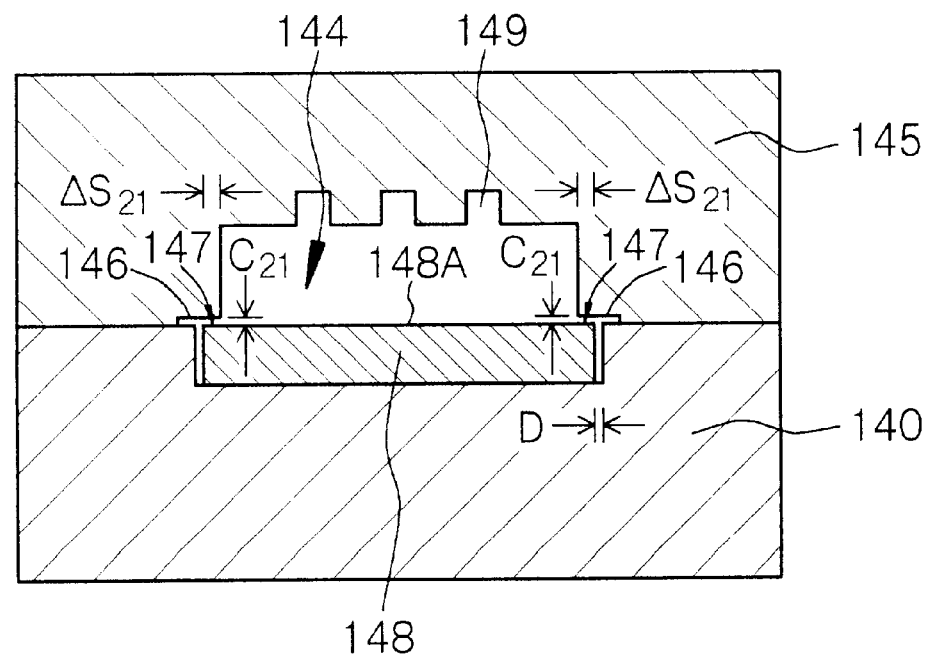

In Example 4, alternatively, as FIGS. 14A and 14B show schematic cross-sectional views, there may be used a mold assembly structured as follows (according to the second aspect of the present invention). It has (a) a first mold member 140 and a second mold member 145 for manufacturing a molded article of a thermoplastic resin, (b) an insert block 148 which is disposed in the first mold member 140, constitutes part of a surface constituting a cavity 144, has a thickness of 0.1 mm to 10 mm and is formed of a material having a thermal conductivity of $2 \times 10^{-2}$ cal/cm·sec·°C., and (c) a cover plate 141 which is disposed between the insert block 148 and the second mold member 145, is attached to the first mold member 140 and is provided with a molten thermoplastic resin introduction portion 142. And, the second mold member 145 is provided with an insert block covering portion 147, and in a state where the first mold member 140 and the second mold member 145 are clamped, (A) the insert block 148 and the insert block covering portion 147 are arranged to have a clearance ($C_{21}$) of 0.03 mm or less ($C_{11} \leq 0.03$ mm), (B) the insert block covering portion 147 is arranged to have an amount ($\Delta S_{21}$) of overlapping of at least 0.5 mm ($\Delta S_{21} \geq 0.5$ mm) over the insert block 148, (C) the insert block 148 and the cover plate 141 are arranged to have a clearance ($C_{22}$) of 0.03 mm or less ($C_{22} \leq 0.03$ mm), and (D) the cover plate 141 has an amount ($\Delta S_{22}$) of overlapping of at least 0.5 mm ($\Delta S_{22} \geq 0.5$ mm) over the insert block 148. As shown in FIGS. 14A and 14B, the cover plate 141 overlaps only part of the insert block 148. The insert block covering portion 147 is a kind of an incision formed on that surface of the second mold member 145 which faces (or is opposed to) a cavity wall 148A of the insert block 148. The molten thermoplastic resin introduction portion 142 in the above-structured mold assembly includes, for example, a direct gate structure. Reference numeral 149 indicates mold portions for forming projections of a molded article.

Figure 15A:
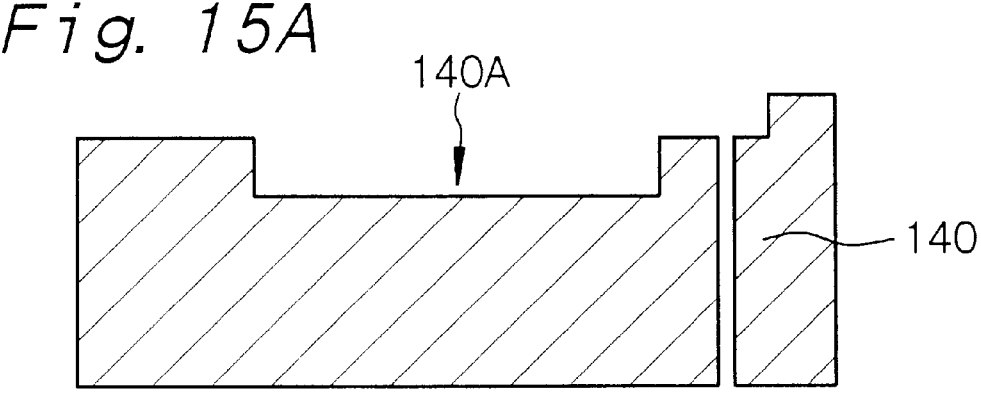
FIGS. 15A, 15B and 15C are schematic cross-sectional views of the mold assembly shown in FIGS. 14A and 14B, which mold assembly is being assembled.
Figure 15B:
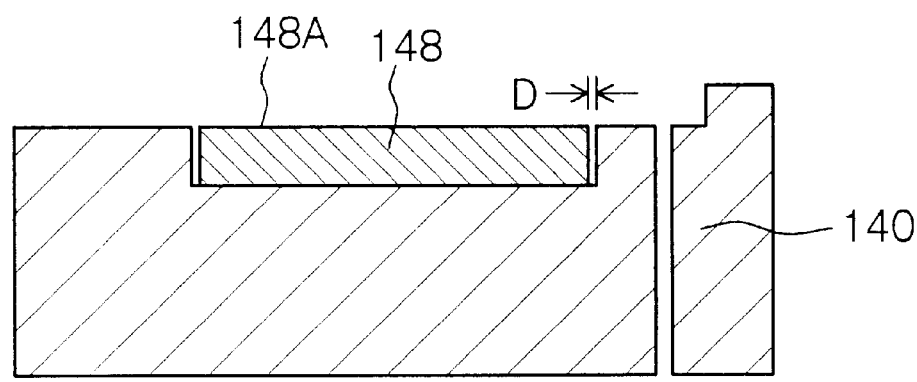
Figure 15C:
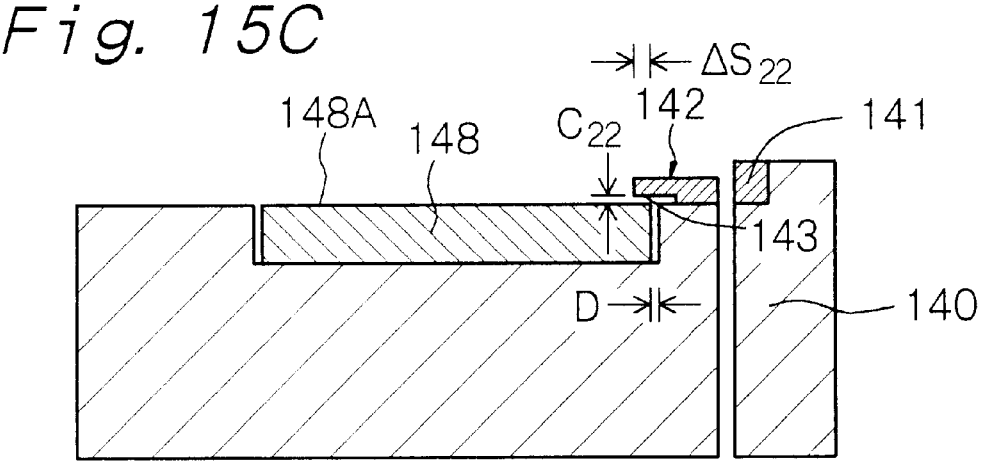
Figure 16:
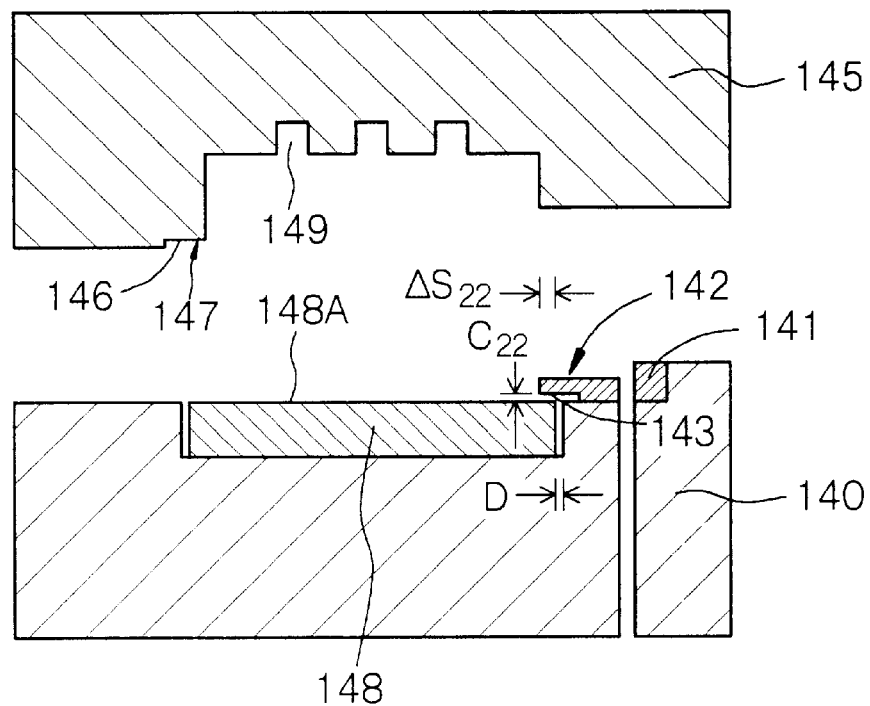
FIG. 16 is a schematic cross-sectional view of the mold assembly shown in FIGS. 14A and 14B, at a time of opening the mold members.

FIGS. 14A and 14B show schematic cross-sectional views of the mold assembly viewed when it is clamped, FIG. 16 shows a schematic cross-sectional view of the mold assembly viewed when it is opened. FIGS. 15A, 15B and 15C show schematic cross-sectional views of the mold assembly viewed when it is being assembled. FIGS. 14A, 14B, 15A, 15B, 15C and 16 show cross-sectional views taken by cutting the cover-plate-including region of the mold assembly with a perpendicular plane, and FIG. 14B shows a cross-sectional view taken by cutting the cover-plate-non-including region of the mold assembly with a perpendicular plane in parallel with the above perpendicular plane.

The first mold member (fixed mold member) 140 can be fabricated from carbon steel S55C. The first mold member 140 is cut and ground to form an insert block attaching portion 140A (see FIG. 15A) for the insert block 148, and then, the insert block 148 is attached to the insert block attaching portion 140A (see FIG. 15A) with a silicone adhesive (not shown). A space gage is used to measure a clearance (D) between the insert block 148 and the insert block attaching portion 140A, and preferably, the insert block attaching portion 140A is cut and ground so as to have a minimum clearance of at least 0.005 mm. On the other hand, the second mold member (movable mold member) 145 can be fabricated from carbon steel S55C.

The cover plate 141 can be fabricated from carbon steel, and it is attached to a predetermined position of the first mold member 140 (see FIG. 15C) with a bolt (not shown). The molten thermoplastic resin introduction portion (gate portion) 142 is formed in the cover plate 141. The cover plate 141 is made or machined such that a clearance ($C_{22}$) between the insert block 148 and that surface 143 of the cover plate which faces (or is opposed to) the insert block 148 satisfies $C_{22} \leq 0.03$ mm, and an amount ($\Delta S_{22}$) of overlapping of the cover plate 141 over the insert block 148 satisfies $\Delta S_{22} \geq 0.5$ mm.

The thus-fabricated first mold member (fixed mold member) 140 and second mold member (movable mold member) 145 are assembled, whereby the mold assembly can be obtained. In the mold assembly, the insert block covering portion 147 is made or machined such that a clearance ($C_{21}$) between the insert block 148 and the insert block covering portion 147 satisfies $C_{21} \leq 0.03$ mm, and an amount ($\Delta S_{21}$) of overlapping of the insert block covering portion 147 over the insert block 148 satisfies $\Delta S_{21} \geq 0.5$ mm, whereby there can be obtained a structure in which the edge portion of the insert block 148 and a molten resin introduced into the cavity 144 are out of contact.

Figure 17A:
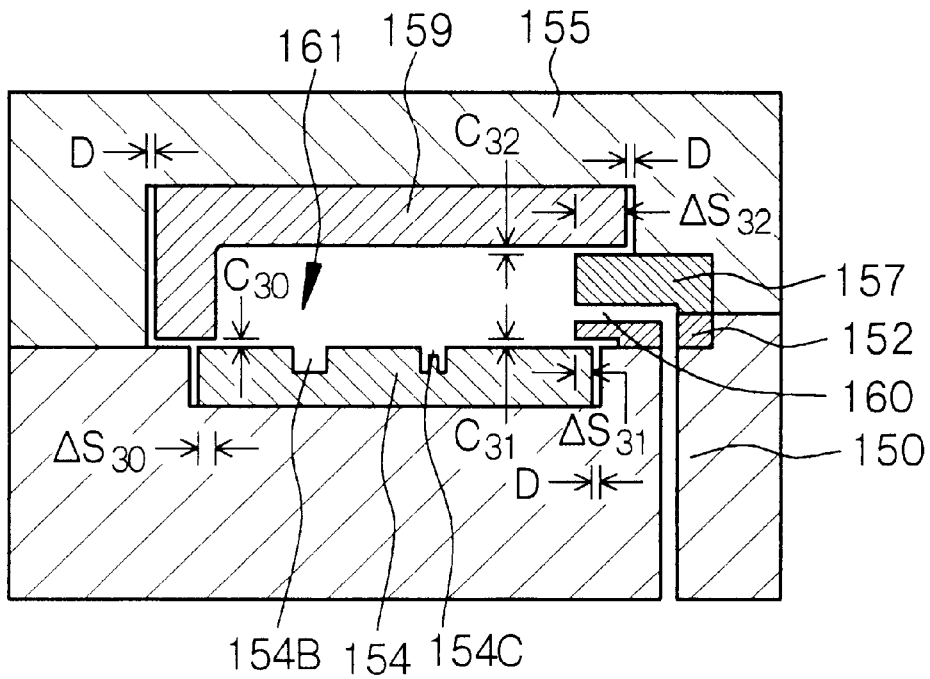
FIGS. 17A and 17B are schematic cross-sectional views of a mold assembly at a time of clamping the mold members, which mold assembly is structurally different from that shown in FIGS. 11A, 11B and 11C to some extent and is suitable for use in the method of manufacturing a molded article of a thermoplastic resin according to the present invention.
Figure 17B:
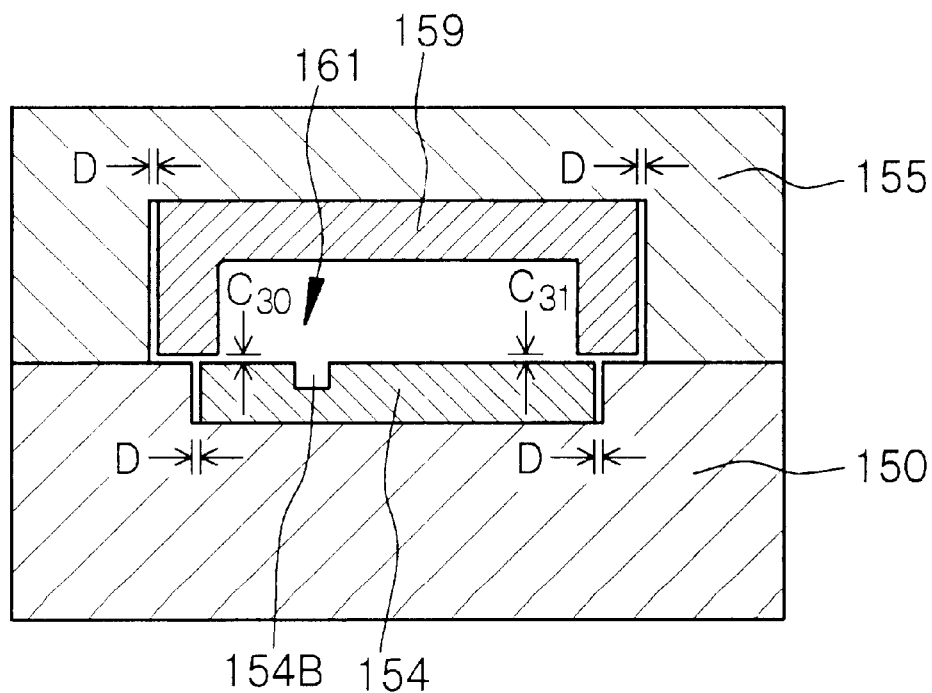
Figure 18A:
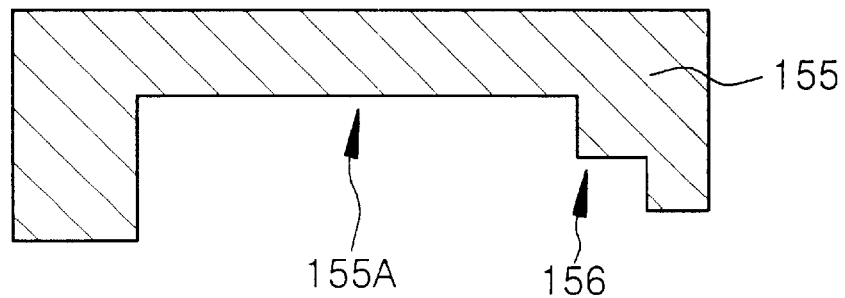
FIGS. 18A, 18B, 18C and 18D are schematic cross-sectional views of the mold assembly shown in FIGS. 17A and 17B, which mold assembly is being assembled.
Figure 18B:
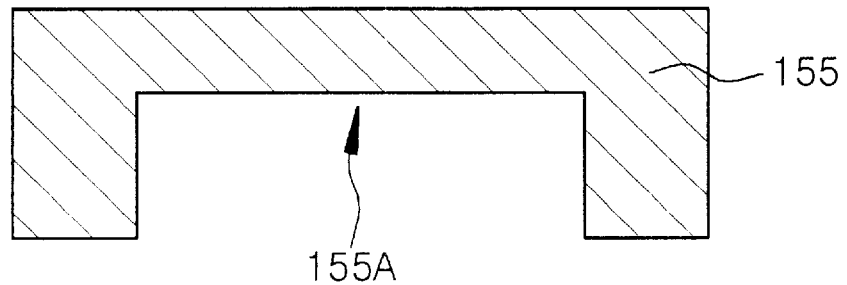
Figure 18C:
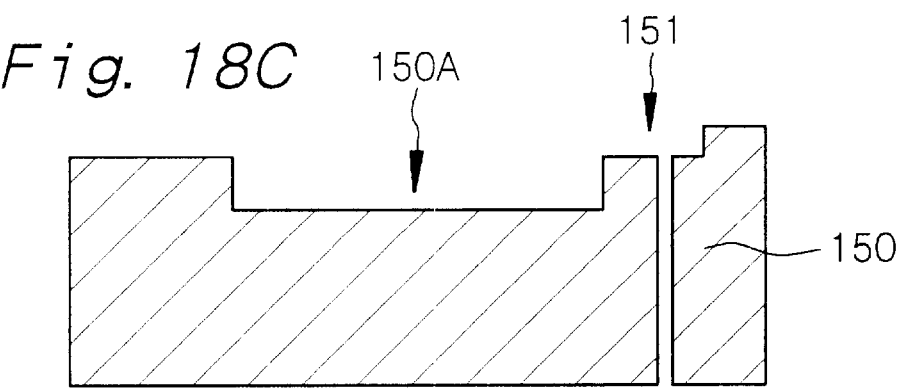
Figure 18D:
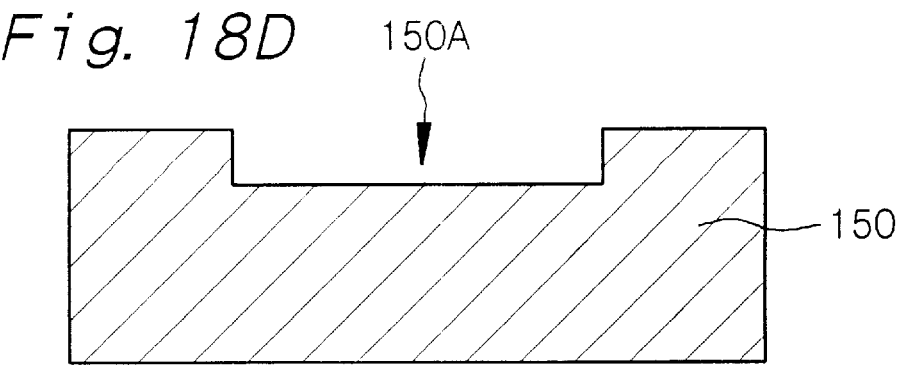
Figure 19A:
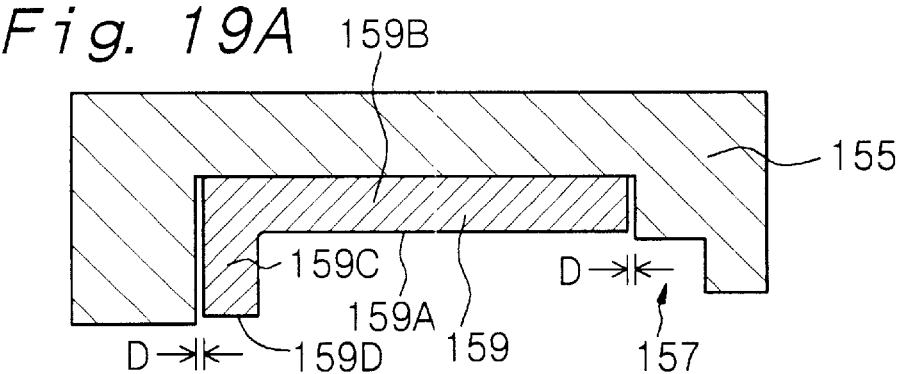
FIGS. 19A, 19B, 19C and 19D, subsequent to FIGS. 18A, 18B, 18C and 18D, are schematic cross-sectional views of the mold which is being assembled.
Figure 19B:
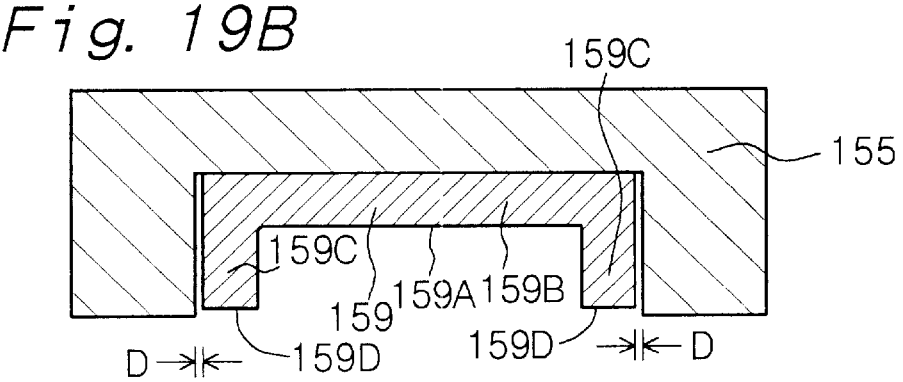
Figure 19C:
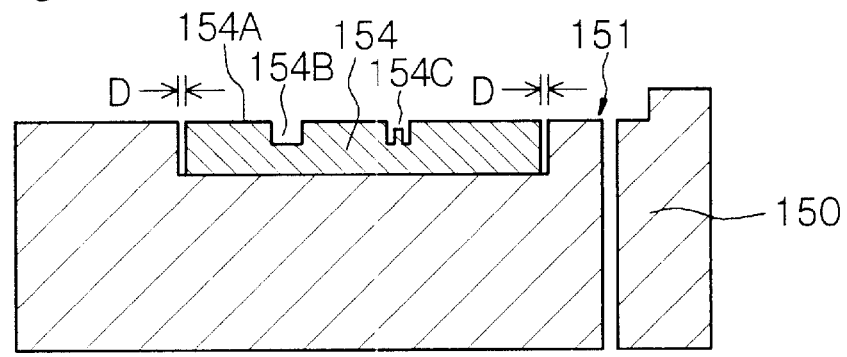
Figure 19D:
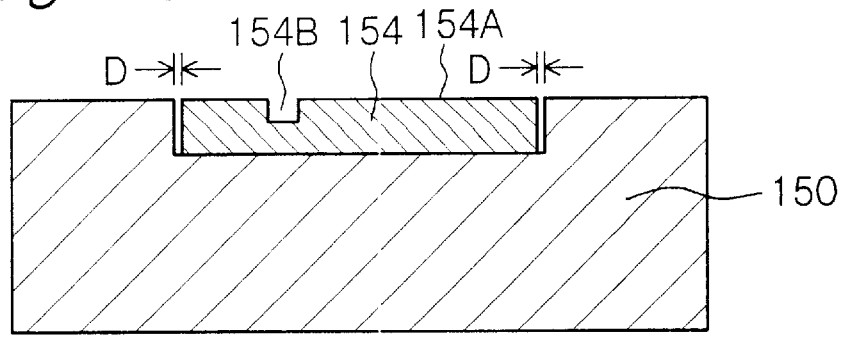
Figure 20A:
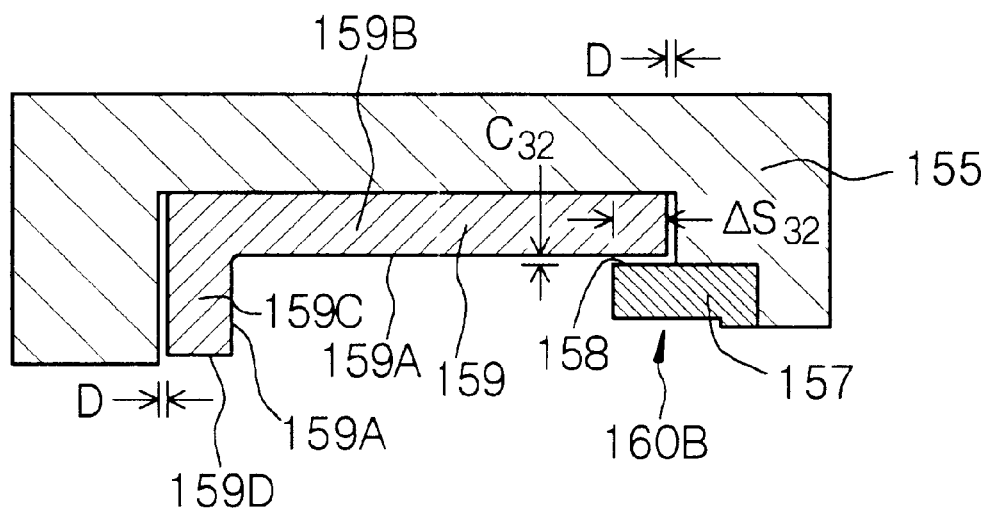
FIGS. 20A and 20B are schematic cross-sectional views of the mold assembly shown in FIGS. 17A and 17B, at a time of opening the mold members.
Figure 20B:
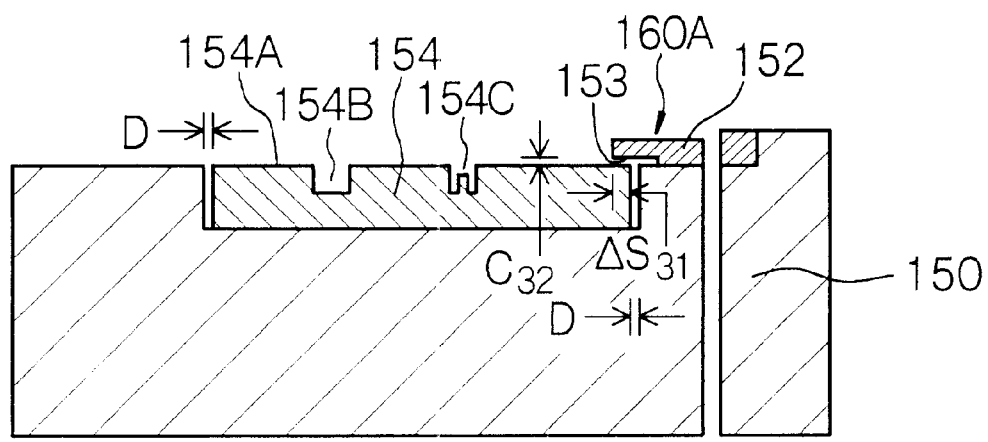

Alternatively, as FIGS. 17A and 17B show schematic cross-sectional views, there may be also used a mold assembly structured as follows. It has (a) a first mold member 150 and a second mold member 155 for manufacturing a molded article of a thermoplastic resin, (b) a first insert block 154 which is disposed in the first mold member 150, constitutes part of a surface constituting a cavity, has a thickness of 0.1 mm to 10 mm and is formed of a material having a thermal conductivity of $2 \times 10^{-2}$ cal/cm·sec·°C. or less, (c) a second insert block 159 which is disposed in the second mold member 155, constitutes part of a surface constituting the cavity, has a thickness of 0.1 mm to 10 mm and is formed of a material having a thermal conductivity of $2 \times 10^{-2}$ cal/cm·sec·°C. or less, and (d) cover plates 152 and 157 which are disposed between the first insert block 154 and the second insert block 159, are attached to the first mold member 150, the second mold member 155 or the first and second mold members 150 and 155 and are provided with a molten thermoplastic resin introduction portion 160, and in a state where the first mold member 150 and the second mold member 155 are clamped, (A) that surface 154A of the first insert block 154 which faces (or is opposed to) the second insert block 159 and that surface 159D of the second insert block 159 which faces (or is opposed to) the first insert block 154 are arranged to have a clearance ($C_{30}$) of 0.03 mm or less ($C_{30} \leq 0.03$ mm), (B) that surface 154A of the first insert block 154 which faces (or is opposed to) the second insert block 159 and that surface 159D of the second insert block 159 which faces (or is opposed to) the first insert block 154 are arranged to have an amount ($\Delta S_{30}$) of overlapping of at least 0.5 mm ($\Delta S_{30} \geq 0.5$ mm), (C) a clearance ($C_{31}$) between the insert block 154 and the cover plate 152 and a clearance ($C_{32}$) between the second insert block 159 and the cover plate 157 are arranged to be 0.03 mm or less ($C_{31} \leq 0.03$ mm and $C_{32} \leq 0.03$ mm), respectively, and (D) an amount ($\Delta S_{31}$) of overlapping of the cover plate 152 over the first insert block 154 is arranged to be at least 0.5 mm ($\Delta S_{31} \geq 0.5$ mm) and an amount ($\Delta S_{32}$) of overlapping of the cover plate 157 over the second insert block 159 is arranged to be at least 0.5 mm ($\Delta S_{32} \geq 0.5$ mm) (mold assembly according to the third aspect of the present invention). The cover plates 152 and 157 overlap only parts of the first and second insert blocks 154 and 159. The molten thermoplastic resin introduction portion 160 in the above-structured mold assembly includes, for example, a side gate structure. Numeral reference 161 indicates a cavity.

FIGS. 18A, 18B, 18C, 18D, 19A, 19B, 19C, 19D, 20A and 20B show schematic cross-sectional views of the mold assembly viewed when it is being assembled. FIGS. 17A, 18A, 18C, 19A, 19C and 20A show cross-sectional views taking by cutting a mold assembly region including the cover plates 152 and 157 with a perpendicular plane. FIGS. 17B, 18B, 18D, 19B, 19D and 20B show cross-sectional views taken by cutting a mold assembly region containing neither the cover plate 152 nor the cover plate 157 with a perpendicular plane in parallel with the above perpendicular plane.

In the above mold assembly, the first insert block 154 is fabricated by press-forming zirconia so as to form mold portions in a cavity wall for forming projections of a molded article (mold portions 154B for forming ribs and mold portions 154C for forming bosses) and sintering it. The first insert block 154 has a form of a rectangular parallelepiped except these mold portions 154B and 154C. Further, the second insert block 159 is fabricated by press-forming zirconia so as to form a concave-shaped form of a cavity wall and sintering it. A concave-shaped portion is formed in the second insert block 159. A bottom 159B of the second insert block 159 has a predetermined thickness. Further, the second insert block 159 has a rising portion 159C from the bottom 159B. Preferably, internal side surfaces 159A of the bottom surface 159B of the concave-shaped portion and of the rising portion 159C of the second insert block 159 (these surfaces are to constitute a cavity wall) are ground and finished with a diamond grinder. Further, a boundary portion between the bottom 159B of the concave-shaped portion and the rising portion 159C of the second insert block 159 is preferably formed of a curved surface having a radius of 0.1 mm. For attaching the second cover plate 157 to the second mold member 155, part of the rising portion 159C of the second insert block 159 is removed (see FIGS. 19A and 19B).

The first mold member (fixed mold member) 150 can be fabricated from carbon steel S55C. The insert block attaching portion 150A for the first insert block 154 is formed in the first mold member 150 (see FIGS. 18C and 18D). Reference numeral 151 indicates a first cover plate attaching portion. And, the first insert block 154 is attached to the insert block attaching portion 150A (see FIGS. 19C and 19D) with a silicone adhesive (not shown). A space gage is used to measure a clearance (D) between the first insert block 154 and the insert block attaching portion 150A, and preferably, the insert block attaching portion 150A is made or machined such that the minimum clearance is at least 0.005 mm.

The second mold member (movable mold member) 155 can be also fabricated from carbon steel S55C. An insert block attaching portion 155A for the second insert block 159 is formed in the second mold member 155 (see FIGS. 18A and 18B). Reference numeral 156 indicates a second cover plate attaching portion. Then, the second insert block 159 is attached to the insert block attaching portion 155A (see FIGS. 19A and 19B) with a silicone adhesive (not shown). A space gage is used to measure a clearance (D) between the second insert block 159 and the insert block attaching portion 155A, and preferably, the insert block attaching portion 155A is made or machined such that the minimum clearance is at least 0.005 mm.

The first cover plate 152 is fabricated from carbon steel, and it is fixed to a predetermined position of the first cover plate attaching portion 151 of the first mold member 150 (see FIG. 20B) with a bolt (not shown). Part 160A of the molten thermoplastic resin introduction portion is formed in the first cover plate 152. Further, the second cover plate 157 is fabricated from carbon steel, and it is fixed to a predetermined position of the second cover plate attaching portion 156 of the second mold member 155 (see FIG. 20A) with a bolt (not shown). Part 160B of the molten thermoplastic resin introduction portion is formed in the second cover plate 157. In a state where the first mold member and the second mold member are clamped, the molten thermoplastic resin introduction portion 160 is constituted by the first cover plate 152 and the second cover plate 157. The molten thermoplastic resin introduction portion 160 in the above-structured mold assembly includes, for example, a side gate structure.

A mold assembly can be obtained by assembling the thus-fabricated first mold member (fixed mold member) 150 and second mold member (movable mold member) 155. In the above mold assembly, the first insert block 154, the second insert block 159, the first cover plate 152 and the second cover plate 157 are made or machined such that $C_{30}$, $\Delta S_{30}$, $C_{31}$, $C_{32}$, $\Delta S_{31}$ and $\Delta S_{32}$ satisfy the predetermined values in a state where the first mold member 150 and the second mold member 155 are clamped. Reference numeral 153 indicates that surface of the first cover plate 152 which faces (or is opposed to) the first insert block 154, and reference numeral 158 indicates that surface of the second cover plate 157 which faces (or is opposed to) the second insert block 159.

The present invention has been explained with reference to preferred embodiments hereinabove, while the present invention shall not be limited thereto. The structures of the mold assemblies explained in Examples, the used thermoplastic resins and the injection molding conditions are all examples and may be modified as required.

Figure 21A:
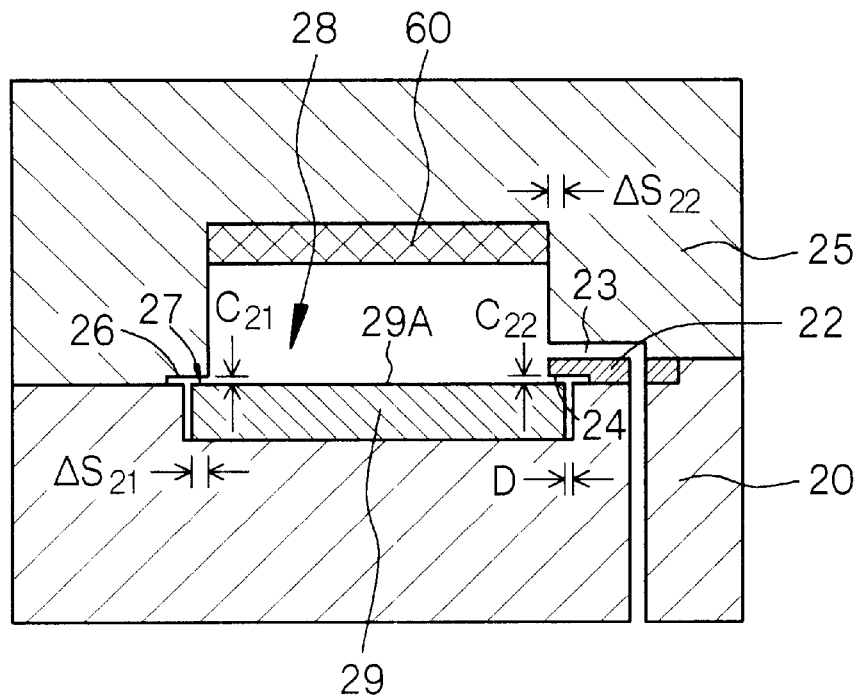
FIGS. 21A and 21B are a schematic cross-sectional view of a mold assembly structured so as to vary a volume of a cavity at a time of molding for the production of a molded article, which mold assembly is being clamped, and a schematic cross-sectional view of the mold assembly, etc., after the introduction of a molten thermoplastic resin into the cavity.
Figure 21B:
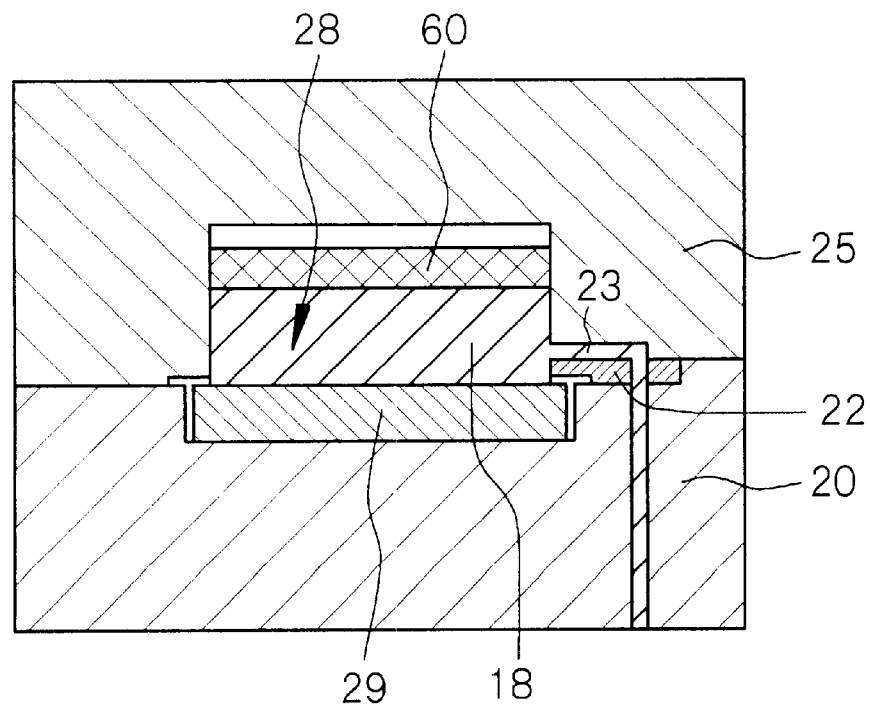

For example, as schematically shown in FIG. 21A, there may be used a mold assembly having a structure in which the cavity volume is variable when a molded article is produced. In this case, a core member 60 movable with a hydraulic cylinder (not shown) can be disposed in the cavity 28 of the mold assembly. In an embodiment shown in FIG. 21A, the core member 60 is incorporated into the mold assembly explained in Example 2. For manufacturing a molded article, the first mold member 20 and the second mold member 25 are clamped and the position of the core member 60 in the cavity 28 is controlled such that the volume ($V_c$) of the cavity 28 is greater than the volume ($V_M$) of a molded article to be manufactured. Then, a molten thermoplastic resin 18 is introduced into the cavity 28 (volume: $V_c$), and before or concurrently with the initiation of introduction of the molten thermoplastic resin, during the introduction, or after the completion of the introduction (including a time when the introduction is completed), the core member 60 is moved under the function of a hydraulic cylinder (not shown), to decrease the volume of the cavity 28 until the volume ($V_M$) of the molded article to be produced. FIG. 21B schematically shows the above state. When the above mold assembly which structurally permits the varying of a cavity volume during the production of a molded article, the surface of the molded article can be uniformly compressed, so that the occurrence of a sink mark on the surface of the molded article can be prevented.

Figure 22A:
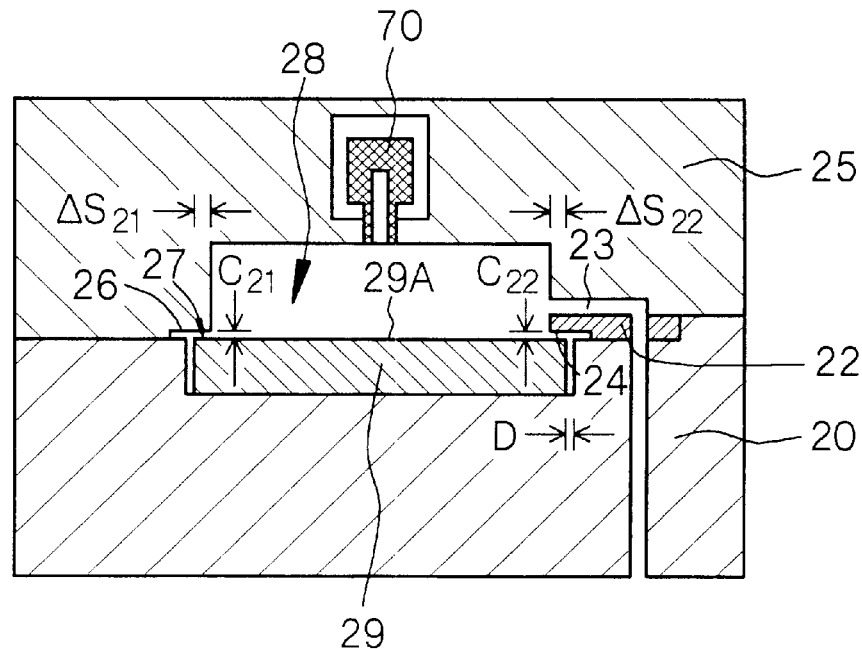
FIGS. 22A and 22B are a schematic cross-sectional view of a mold assembly provided further with a pressurized-fluid introducing device, at a time of clamping the mold members, and a schematic cross-sectional view of the mold assembly, etc., at a time when the introduction of a molten thermoplastic resin into a cavity is just completed.
Figure 22B:
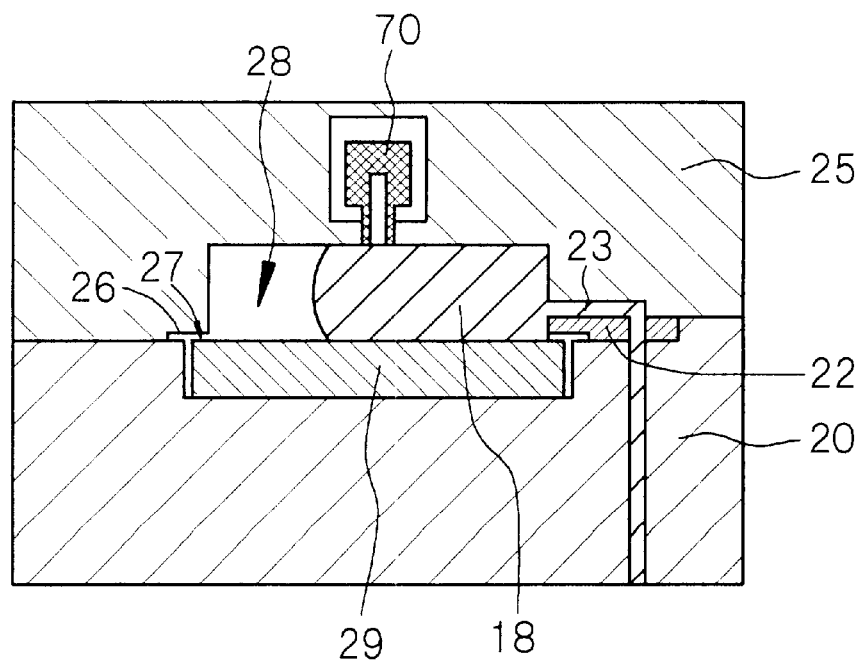
Figure 23:
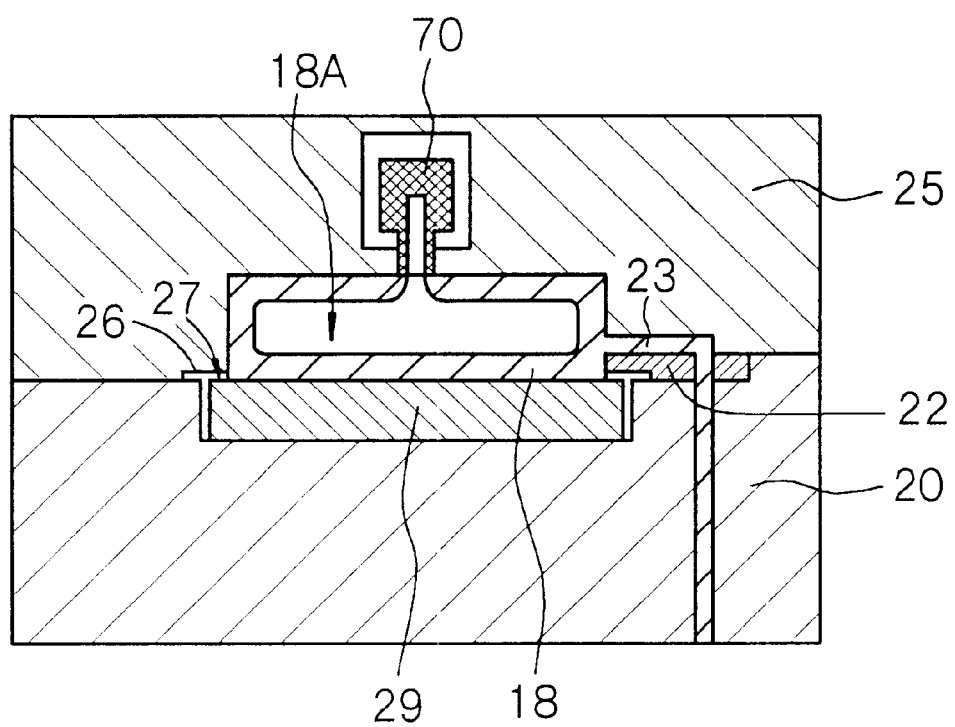
FIG. 23 is a schematic cross-sectional view of a mold assembly, etc., at a time when the introduction of a pressurized fluid into the molten thermoplastic resin is just completed.

In another embodiment, there may be also used a mold assembly which further has a pressurized-fluid introducing device 70 as schematically shown in FIG. 22A. In an embodiment shown in FIG. 22A, the pressurized-fluid introducing device 70 is disposed in a pressurized-fluid introducing device attaching portion provided in the mold member. The pressurized-fluid introducing device attaching portion communicates with the cavity 28. A pressurized fluid is introduced into a molten thermoplastic resin 18 in the cavity 28 from the pressurized-fluid introducing device 70, to form a hollow portion 18A inside the thermoplastic resin in the cavity 28. FIG. 22B schematically shows a state where the introduction of the molten thermoplastic resin 18 into the cavity 28 is completed, and FIG. 23 schematically shows a state where the introduction of a pressurized fluid into the molten thermoplastic resin 18 is completed. When the pressurized fluid is introduced into the molten thermoplastic resin 18 in the cavity 28 as described above, the resin in the cavity 28 is pressed toward the cavity wall, and as a result, the occurrence of a sink mark on a molded article can be reliably prevented. Further, since the cooling and solidification of the molten resin in contact with the insert block 29 are delayed, there can be avoided a phenomenon that a resin portion which starts to be solidified in the vicinity of the cavity wall of the insert block and an inside resin portion are mixed with each other, and there can be prevented the occurrence of color non-uniformity and defective appearance on or around a greater thickness portion of a molded article.

Figure 24A:
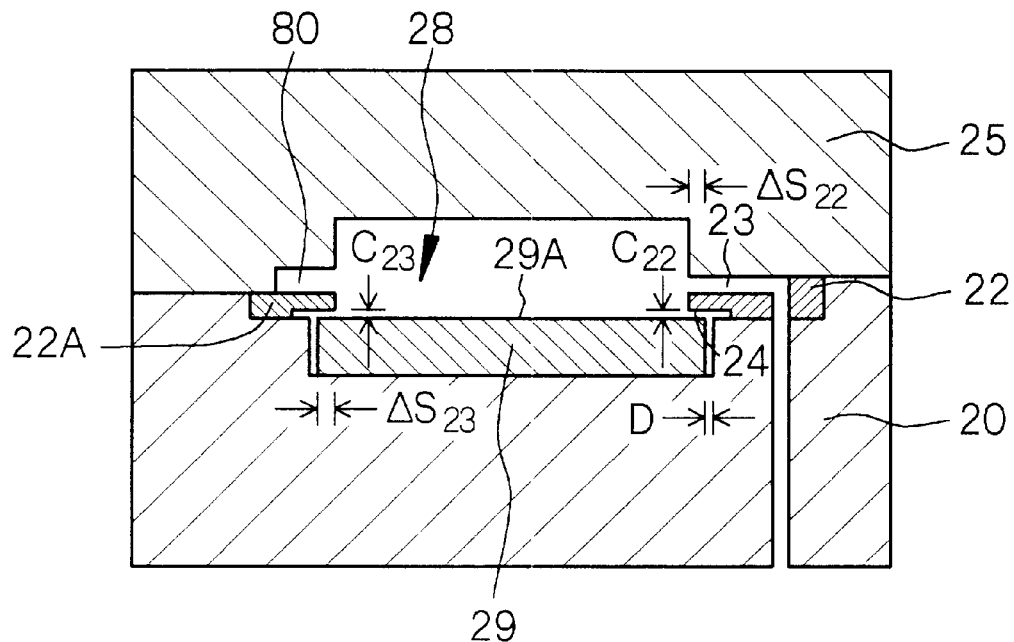
FIGS. 24A and 24B are schematic cross-sectional views of a mold assembly having a structure in which a cover plate is provided with a tab forming portion communicating with a cavity for taking out a molded article from the mold assembly, at a time of claming the mold members.
Figure 24B:
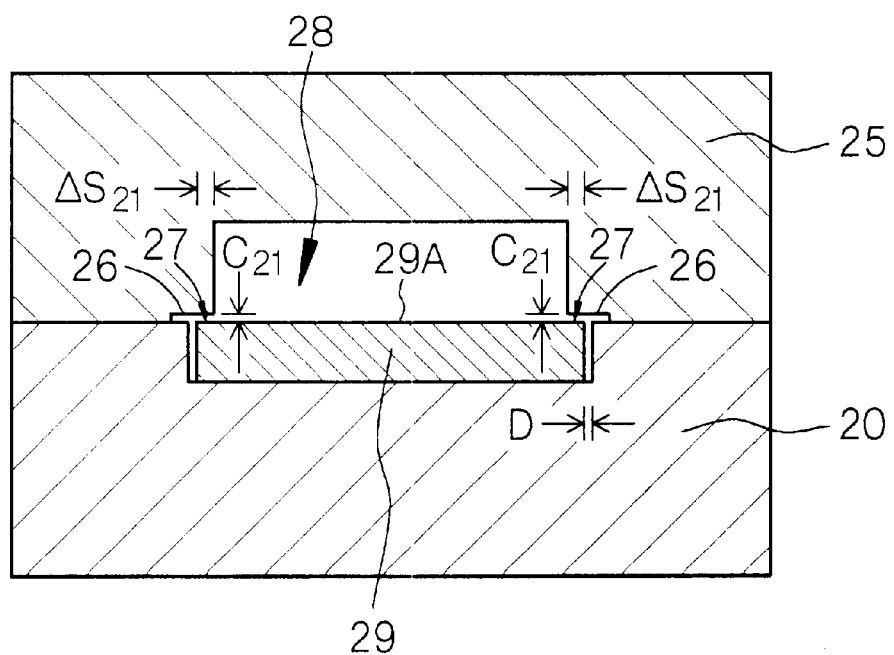
Figure 25A:
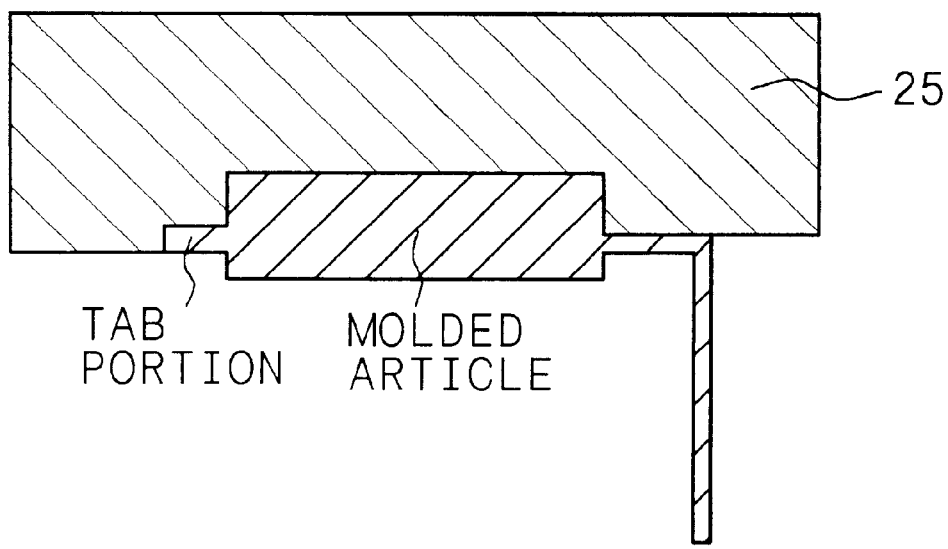
FIGS. 25A and 25B show states of the movable mold member and the molded article after the mold assembly shown in FIGS. 24A and 24B is opened.
Figure 25B:
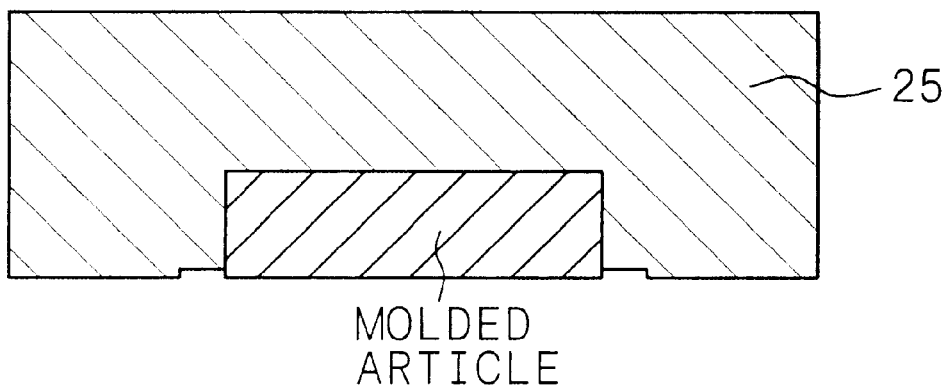

FIGS. 24A and 24B show structures in which a tab-forming portion 80 communicating with a cavity 28 is formed in a cover plate 22A for taking out a molded article from a mold assembly. The cover plate 22A is attached to a first mold member 20, in which case an insert block 29 and the cover plate 22A are also required to satisfy a clearance ($C_{23}$) of 0.03 mm or less. The above mold assembly has substantially the same structure as that of the mold assembly explained in Example 2. Further, cover plates 22A are also provided in two places in a direction perpendicular to the drawing paper surface of FIG. 24A. FIGS. 24A and 25A are cross-sectional views obtained by cutting that region of the mold assembly which includes the cover plates 22 and 22A with a perpendicular plane, and FIGS. 24B and 25B are cross-sectional views obtained by cutting that region of the mold assembly which includes neither the cover plate 22 nor 22A with a perpendicular plane in parallel with the above perpendicular plane. When the mold assembly is structured as described above, a tab portion is formed on a molded article. After the mold assembly is opened (see FIGS. 25A and 25B), a molded article can be pressed out by setting a knock-out pin (not shown) disposed in the second mold member 25 to the above tab portion, to take out the molded article from the mold assembly. The tab portion formed on the molded article can be removed in a later step.

Figure 26A:
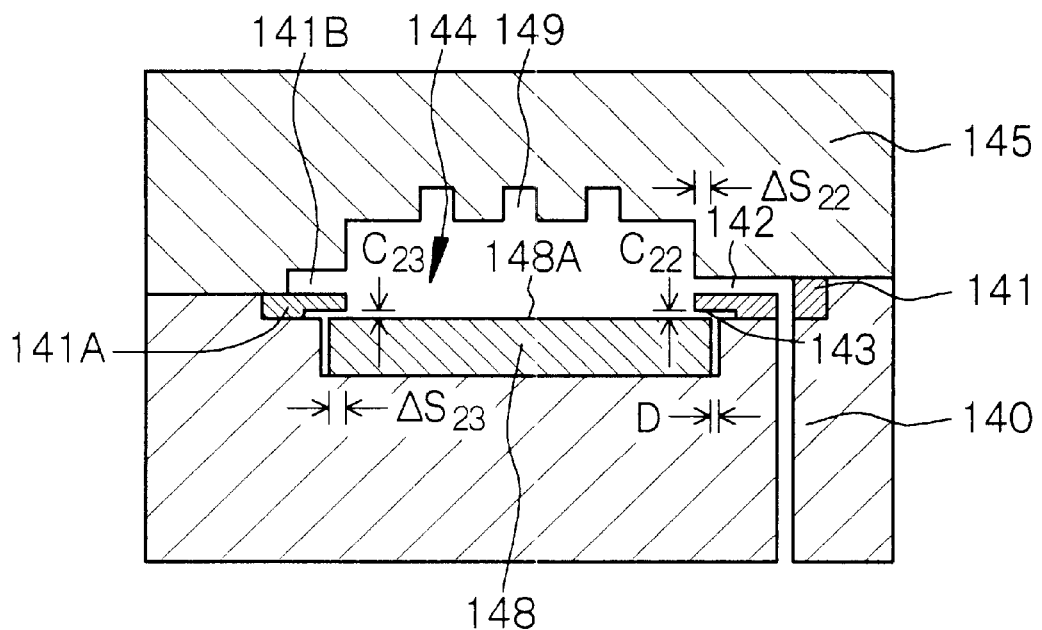
FIGS. 26A and 26B are schematic cross-sectional views of a mold assembly having a structure in which a cover plate is provided with a tab forming portion communicating with a cavity for taking out a molded article from the mold assembly, at a time of claming the mold members.
Figure 26B:
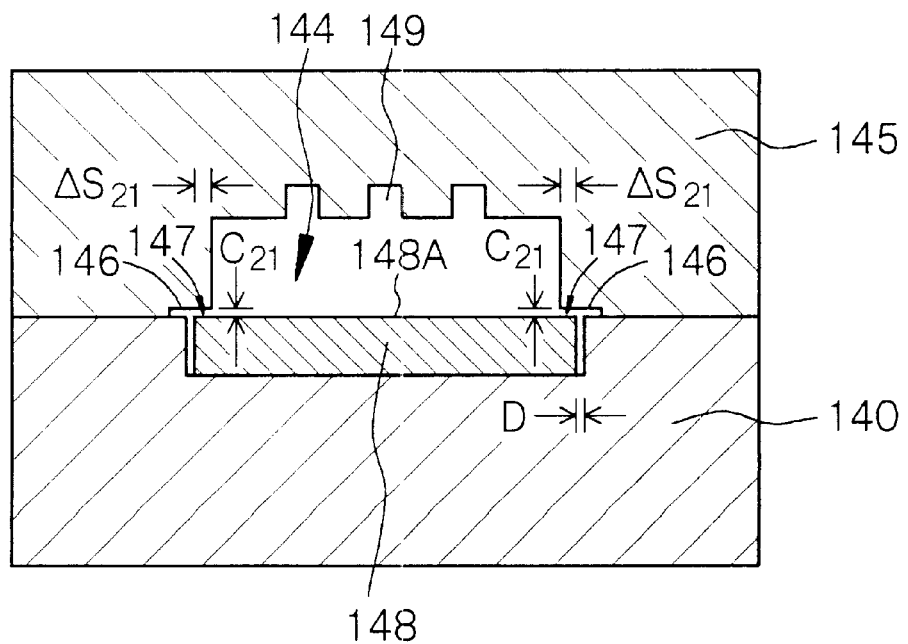
Figure 27A:
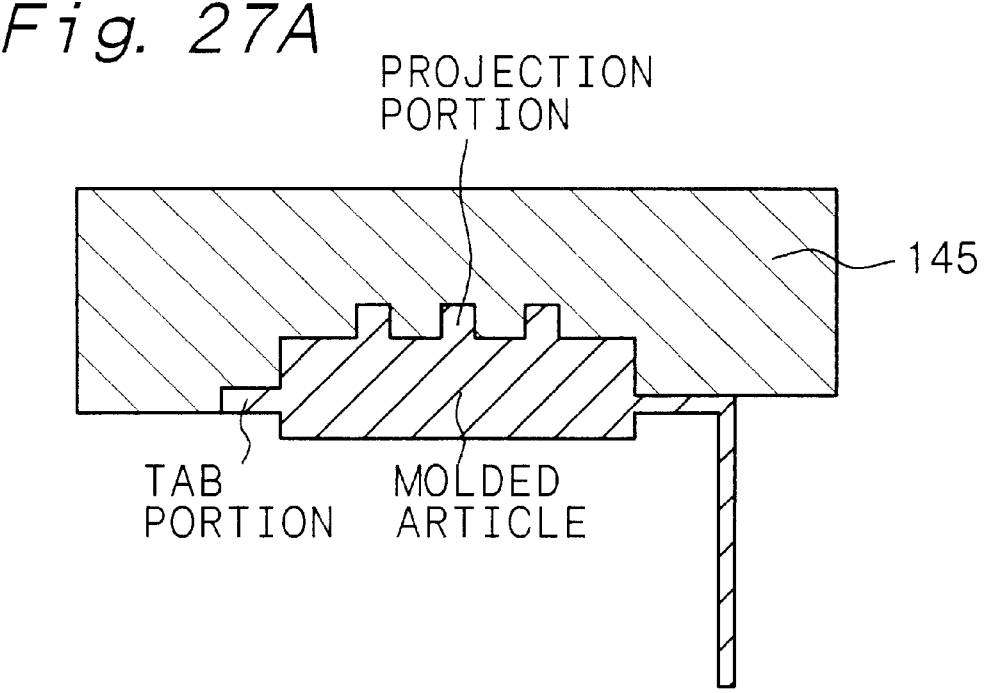
FIGS. 27A and 27B show states of the movable mold member and the molded article after the mold assembly shown in FIGS. 26A and 26B is opened.
Figure 27B:
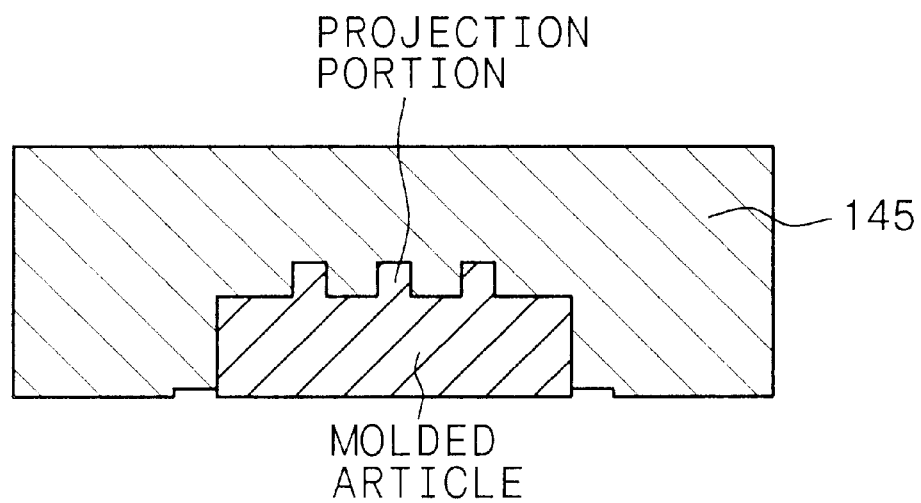

FIGS. 26A and 26B also show structures in which a tab-forming portion 141B communicating with a cavity 144 is formed in a cover plate 141A for taking out a molded article from a mold assembly. The cover plate 141A is attached to a first mold member 140. An insert block 148 and the cover plate 141A are also required to satisfy a clearance ($C_{23}$) of 0.03 mm or less. The above mold assembly has substantially the same structure as that explained with regard to FIGS. 14A and 14B. The cover plates 141A are also provided in two places in a direction perpendicular to the drawing paper surface of FIG. 26A. FIGS. 26A and 27A are cross-sectional views obtained by cutting that region of the mold assembly which includes the cover plates 141 and 141A with a perpendicular plane, and FIGS. 26B and 27B are cross-sectional views obtained by cutting that region of the mold assembly which includes neither the cover plate 141 nor 141A with a perpendicular plane in parallel with the above perpendicular plane. When the mold assembly is structured as described above, a tab portion is formed on a molded article. After the mold assembly is opened (see FIGS. 27A and 27B), the molded article can be pressed out by setting a knock-out pin (not shown) disposed in the second mold member to the above tab portion, to take out the molded article from the second mold member 145. The tab portion formed on the molded article can be removed in a later step.

Figure 28A:
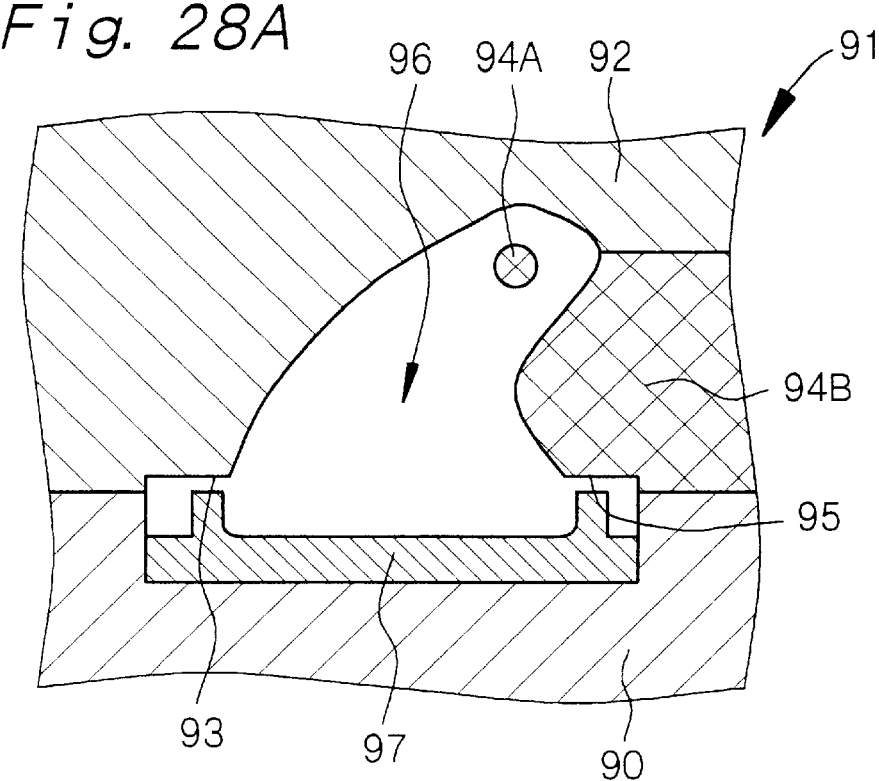
FIGS. 28A, 28B and 28C are a schematic cross-sectional view of a mold assembly having a slide core for forming a door handle of an automobile, at a time of claming the mold members, and schematic views of a door handle of an automobile.
Figure 28B:
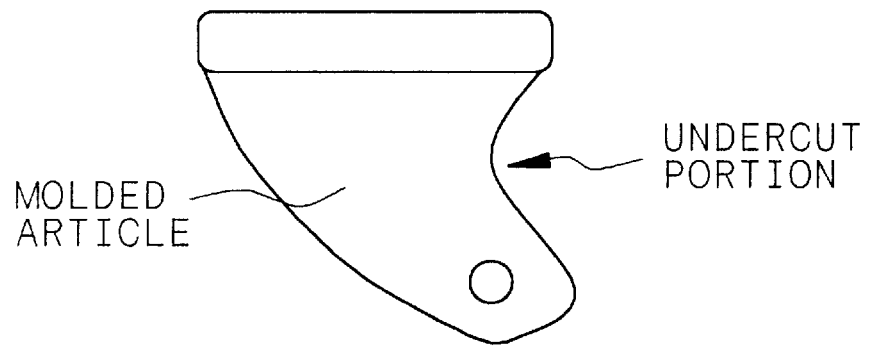
Figure 28C:
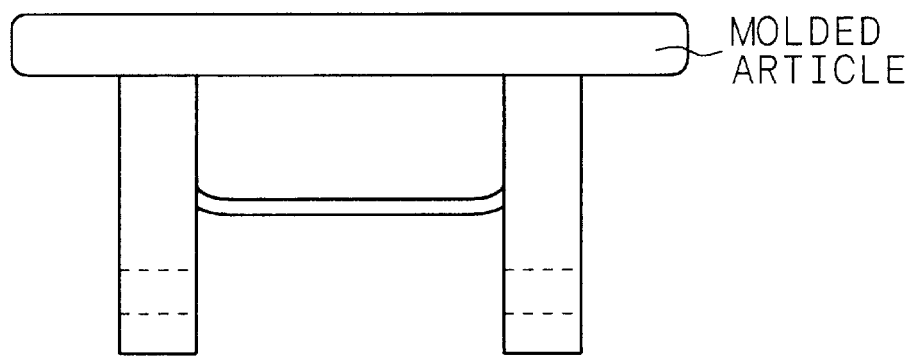

FIG. 28A shows a schematic cross-sectional view of a mold assembly for manufacturing a molded article which is a door handle of an automobile. The mold assembly is constituted of a first mold member (fixed mold member) 90 and a second mold member 91. The second mold member 91 is constituted of a movable mold member 92 and slide cores 94A and 94B. Two slide cores which are cylindrical are provided as slide cores 94A, and the slide cores 94A are slidable in a direction perpendicular to the drawing paper surface of FIG. 28A. One slide core is provided as the slide core 94B, and the slide core 94B is slidable in rightward and leftward directions of FIG. 28A. An insert block 97 is disposed in the first mold member 90. Reference numeral 96 indicates a cavity. Further, a molten thermoplastic resin introduction portion is formed in a second mold member 91, while showing it is omitted. FIG. 28B shows a schematic side view of the molded article which is a door handle of an automobile, and FIG. 28C shows a schematic front view of the molded article which is a door handle of an automobile. As shown in FIG. 28B, an undercut portion is formed in the door handle of an automobile. For taking out the molded article from the mold assembly after it is molded, first, one slide core 94A is moved up in a direction perpendicular to the drawing paper surface of FIG. 28A, the other slide core 94A is moved downward in a direction perpendicular to the drawing paper surface of FIG. 28A, then, the slide core 94B is moved rightward on FIG. 28A and then, the first mold member (fixed mold member) 90 and the movable mold member 92 are separated. When the mold assembly is structured as described above, it is difficult to dispose the cover plate disclosed in Japanese Patent Application 7-152519 (JP-A-8-318534) in the mold assembly. In the present invention, however, the movable mold member 92 and the slide core 94B which constitute the second mold member 91 are provided with insert block covering portions 93 and 95, and the insert block 97 can be reliably disposed in the first mold member 90.

The insert block used in the present invention not only has a high heat insulation effect but also can be easily maintained. In the mold assembly for molding a thermoplastic resin and the method of manufacturing a molded article of a thermoplastic resin according to the present invention, the rapid cooling of the molten resin introduced in the cavity can be inhibited, which can serve to effectively prevent the occurrence of appearance defects such as a jetting and a flow mark or the occurrence of a sink mark on a portion of one surface of a molded article which portion is opposed to a projection and/or a mark of the thermoplastic resin introduction portion formed on the other surface of the molded article. Further, when a thermoplastic resin containing an inorganic fiber is used, the deposition of inorganic fibers on the surface of the molded article can be reliably prevented. Moreover, a failure rate of manufacturing molded articles can be decreased, the uniformity and high-quality of molded articles as products can be attained, and the production cost of molded articles can be decreased.

In the present invention, further, the insert block is incorporated into the mold member so as to have a predetermined clearance and a predetermined amount of overlapping. As a result, the insert block is free from breakage when used for molding for a long period of time, and molded articles having high mirror surface properties can be easily produced at a low cost. Further, molded articles are not impaired in appearance, the occurrence of mold flashes on edge portions can be prevented, a failure rate of manufacturing molded articles can be decreased, the uniformity and high-quality of molded articles as products can be attained, and the production cost of molded articles can be decreased.

Further, since a molten thermoplastic resin in the cavity is improved in flowability, the pressure for the introduction of the molten thermoplastic resin into the cavity can be set at a decreased level. Therefore, the residual stress in the molded article can be alleviated, and the molded article is improved in product quality. Further, since the pressure for the introduction of the molten thermoplastic resin into the cavity can be decreased, the thickness of the mold assembly and the size of a molding machine can be decreased, and the production cost of molded articles can be decreased.

In some mold assemblies according to the present invention, it is not required to dispose a cover plate inside the mold. When the cover plate is disposed in the mold member, the cover plate also co-works as a molten thermoplastic resin introduction portion. Therefore, the position where the insert block is disposed is not limited, and the insert block can be disposed in the mold member for forming that portion of the molded article which is to be provided with excellent surface properties.

What is claimed is:

1. A method of manufacturing a molded article of a thermoplastic resin by means of a mold assembly for molding a thermoplastic resin, said mold assembly comprising:
   (a) a first mold member and a second mold member for manufacturing the molded article of a thermoplastic resin,
   (b) an insert block provided in the first mold member, said insert block constituting part of a cavity, having a thickness of 0.1 mm to 10 mm and being formed of a material having a thermal conductivity of $2 \times 10^{-2}$ cal/cm·sec·°C. or less, and
   (c) a molten thermoplastic resin introduction portion provided in the second mold member,
   wherein an insert block covering portion is formed in the second mold member, and
   when the first mold member and the second mold member are separated from each other, the insert block is positioned in the first mold member and the insert block covering portion is positioned in the second mold member, and
   when the first mold member and the second mold member are clamped to each other,
   (A) a clearance between the insert block and the insert block covering portion is equal to, or less than, 0.03 mm, and
   (B) an amount of overlapping of the insert block and the insert block covering portion is equal to, or greater than, 0.5 mm,
   said manufacturing method comprising;
   introducing a molten thermoplastic resin into the cavity through the molten thermoplastic resin introduction portion, and
   then, cooling and solidifying the thermoplastic resin to manufacture the molded article.

2. The method of claim 1, wherein the material for constituting the insert block is ceramic selected from the group consisting of $ZrO_2$, $ZrO_2$—$CaO$, $ZrO_2$—$Y_2O_3$, $ZrO_2$—$CeO_2$, $ZrO_2$—$MgO$, $ZrO_2$—$SiO_2$, $K_2O$—$TiO_2$, $Al_2O_3$, $Al_2O_3$—$TiC$, $Ti_3N_2$, $3Al_2O_3$—$2SiO_2$, $MgO$—$SiO_2$, $2MgO$—$SiO_2$, $MgO$—$Al_2O_3$—$SiO_2$ and titania or is glass selected from the group consisting of soda-lime glass, quartz glass, heat resisting glass and glass-ceramics.

3. The method of claim 2, wherein the material for constituting the insert block is $ZrO_2$, $ZrO_2$—$Y_2O_3$, $ZrO_2$—$CeO_2$ or glass-ceramics.

4. A method of manufacturing a molded article of a thermoplastic resin by means of a mold assembly for molding a thermoplastic resin, said mold assembly comprising:
   (a) a first mold member and a second mold member for manufacturing a molded article of a thermoplastic resin,
   (b) an insert block provided in the first mold member, said insert block constituting part of a cavity, having a thickness of 0.1 mm to 10 mm and being formed of a material having a thermal conductivity of $2 \times 10^{-2}$ cal/cm·sec·°C. or less, and
   (c) a cover plate provided between the insert block and the second mold member, attached to the first mold member, and provided with a molten thermoplastic resin introduction portion,
   wherein the insert block covering portion is formed in the second mold member, and
   when the first mold member and the second mold member are separated from each other, the insert block and the cover plate are positioned in the first mold member and the insert block covering portion is positioned in the second mold member, and
   when the first mold member and the second mold member are clamped to each other,
   (A) a clearance between the insert block and the insert block covering portion is equal to, or less than, 0.03 mm,
   (B) an amount of overlapping of the insert block and the insert block covering portion is equal to, or greater than, 0.5 mm,
   (C) a clearance between the insert block and the cover plate is equal to, or less than, 0.03 mm, and
   (D) an amount of overlapping of the insert block and the cover plate is equal to, or greater than, 0.5 mm, and the cover plate overlaps only part of the insert block, said manufacturing method comprising;
   introducing a molten thermoplastic resin into the cavity through the molten thermoplastic resin introduction portion, and
   then, cooling and solidifying the thermoplastic resin to manufacture the molded article.

5. The method of claim 4, wherein a tab-forming portion communicating with the cavity is formed in the cover plate for taking out a molded article from the mold assembly.

6. The method of claim 4, wherein the material for constituting the insert block is ceramic selected from the group consisting of $ZrO_2$, $ZrO_2$—$CaO$, $ZrO_2$—$Y_2O_3$, $ZrO_2$—$CeO_2$, $ZrO_2$—$MgO$, $ZrO_2$—$SiO_2$, $K_2O$—$TiO_2$, $Al_2O_3$, $Al_2O_3$—$TiC$, $Ti_3N_2$, $3Al_2O_3$—$2SiO_2$, $MgO$—$SiO_2$, $2MgO$—$SiO_2$, $MgO$—$Al_2O_3$—$SiO_2$ and titania or is glass selected from the group consisting of soda-lime glass, quartz glass, heat resisting glass and glass-ceramics.

7. The method of claim 6, wherein the material for constituting the insert block is $ZrO_2$, $ZrO_2$—$Y_2O_3$, $ZrO_2$—$CeO_2$ or glass-ceramics.

8. A method of manufacturing a molded article of a thermoplastic resin by means of a mold assembly for molding a thermoplastic resin, said mold assembly comprising:
- (a) a first mold member and a second mold member for manufacturing the molded article of a thermoplastic resin,
- (b) a first insert block provided in the first mold member, said first insert block constituting part of a cavity, having a thickness of 0.1 mm to 10 mm and being formed of a material having a thermal conductivity of $2 \times 10^{-2}$ cal/cm·sec·°C. or less,
- (c) a second insert block provided in the second mold member, said second insert block constituting part of the cavity, having a thickness of 0.1 mm to 10 mm and being formed of a material having a thermal conductivity of $2 \times 10^{-2}$·cal·sec·°C. or less, and
- (d) a cover plate provided between the first insert block and the second insert block, attached to at least one of the first mold member and the second mold member, and provided with a molten thermoplastic resin introduction portion,
  - wherein, when the first mold member and the second mold member are separated from each other, the first insert block is positioned in the first mold member, the second insert block is positioned in the second mold member, and the cover plate is positioned in the first mold member or in the second mold member or in the first and second mold members, and
- when the first mold member and the second mold member are clamped to each other,
  - (A) a clearance between a surface of the first insert block facing the second insert block and a surface of the second insert block facing the first insert block is equal to, or less than, 0.03 mm,
  - (B) an amount of overlapping of the surface of the first insert block facing the second insert block and the surface of the second insert block facing the first insert block is equal to, or greater than, 0.5 mm,
  - (C) a clearance between the first insert block and the cover plate and a clearance between the second insert block and the cover plate are equal to, or less than, 0.03 mm, respectively, and
  - (D) an amount of overlapping of the first insert block and the cover plate and an amount of overlapping of the second insert block and the cover plate are equal to, or greater than, 0.5 mm, respectively, and the cover plate overlaps only part of the first and second insert blocks,
    - said manufacturing method comprising;
      - introducing a molten thermoplastic resin into the cavity through the molten thermoplastic resin introduction portion, and
      - then, cooling and solidifying the thermoplastic resin to manufacture the molded article.

9. The method of claim 8, wherein a tab-forming portion communicating with the cavity is formed in the cover plate for taking out a molded article from the mold assembly.

10. The method of claim 8, wherein the material for constituting the first insert block and/or the second insert block is ceramic selected from the group consisting of $ZrO_2$, $ZrO_2$—CaO, $ZrO_2$—$Y_2O_3$, $ZrO_2$—$CeO_2$, $ZrO_2$—MgO, $ZrO_2$—$SiO_2$, $K_2O$—$TiO_2$, $Al_2O_3$, $Al_2O_3$—TiC, $Ti_3N_2$, $3Al_2O_3$—$2SiO_2$, MgO—$SiO_2$, $2MgO$—$SiO_2$, MgO—$Al_2O_3$—$SiO_2$ and titania or is glass selected from the group consisting of soda-lime glass, quartz glass, heat resisting glass and glass-ceramics.

11. The method of claim 10, wherein the material for constituting the first insert block and/or the second insert block is $ZrO_2$, $ZrO_2$—$Y_2O_3$, $ZrO_2$—$CeO_2$ or glass-ceramics.

12. A mold assembly for molding a thermoplastic resin, which comprises:
- (a) a first mold member and a second mold member for manufacturing a molded article of a thermoplastic resin,
- (b) an insert block provided in the first mold member, said insert block constituting part of a cavity, having a thickness of 0.1 mm to 10 mm and being formed of a material having a thermal conductivity of $2 \times 10^{-2}$ cal·sec·°C. or less, and
- (c) a molten thermoplastic resin introduction portion provided in the second mold member,
  - wherein an insert block covering portion is formed in the second mold member, and
  - when the first mold member and the second mold member are separated from each other, the insert block is positioned in the first mold member and the insert block covering portion is positioned in the second mold member, and
  - when the first mold member and the second mold member are clamped to each other,
    - (A) a clearance between the insert block and the insert block covering portion is equal to, or less than, 0.03 mm, and
    - (B) an amount of overlapping of the insert block and the insert block covering portion is equal to, or greater than, 0.5 mm.

13. The mold assembly of claim 12, wherein the material for constituting the insert block is ceramic selected from the group consisting of $ZrO_2$, $ZrO_2$—CaO, $ZrO_2$—$Y_2O_3$, $ZrO_2$—$CeO_2$, $ZrO_2$—MgO, $ZrO_2$—$SiO_2$, $K_2O$—$TiO_2$, $Al_2O_3$, $Al_2O_3$—TiC, $Ti_3N_2$, $3Al_2O_3$—$2SiO_2$, MgO—$SiO_2$, $2MgO$—$SiO_2$, MgO—$Al_2O_3$—$SiO_2$ and titania or is glass selected from the group consisting of soda-lime glass, quartz glass, heat resisting glass and glass-ceramics.

14. The mold assembly of claim 13, wherein the material for constituting the insert block is $ZrO_2$, $ZrO_2$—$Y_2O_3$, $ZrO_2$—$CeO_2$ or glass-ceramics.

15. A mold assembly for molding a thermoplastic resin, which comprises:
- (a) a first mold member and a second mold member for manufacturing a molded article of a thermoplastic resin,
- (b) an insert block provided in the first mold member, said insert block constituting part of a cavity, having a thickness of 0.1 mm to 10 mm and being formed of a material having a thermal conductivity of $2 \times 10^{-2}$ cal/cm·sec·°C. or less, and
- (c) a cover plate provided between the insert block and the second mold member, attached to the first mold member, and provided with a molten thermoplastic resin introduction portion,
  - wherein an insert block covering portion is formed in the second mold member, and
  - when the first mold member and the second mold member are separated from each other, the insert block and the cover plate are positioned in the first mold member and the insert block covering portion is positioned in the second mold member, and
  - when the first mold member and the second mold member are clamped to each other, (A) a clearance between the insert block and the insert block covering portion is equal to, or less than, 0.03 mm,
(B) an amount of overlapping of the insert block and the insert block covering portion is equal to, or greater than, 0.5 mm,
(C) a clearance between the insert block and the cover plate is equal to, or less than, 0.03 mm, and
(D) an amount of overlapping of the insert block and the cover plate is equal to, or greater than, 0.5 mm, and the cover plate overlaps only part of the insert block.

16. The mold assembly of claim 15, wherein a tab-forming portion communicating with the cavity is formed in the cover plate for taking out a molded article from the mold assembly.

17. The mold assembly of claim 15, wherein the material for constituting the insert block is ceramic selected from the group consisting of $ZrO_2$, $ZrO_2$—$CaO$, $ZrO_2$—$Y_2O_3$, $ZrO_2$—$CeO_2$, $ZrO_2$—$MgO$, $ZrO_2$—$SiO_2$, $K_2O$—$TiO_2$, $Al_2O_3$, $Al_2O_3$—$TiC$, $Ti_3N_2$, $3Al_2O_3$—$2SiO_2$, $MgO$—$SiO_2$, $2MgO$—$SiO_2$, $MgO$—$Al_2O_3$—$SiO_2$ and titania or is glass selected from the group consisting of soda-lime glass, quartz glass, heat resisting glass and glass-ceramics.

18. The mold assembly of claim 17, wherein the material for constituting the insert block is $ZrO_2$, $ZrO_2$—$Y_2O_3$, $ZrO_2$—$CeO_2$ or glass-ceramics.

19. A mold assembly for molding a thermoplastic resin, which comprises:
(a) a first mold member and a second mold member for manufacturing a molded article of a thermoplastic resin,
(b) a first insert block provided in the first mold member, said first insert block constituting part of a cavity, having a thickness of 0.1 mm to 10 mm and being formed of a material having a thermal conductivity of $2 \times 10^{-2}$ cal/cm·sec·°C. or less,
(c) a second insert block provided in the second mold member, said second insert block constituting part of the cavity, having a thickness of 0.1 mm to 10 mm and being formed of a material having a thermal conductivity of $2 \times 10^{-2}$ cal/cm·sec·°C. or less, and
(d) a cover plate provided between the first insert block and the second insert block, attached to at least one of the first mold member and the second mold member, and provided with a molten thermoplastic resin introduction portion, wherein, when the first mold member and the second mold member are separated from each other, the first insert block is positioned in the first mold member, the second insert block is positioned in the second mold member, and the cover plate is positioned in the first mold member or in the second mold member or in the first and second mold members, and when the first mold member and the second mold member are clamped to each other,
(A) a clearance between a surface of the first insert block facing the second insert block and a surface of the second insert block facing the first insert block is equal to, or less than, 0.03 mm,
(B) an amount of overlapping of the surface of the first insert block facing the second insert block and the surface of the second insert block facing the first insert block is equal to, or greater than, 0.5 mm,
(C) a clearance between the first insert block and the cover plate and a clearance between the second insert block and the cover plate are equal to, or less than, 0.03 mm, respectively, and
(D) an amount of overlapping of the first insert block and the cover plate and an amount of overlapping of the second insert block and the cover plate are equal to, or greater than, 0.5 mm, respectively, and the cover plate overlaps only part of the first and second insert blocks.

20. The mold assembly of claim 19, wherein a tab-forming portion communicating with the cavity is formed in the cover plate for taking out a molded article from the mold assembly.

21. The mold assembly of claim 19, wherein the material for constituting the first insert block and/or the second insert block is ceramic selected from the group consisting of $ZrO_2$, $ZrO_2$—$CaO$, $ZrO_2$—$Y_2O_3$, $ZrO_2$—$CeO_2$, $ZrO_2$—$MgO$, $ZrO_2$—$SiO_2$, $K_2O$—$TiO_2$, $Al_2O_3$, $Al_2O_3$—$TiC$, $Ti_3N_2$, $3Al_2O_3$—$2SiO_2$, $MgO$—$SiO_2$, $2MgO$—$SiO_2$, $MgO$—$Al_2O_3$—$SiO_2$ and titania or is glass selected from the group consisting of soda-lime glass, quartz glass, heat resisting glass and glass-ceramics.

22. The mold assembly of claim 21, wherein the material for constituting the first insert block and/or the second insert block is $ZrO_2$, $ZrO_2$—$Y_2O_3$, $ZrO_2$—$CeO_2$ or glass-ceramics.

* * * * *